United States Patent
Miyazaki et al.

(10) Patent No.: US 10,407,559 B2
(45) Date of Patent: Sep. 10, 2019

(54) PLASTICIZER FOR VINYL CHLORIDE RESIN CONTAINING NON-PHTHALATE ESTER AND VINYL CHLORIDE RESIN COMPOSITION CONTAINING SUCH PLASTICIZER

(71) Applicant: NEW JAPAN CHEMICAL CO., LTD., Kyoto-shi, Kyoto (JP)

(72) Inventors: Ken-ichi Miyazaki, Kyoto (JP); Takahiro Inoue, Kyoto (JP); Taiki Tsuji, Kyoto (JP); Yuka Sato, Kyoto (JP); Masafumi Kishimoto, Kyoto (JP); Shigeo Miki, Kyoto (JP)

(73) Assignee: NEW JAPAN CHEMICAL CO., LTD., Kyoto-shi (JP)

( * ) Notice: Subject to any disclaimer, the term of this patent is extended or adjusted under 35 U.S.C. 154(b) by 0 days.

(21) Appl. No.: 15/124,969

(22) PCT Filed: Mar. 27, 2015

(86) PCT No.: PCT/JP2015/059778
§ 371 (c)(1),
(2) Date: Sep. 9, 2016

(87) PCT Pub. No.: WO2015/147300
PCT Pub. Date: Oct. 1, 2015

(65) Prior Publication Data
US 2017/0015810 A1   Jan. 19, 2017

(30) Foreign Application Priority Data

| Mar. 27, 2014 | (JP) | 2014-065231 |
| May 27, 2014 | (JP) | 2014-108630 |
| Jul. 22, 2014 | (JP) | 2014-148463 |
| Oct. 8, 2014 | (JP) | 2014-206967 |
| Oct. 30, 2014 | (JP) | 2014-220880 |
| Jan. 30, 2015 | (JP) | 2015-017366 |
| Feb. 2, 2015 | (JP) | 2015-018240 |
| Feb. 5, 2015 | (JP) | 2015-020870 |
| Feb. 17, 2015 | (JP) | 2015-028275 |
| Feb. 25, 2015 | (JP) | 2015-034677 |
| Mar. 16, 2015 | (JP) | 2015-051854 |

(51) Int. Cl.
*C08K 5/12*   (2006.01)
*C08J 5/18*   (2006.01)

(52) U.S. Cl.
CPC .......... *C08K 5/12* (2013.01); *C08J 5/18* (2013.01); *C08J 2327/06* (2013.01)

(58) Field of Classification Search
None
See application file for complete search history.

(56) References Cited

U.S. PATENT DOCUMENTS

| 4,058,471 A | 11/1977 | Glatti et al. |
| 4,283,310 A * | 8/1981 | James ............... C08K 5/098 |
| | | 252/381 |
| 5,563,188 A * | 10/1996 | Ziems ............ C09D 127/06 |
| | | 523/218 |
| 6,355,711 B1 | 3/2002 | Godwin et al. |
| 7,208,545 B1 | 4/2007 | Brunner et al. |
| 2002/0019559 A1 | 2/2002 | Brunner et al. |
| 2004/0138358 A1 | 7/2004 | Koch et al. |
| 2007/0037910 A1 * | 2/2007 | Murakami ............ C08K 3/22 |
| | | 524/323 |
| 2007/0235687 A1 | 10/2007 | Caers et al. |
| 2008/0188601 A1 * | 8/2008 | Grass ................ C07C 67/08 |
| | | 524/321 |
| 2009/0054574 A1 | 2/2009 | Holt et al. |
| 2009/0149586 A1 * | 6/2009 | De Quadros Junior ............ |
| | | C07D 303/42 |
| | | 524/114 |

(Continued)

FOREIGN PATENT DOCUMENTS

| CN | 1760258 A | 4/2006 |
| CN | 101245166 A | 8/2008 |

(Continued)

OTHER PUBLICATIONS

International Search Report dated Jun. 15, 2015, issued in counterpart international application No. PCT/JP2015/059778 (3 pages).
Italian Data Sheet of DIPLAST TM 9 by Polynt and English version thereof; cited in Third Party Observations dated May 17, 2018. (10 pages).
Brochure Plasticizers by Polynt; cited in Third Party Observations dated May 17, 2018. (20 pages).
Data sheet of OXSOFT L9TM by OXEA; cited in Third Party Observations dated May 17, 2018. (12 pages).
Third Party Observations dated May 17, 2018, issued in counterpart European Application No. 15769604.8. (9 pages).

(Continued)

*Primary Examiner* — Robert T Butcher
(74) *Attorney, Agent, or Firm* — Westerman, Hattori, Daniels & Adrian, LLP

(57) ABSTRACT

An object of the present invention is to provide a plasticizer for vinyl chloride-based resin superior in cold resistance and volatility resistance, and desirable in flexibility, fogging resistance, heat discoloration resistance, and weather resistance, and to also provide a vinyl chloride-based resin composition comprising the plasticizer.
An ester obtained by reacting a specific carboxylic acid or a derivative thereof with a $C_9$ saturated aliphatic alcohol at a specific proportion is superior in cold resistance and volatility resistance, and desirable in flexibility, fogging resistance, heat discoloration resistance, and weather resistance. Therefore, if becomes possible to obtain a vinyl chloride-based resin composition applicable to automobile parts, medical materials, or the like, as well as a molded article of the vinyl chloride-based resin composition.

9 Claims, No Drawings

(56) References Cited

U.S. PATENT DOCUMENTS

| | | | |
|---|---|---|---|
| 2010/0010131 A1* | 1/2010 | Nakahira | C08K 5/5419 524/261 |
| 2012/0310004 A1† | 12/2012 | Sharko | |
| 2013/0062094 A1 | 3/2013 | Naert et al. | |
| 2013/0310471 A1 | 11/2013 | Becker et al. | |

FOREIGN PATENT DOCUMENTS

| | | | |
|---|---|---|---|
| CN | 103664613 A | 3/2014 | |
| EP | 0 141 471 A2 | 5/1985 | |
| EP | 0 328 046 A1 * | 8/1989 | |
| EP | 0 331 729 A1 | 9/1989 | |
| JP | 47-4909 A | 3/1972 | |
| JP | 51-17951 A | 2/1976 | |
| JP | 52-116401 A | 9/1977 | |
| JP | 56-61448 A | 5/1981 | |
| JP | 58-157845 A | 9/1983 | |
| JP | 60-115640 A | 6/1985 | |
| JP | 61-243845 A | 10/1986 | |
| JP | 62-199641 A | 9/1987 | |
| JP | 2-222436 A | 9/1990 | |
| JP | 5-186653 A | 7/1993 | |
| JP | 5-279485 A | 10/1993 | |
| JP | 8-24329 A | 1/1996 | |
| JP | 8-176383 A | 7/1996 | |
| JP | 10-176089 A | 6/1998 | |
| JP | 11-176240 A | 7/1999 | |
| JP | 2000-226482 A | 8/2000 | |
| JP | 2001-207002 A | 7/2001 | |
| JP | 2001-526252 A | 12/2001 | |
| JP | 2002-512213 A | 4/2002 | |
| JP | 2002-194159 A | 7/2002 | |
| JP | 2003-502399 A | 1/2003 | |
| JP | 2003-165881 A | 6/2003 | |
| JP | 2003-277561 A | 10/2003 | |
| JP | 2004-2695 A | 1/2004 | |
| JP | 2004-143177 A | 5/2004 | |
| JP | 2004-323778 A | 11/2004 | |
| JP | 2004-331585 A | 11/2004 | |
| JP | 2005-232381 A | 9/2005 | |
| JP | 2006-63102 A | 3/2006 | |
| JP | 2006-239026 A | 9/2006 | |
| JP | 2007-31664 A | 2/2007 | |
| JP | 2008-542230 A | 11/2008 | |
| JP | 2009-62394 A | 3/2009 | |
| JP | 2009-299010 A | 12/2009 | |
| JP | 2011-79935 A | 4/2011 | |
| JP | 2012-7184 A | 1/2012 | |
| JP | 2012-31220 A | 2/2012 | |
| JP | 2012-81247 A | 4/2012 | |
| JP | 2012-197394 A | 10/2012 | |
| JP | 2010-536991 A | 12/2012 | |
| JP | 2013-100549 A | 5/2013 | |
| JP | 2013-129776 A | 7/2013 | |
| JP | 2013-147520 A | 8/2013 | |
| JP | 2013-543920 A | 12/2013 | |
| JP | 2014-189688 A | 10/2014 | |
| WO | 99/54277 A1 | 10/1999 | |
| WO | 2006/125670 A1 | 11/2006 | |

OTHER PUBLICATIONS

"Plastic Rubber Processing Aid (second version)", Shanxi Institute of Chemical Technology, Chemical Industry Press, Material Science and Engineering Publishing Centre, Oct. 2002, Beijing, pp. 77-78, with English translation.

Yi Z.,"High Polymer Material Basics", National Defense Industry Press, Jul. 2007, pp. 222-223, with English translation.

Yaqing F. et al.,"Chemical Aids and Technology", Chemical Industry Press, Jun. 1997, p. 38, with English translation.

Office Action dated Mar. 26, 2018, issued in counterpart Chinese Application No. 201580016854.1, with English translation. (31 pages).

Extended (supplementary) European Search Report dated Oct. 20, 2017, issued in counterpart European Application No. 15769604.8. (8 pages).

Third Party Observation dated Aug. 14, 2017, issued in counterpart European Patent Application No. 15769604.8. (17 pages).

Office Action dated Mar. 27, 2018, issued in counterpart Japanese Application No. 2015-020870, with English machine translation. (16 pages).

Office Action dated Jan. 22, 2019, issued in JP Application No. 2015-151522, with English machine translation. (13 pages).

Office Action dated Jan. 22, 2019, issued in JP Application No. 2015-203311, with English machine translation. (6 pages).

Encyclopedia of Chemical Technology, vol. 19, Encyclopedia of Chemical Technology Editorial Board, Chemical Industry Press, p. 428, Sep. 1998, first version, first print, Sep. 30, 1998; with English translation; cited in CN Office Action dated Mar. 5, 2019. (4 pages).

Resin and Plastics, Professional Volume, two volumes, Encyclopedia of Chemical Technology Editorial Board, Chemical Industry Press, p. 1637, Jan. 2003, first version, first print, Jan. 31, 2003; with English translation; cited in CN Office Action dated Mar. 5, 2019. (4 pages).

Office Action dated Mar. 5, 2019, issued in counterpart CN Application No. 201580016854.1, with English translation. (36 pages).

\* cited by examiner
† cited by third party

PLASTICIZER FOR VINYL CHLORIDE RESIN CONTAINING NON-PHTHALATE ESTER AND VINYL CHLORIDE RESIN COMPOSITION CONTAINING SUCH PLASTICIZER

TECHNICAL FIELD

The present invention relates to a plasticizer for vinyl chloride-based resin containing non-phthalate ester, and a vinyl chloride-based resin composition and the like containing the plasticizer.

BACKGROUND ART

Generally, vinyl chloride-based resins are often formed into molded articles through a step of adding a plasticizer to a vinyl chloride-based resin and molding the resulting vinyl chloride-based resin composition.

For these molded articles (molded products) obtained by molding a vinyl chloride-based resin composition containing a plasticizer, various types of performance have been in demand, such as flexibility, cold resistance, heat resistance, and electrical properties. Examples of typical plasticizers for vinyl chloride-based resin include phthalate ester plasticizers for vinyl chlorides, such as di-2-ethylhexyl phthalate (hereinafter referred to as "DOP") and diisononyl phthalate (hereinafter referred to as "DINP"). These plasticizers have been commonly used.

However, in recent, years, safety of chemical substances has been drawing attention, and since toxicity of phthalate ester was confirmed when a large amount of phthalate ester was administered to rodents, phthalate ester use is now restricted mainly for infants in Japan and Western countries as a preventive measure. In the field of plasticizers, a non-phthalate ester plasticizer, more specifically, a plasticizer free of esters of phthalic acid and alcohol having 8 or fewer carbon atoms, or a plasticizer containing a small amount of such esters, has been desired in the market. For example, in Europe, the content of phthalate ester in molded resin articles is strictly limited (REACH (Regulation (EC) No 1907/2006)), and even a very small amount of phthalate ester component in a molded article is becoming problematic.

To date, acetyltributyl citrate (hereinafter referred to as "ATBC"), di-2-ethylhexyl adipate (hereinafter referred to as "DOA"), tri-2-ethylhexyl trimellitate (hereinafter referred to as "TOTM"), and like plasticizers for vinyl chloride have been developed as non-phthalate ester plasticizers for vinyl chloride-based resin (Patent Documents 1 to 3). Among these plasticizers, ATBC and DOA have the drawback of significantly insufficient heat resistance compared with phthalate ester plasticizers.

In contrast, trimellitate ester plasticizers such as TOTM or tri-n-octyl trimellitate (hereinafter referred to as "n-TOTM") have heat resistance equivalent to or greater than phthalate esters; therefore, trimellitate ester plasticizers are expected to be plasticizers that have sufficient heat resistance and can be a replacement for phthalate esters.

In particular, among trimellitate esters, the balance between flexibility, cold resistance, heat resistance, and volatility resistance is relatively desirable in TOTM and n-TOTM; therefore, TOTM and n-TOTM are known as plasticizers that have sufficient heat resistance and can be a replacement for phthalate esters.

It is generally known that trimellitate esters currently on the market contain a phthalate ester derived from a raw material. In particular, TOTM and n-TOTM currently used are known to contain a phthalate ester (DOP, di-n-octyl phthalate (hereinafter referred to as "n-DOP"), etc.) (Patent Document 4).

Therefore, a method of reducing the amount of phthalic acid compound contained in the trimellitic acid, which is used as a raw material, has been reported; however, realistically, it is extremely difficult to completely remove a phthalic acid compound. Further, in terms of production costs, production of trimellitate esters becomes more unrealistic as the amount of phthalic acid compound is reduced.

Another attempt that has been known is use of trimellitate triesters obtained from alcohol having 9 or more carbon atoms, i.e., alcohol with an alkyl length with smaller risk and smaller volatile property, such as triisononyl trimellitate (hereinafter referred to as "TINTM") or triisodecyl trimellitate (hereinafter referred to as "TIDTM"), as plasticizers.

However, since TINTM and TIDTM have drawbacks in terms of flexibility or the like, at present, TINTM and TIDTM cannot be used as TOTM or n-TOTM can be.

Under such circumstances, in view of reducing risk, there has been demand for development of a plasticizer for vinyl chloride-based resin that contains a smaller amount of an ester resulting from a reaction of a phthalic acid compound or derivative thereof and alkyl alcohol having 8 or fewer carbon atoms, and that has superior heat resistance, superior cold resistance, and desirable flexibility.

The "phthalic acid compound" in the present invention is a general name of benzene dicarboxylic acids, including not only orthophthalic acid (narrowly defined) but also isomers such as isophthalic acid, terephthalic acid, and the like.

Further, in recent years, as a non-phthalate ester plasticizer for vinyl chloride-based resins, alicyclic dicarboxylate diesters such as 1,2-cyclohexane dicarboxylate diisononyl (hereinafter referred to as "DINCH") have been attracting attention as a balanced non-phthalic acid plasticizer having flexibility, heat resistance, and cold resistance similar to those of a phthalate ester plasticizer (Patent Document 5).

However, demand for cold resistance and heat resistance has been further increasing in the use for wire sheathing, automobile parts, and the like. Thus, the demand for heat resistance can no longer be satisfied by DINCH and the like, and the demand for cold resistance can no longer be satisfied by TOTM, n-TOTM, and the like in some cases; therefore, phthalate ester plasticizers are still necessary in some applications. Therefore, a plasticizer as a replacement for phthalate ester plasticizers is strongly desired.

Under such circumstances, in view of reducing risk, there has been a demand for a non-phthalate ester plasticizer for vinyl chloride-based resin that contains a small amount of an ester of a phthalic acid compound and alkyl alcohol having 8 or fewer carbon atoms, and that has superior heat resistance, superior cold resistance, and desirable flexibility.

Previously, the present inventors reported that trimellitate triester obtained by an esterification reaction of trimellitic acid or an anhydride thereof and a specific saturated aliphatic alcohol is useful as a plasticizer for vinyl chloride-based resin having significantly superior volatility resistance and relatively desirable cold resistance and flexibility (Patent Document 6). However, for automobile parts such as interior materials used under severe conditions such as extremely hot weather, a plasticizer with weather resistance and heat discoloration resistance even greater than those of the trimellitate triester mentioned above is desired.

To this end, a method of improving weather resistance, heat discoloration resistance, and the like of a plasticizer by incorporating an antioxidant to a plasticizer has been known.

In fact, antioxidants such as 4,4'-(propane-2,2-diyl)diphenol (hereinafter referred to as "bisphenol A"), dibutylhydroxytoluene (hereinafter referred to as "BHT") and the like have been used.

However, such an improvement cannot be considered fully sufficient to meet the increasing demand for weather resistance and heat discoloration resistance.

Moreover, a common technique for a vinyl chloride-based resin plasticizer has been to make a paste sol by incorporating other components such as a filler together with a vinyl chloride-based resin. A target molded article of a paste sol may be obtained through a paste-making method in which molding such as coating molding, spray molding, dip molding, rotational molding, slush molding, spread molding, calender molding, extrusion molding, press molding, injection molding, or foam molding is performed, and then the molded article is heated and fused. Such a paste-making method is widely used because it enables easy processing.

The properties required for a paste sol are roughly classified into two types of performance, i.e., performance as a paste sol and performance as a molded article that is obtained by processing the paste sol. More specifically, one of the required types of performance is superior processability, i.e., appropriate viscosity characteristics (low viscosity) and storage stability as a paste sol, namely superior sedimentation properties and superior viscosity stability. For the second type of performance, various characteristics such as heat resistance, cold resistance, and flexibility are desired.

More specifically, a plasticizer for a paste sol largely influences the performance of a paste sol, including its flow properties, viscosity stability, and the like, as well as the basic characteristics of the resulting molded article, such as heat resistance, cold resistance, or flexibility. Thus, the selection of the plasticizer is very important.

In the past, phthalate ester plasticizers for vinyl chloride, such as DOP, DINP, or the like, have commonly been used as plasticizers for paste sol. Further, in addition to these phthalate ester plasticizers, for example, TOTM (trimellitate ester plasticizers) and the like have also been used in applications in which heat resistance is required (Patent Document 7). Further, in view of recent environmental issues, ATBC, diisononyl adipate (hereinafter referred to as "DINA"), DINCH and like non-phthalate ester plasticizers are attracting attention (Patent Documents 1, 2, and 8 to 11). In particular, alicyclic dicarboxylate diester plasticizers such as DINCH are attracting attention also in view of their sol characteristics, including viscosity.

As described above, both satisfactory performance as a paste sol and satisfactory performance as a molded article that is obtained by processing the paste sol are required for plasticizers for paste sol. However, no plasticizers for paste sol satisfying both types of performance have been obtained so far.

For example, demand for heat resistance and cold resistance with regard to the molded vinyl-chloride resin articles used for automobile parts and the like are becoming stricter in recent years. Further, for molded vinyl-chloride resin articles to be used for interior materials such as wallpaper, floor materials, or the like, demand for low-VOC (volatile organic compound) products (which cause less indoor volatilization of organic compounds such as plasticizers) has also been increasing.

Examples of plasticizers for satisfying the requirement of low VOC include polyester plasticizers. However, polyester plasticizers have high viscosity, and thus need to be used with adipate ester plasticizers such as DOA; therefore, there have been difficulties for ensuring satisfactory volatility resistance.

Further, there are reports that cyclohexene-1,2-dicarboxylate di-2-ethylhexyl, cyclohexene-1,2-dicarboxylate diisononyl ester, and like alicyclic dicarboxylate diesters can be used as plasticizers for paste sol having low viscosity and superior sol characteristics (Patent Document 12).

However, since none of the molded articles obtained by these alicyclic dicarboxylate diesters fully satisfy the above requirements, further improvement is desired.

Further, as a method for improving sol characteristics, i.e., as a method for reducing viscosity, a method for incorporating a viscosity reducer such as a hydrocarbon compound such as alkyl benzene, mineral spirit, or paraffin; an anionic surfactant; polyoxyethylene alkylphenol ether; sorbitan fatty acid ester; or glycerin fatty acid ester has been widely used.

However, since many of these viscosity reducers are highly volatile, it is becoming more difficult to use them as low-VOC products (Patent Documents 13 to 16).

Since vinyl chloride-based resin compositions are desirable in processability and superior in chemical resistance and durability, molded articles obtained by molding vinyl chloride-based resin compositions have widely been used as medical materials.

Further, the hardness of a vinyl chloride-based resin composition may be varied by changing the proportion of the plasticizer. In particular, since a soft vinyl chloride-based resin composition containing a plasticizer is superior in kinking resistance to polyolefin or the like, it has widely been used as a medical material such as for medical tubes, including catheters, or for medical bags, including blood bags and infusion bags.

Since not only desirable flexibility but also durability, including superior heat resistance to withstand heat treatment and superior cold resistance to withstand storage at low temperature, are required for these soft vinyl chloride-based resin compositions, and since it is also necessary to reduce elution and movability of the additives in view of safety, the selection of a plasticizer having the largest content in a soft vinyl chloride-based resin composition is significantly important.

Until now, phthalate ester plasticizers such as DOP or DINP have commonly been used as the above plasticizer (Patent Document 17). However, since phthalate ester plasticizers have insufficient heat resistance during the heat treatment mentioned above, and also need to be improved in terms of safety, including elution and movability, use of trimellitate ester plasticizers, such as TOTM or polyester plasticizers, have been considered (Patent Documents 18 to 21).

Although trimellitate ester plasticizers and polyester plasticizers are superior in heat resistance, they are inferior in plasticizing efficiency and cold resistance. Thus, in order to obtain sufficient flexibility and cold resistance, it is necessary to incorporate a large amount of a plasticizer to the resin. The incorporation of a large amount of a plasticizer may become problematic in terms of safety or the like. Therefore, at present, there is no balanced plasticizer that can satisfy all of the above characteristics alone.

Under such circumstances, medical materials that ensure improved heat resistance without decreasing flexibility and cold resistance have been desired, and development of a plasticizer and a vinyl chloride-based resin composition enabling production of such materials has been hoped for.

Further, medical materials need to be sterilized and disinfected before use from the standpoint of hygiene. As sterilization and disinfection methods, heat treatments such as dry heat, boiling, or pressurized hot water treatment; application of ultraviolet or radial rays; chemical treatments using ethylene oxide gas or the like are known. Generally, heat treatments or treatments with application of ultraviolet or radial rays are often used.

In recent years, with medical accidents increasing in hospitals, hygiene control in medical practice is becoming even stricter; accordingly, the conditions of the above sterilization and disinfection treatments are also becoming stricter. However, with such increased demand for strict conditions, for example, in heat treatment, a decrease in flexibility due to volatilization of a plasticizer or the like may cause breakage of the material. Thus the required properties may not be satisfied by TOTM or the like. Further, in treatments with application of ultraviolet or radial rays, discoloration causes a decrease in ability to identify the content, thereby causing medical accidents. This is a serious problem. It is known that discoloration may be alleviated by incorporating a large amount of stabilizer (Patent Documents 22 to 25); however, the incorporation of a large amount of stabilizer is significantly problematic in terms of safety, and thus is virtually impossible. Therefore, an effective improvement method has not been found at present.

CITATION LIST

Patent Documents

Patent Document 1: JP2000-226482A
Patent Document 2: JP2002-194159A
Patent Document 3: JP2013-147520A
Patent Document 4: JP2004-331585A
Patent Document 5: JP2001-526252A
Patent Document 6: JP2014-189688A
Patent Document 7: JPH05-279485A
Patent Document 8: JP2003-277561A
Patent Document 9: JP2006-063102A
Patent Document 10: JP2009-299010A
Patent Document 11: JP2013-543920A
Patent Document 12: JP2004-002695A
Patent Document 13: JP2005-232381A
Patent Document 14: JP2007-031664A
Patent Document 15: JP2010-536991A
Patent Document 16: JP2011-079935A
Patent Document 17: JPH10-176089A
Patent Document 18: JP2003-165881A
Patent Document 19: JP2006-239026A
Patent Document 20: JP2012-081247A
Patent Document 21: JPS60-115640A
Patent Document 22: JPH08-024329A
Patent Document 23: JPH08-176383A
Patent Document 24: JPS56-061448A
Patent Document 25: JPH02-222436A

SUMMARY OF INVENTION

Technical Problem

An object of the present invention is to provide a plasticizer for vinyl chloride-based resin that is superior in cold resistance, heat resistance, and flexibility, and that contains non-phthalate ester that is less risky from the standpoint of safety; and to provide a vinyl chloride-based resin composition containing the plasticizer.

Another object of the present invention is to provide a plasticizer for vinyl chloride-based resin with further improved durability, including volatility resistance, fogging resistance, heat discoloration resistance, and weather resistance, as well as desirable cold resistance and flexibility; and to provide a vinyl chloride-based resin composition containing the plasticizer.

Another object of the present invention is to provide a novel vinyl chloride-based paste sol composition that is superior in sol characteristics and has desirable heat resistance, cold resistance, and flexibility.

Still another object of the present invention is to provide a medical vinyl chloride-based resin composition that is less subject to deterioration, such as a decrease in flexibility, discoloration, or the like, caused by a sterilization or disinfection treatment using ultraviolet or radial rays.

Solution to Problem

The inventors of the present invention conducted extensive research in light of these current circumstances and found that an ester obtained by reacting a specific carboxylic acid or a derivative thereof with a specific saturated aliphatic alcohol has superior cold resistance and heat resistance, as well as desirable flexibility, and that, by incorporating this ester to a vinyl chloride-based resin as a plasticizer, it is possible to obtain a vinyl chloride-based resin composition with superior cold resistance and heat resistance, as well as desirable flexibility.

Accordingly, the inventors of the present invention conducted further research and found that the above problems can be solved by using the specific plasticizer for vinyl chloride-based resin of the present invention, and thus completed the invention.

Specifically, the present invention provides plasticizers for vinyl chloride-based resin, as well as vinyl chloride-based resin compositions and molded vinyl-chloride resin articles containing the plasticizers, as detailed below.

Item 1. A plasticizer for vinyl chloride-based resin, comprising a non-phthalate ester (C) obtained by reacting a polycarboxylic acid (A) and an alcohol (B),
wherein:
(i) the polycarboxylic acid (A) is a polycarboxylic acid compound selected from the group consisting of alicyclic dicarboxylic acids, aromatic tricarboxylic acids, and derivatives thereof;
(ii) the alcohol (B) is a saturated aliphatic alcohol (B1) comprising a $C_9$ saturated aliphatic alcohol as a major component;
(iii) the saturated aliphatic alcohol (B1) comprises a linear $C_9$ saturated aliphatic alcohol (B1-1) of 60 wt % or more, and a branched $C_9$ saturated aliphatic alcohol (B1-2) of 40 wt % or less;
(iv) the linear-chain ratio of the alcohol (B1) is 60% or more; and
(v) the non-phthalate ester (C) does not substantially comprise a phthalate ester obtained by reacting a phthalic acid compound or a derivative thereof with an alkyl alcohol having 8 or fewer carbon atoms.

Item 2. The plasticizer for vinyl chloride-based resin according to Item 1, wherein the saturated aliphatic alcohol (B1) comprises the linear $C_9$ saturated aliphatic alcohol (B1-1) of 60 to 95 wt %, and the branched $C_9$ saturated aliphatic alcohol (B1-2) of 5 to 40 wt %.

Item 3. The plasticizer for vinyl chloride-based resin according to Item 2, wherein the saturated aliphatic alcohol (B1) comprises the linear $C_9$ saturated aliphatic alcohol (B1-1) of 70 to 90 wt %, and the branched $C_9$ saturated aliphatic alcohol (B1-2) of 10 to 30 wt %.

Item 4. The plasticizer for vinyl chloride-based resin according to any one of Items 1 to 3, wherein the polycarboxylic acid (A) is an alicyclic dicarboxylic acid or a derivative thereof.

Item 5. The plasticizer for vinyl chloride-based resin according to Item 4, wherein the polycarboxylic acid (A) is 1,2-cyclohexane dicarboxylic acid, 1,4-cyclohexane dicarboxylic acid, 4-cyclohexene-1,2-dicarboxylic acid, or a derivative of them.

Item 6. The plasticizer for vinyl chloride-based resin according to any one of Items 1 to 3, wherein the polycarboxylic acid (A) is an aromatic tricarboxylic acid or a derivative thereof.

Item 7. The plasticizer for vinyl chloride-based resin according to Item 6, wherein the polycarboxylic acid (A) is trimellitic acid or a derivative thereof.

Item 8. The plasticizer for vinyl chloride-based resin according to any one of Items 1 to 7, wherein the alcohol (B) is a saturated aliphatic alcohol (B2) produced by the steps of:
(1) producing a $C_9$ aldehyde compound by reacting 1-octene, carbon monoxide and hydrogen, and
(2) reducing the $C_9$ aldehyde compound.

Item 9. The plasticizer for vinyl chloride-based resin according to any one of Items 1 to 5, wherein the non-phthalate ester (C) is an ester obtained by reacting an aromatic dicarboxylic acid or a derivative thereof with the saturated aliphatic alcohol (B1) comprising a $C_4$ saturated aliphatic alcohol as a major component, and then performing nucleus hydrogenation of the obtained aromatic dicarboxylate ester.

Item 10. The plasticizer for vinyl chloride-based resin according to Item 8, wherein the non-phthalate ester (C) is an ester obtained by reacting an aromatic dicarboxylic acid or a derivative thereof with the saturated aliphatic alcohol (B2) obtained in Item 8, and then performing nucleus hydrogenation of the obtained aromatic dicarboxylate ester.

Item 11. The plasticizer for vinyl chloride-based resin according to any one of Items 1 to 10, further comprising a phenol-based antioxidant.

Item 12. The plasticizer for vinyl chloride-based resin according to Item 11,
wherein:
the amount of the phenol-based antioxidant is in a range of 0.1 to 0.6 parts by weight per 100 parts by weight of the non-phthalate ester (C);
the phenol-based antioxidant comprises electron-donating groups in at least two positions among the 2-position, 4-position and 6-position with respect to the hydroxy group in the phenol moiety, and at least one sterically hindered substituent at the 2-position or 6-position with respect to the hydroxy group in the phenol moiety;
the molecular weight of the phenol-based antioxidant is in a range of 300 to 3,000; and
the SP value of the phenol-based antioxidant calculated by the Fedors estimation method is in a range of 8 to 15.

Item 13. The plasticizer for vinyl chloride-based resin according to Item 11 or 12, wherein the molecular weight of the phenol-based antioxidant is in a range of 300 to 2,500.

Item 14. The plasticizer for vinyl chloride-based resin according to any one of Items 11 to 13, wherein the SP value of the phenol-based antioxidant is in a range of 8.5 to 14.

Item 15. The plasticizer for vinyl chloride-based resin according to any one of Items 11 to 14, wherein the phenol-based antioxidant is at least one compound selected from the group consisting of 3,9-bis[2-[3-(3-t-butyl-5-methyl-4-hydroxyphenyl)-propionyloxy]-1,1-dimethylethyl]-2,4,8,10-tetraoxaspiro[5.5]undecane; 1,1,3-tris(2-methyl-5-t-butyl-4-hydroxyphenyl)butane; tetrakis-[methylene-3-(3',5'-di-t-butyl-4'-hydroxyphenyl-propionate)]methane; 2,6-bis(2-hydroxy-3-t-butyl-5-methylbenzyl)-4-methylphenol; octadecyl-3-(3,5-di-t-butyl-4-hydroxyphenyl)propionate; or 1,3,5-tris(4-t-butyl-3-hydroxy-2,6-dimethylbenzyl)isocyanurate.

Item 16. The plasticizer for vinyl chloride-based resin according to any one of Items 11 to 15, wherein the content of the phenol-based antioxidant is 0.2 to 0.5 parts by weight per 100 parts by weight of the plasticizer for vinyl chloride-based resin.

Item 17. A vinyl chloride-based resin composition comprising the plasticizer for vinyl chloride-based resin of any one of Items 1 to 16, and a vinyl chloride-based resin.

Item 18. The vinyl chloride-based resin composition according to Item 17, wherein the amount of the plasticizer for vinyl chloride-based resin is 5 to 200 parts by weight, per 100 parts by weight of the vinyl chloride-based resin.

Item 19. The vinyl chloride-based resin composition according to Item 17 or 18, further comprising epoxidized vegetable oil.

Item 20. The vinyl chloride-based resin composition according to Item 19, wherein the amount of the epoxidized vegetable oil is 1 to 50 parts by weight, per 100 parts by weight of the vinyl chloride-based resin.

Item 21. The vinyl chloride-based resin composition according to any one of Items 17 to 20, further comprising at least one fatty acid metal salt selected from the group consisting of fatty acid calcium salts and fatty acid zinc salts.

Item 22. The vinyl chloride-based resin composition according to Item 21, wherein the amount of the fatty acid metal salt is 0.1 to 10 parts by weight, per 100 parts by weight of the vinyl chloride-based resin.

Item 23. The vinyl chloride-based resin composition according to any one of Items 17 to 22, wherein the vinyl chloride-based resin composition is used for a medical purpose.

Item 24. The vinyl chloride-based resin composition according to any one of Items 17 to 23, wherein the vinyl chloride-based resin composition is a composition for an automobile part.

Item 25. A vinyl chloride-based paste sol composition comprising the plasticizer for vinyl chloride-based resin of any one of Items 1 to 16, and a vinyl chloride-based resin for a paste.

Item 26. A vinyl chloride-based resin molded article obtained by molding the vinyl chloride-based resin composition of any one of Items 17 to 24, or the vinyl chloride-based paste sol composition of Item 25.

Item 27. A medical material formed of the vinyl chloride-based resin composition of any one of Items 17 to 24, or the vinyl chloride-based paste sol composition of Item 25.

Item 28. The medical material according to Item 27, wherein the medical material is resistant to a disinfection or sterilization treatment.

Item 29. A material for an automobile part formed of the vinyl chloride-based resin composition of any one of Items 17 to 22 and 24, or the vinyl chloride-based paste sol composition of Item 25.

Item 30. A method for improving ultraviolet resistance and radial ray resistance of a vinyl chloride-based resin by incorporating the plasticizer for vinyl chloride-based resin of any one of Items 1 to 16 in a vinyl chloride-based resin.

Item 31. A method for improving disinfection treatment resistance or sterilization treatment resistance of a vinyl chloride-based resin by incorporating the plasticizer for vinyl chloride-based resin of any one of Items 1 to 16 in a vinyl chloride-based resin.

Item 32. Use of the plasticizer for vinyl chloride-based resin of any one of Items 1 to 16 for improving ultraviolet resistance and radial ray resistance of a vinyl chloride-based resin.

Item 33. Use of the plasticizer for vinyl chloride-based resin of any one of Items 1 to 16 for improving disinfection treatment resistance or sterilization treatment resistance of a vinyl chloride-based resin.

Advantageous Effects of Invention

By incorporating the plasticizer for vinyl chloride-based resin of the present invention in a vinyl chloride-based resin, it is possible to provide a vinyl chloride-based resin composition with superior cold resistance, superior heat resistance, and desirable flexibility.

Further, by incorporating the plasticizer for vinyl chloride-based resin of the present invention in a vinyl chloride-based resin, it is possible to provide a vinyl chloride-based resin composition superior in fogging resistance, heat discoloration resistance, and weather resistance.

Further, by incorporating the plasticizer for vinyl chloride-based resin of the present invention in a vinyl chloride-based resin, it is possible to provide a vinyl chloride-based resin composition superior in cold resistance and volatility resistance, and desirable in flexibility, fogging resistance, heat discoloration resistance and weather resistance. Such a vinyl chloride-based resin composition is particularly suitable for automobile parts and the like requiring durability in outdoor use.

The vinyl chloride-based paste sol composition of the present invention has superior sol characteristics and sufficient heat resistance, cold resistance, and flexibility.

Since the vinyl chloride-based paste sol composition of the present invention has greatly improved molding processability, by molding the composition, it is possible to easily obtain a molded article superior in heat resistance, cold resistance, and flexibility.

The medical vinyl chloride-based resin composition of the present invention has superior cold resistance, superior heat resistance, and desirable flexibility, and does not suffer discoloration after a sterilization or disinfection treatment using ultraviolet or radial rays. Therefore, the medical vinyl chloride-based resin composition of the present invention is superior in ultraviolet resistance and radial ray resistance.

The medical material obtained by molding the vinyl chloride-based resin composition of the present invention is superior in cold resistance and heat resistance, desirable in flexibility, and does not suffer discoloration after a sterilization or disinfection treatment using ultraviolet or radial rays. Therefore, the medical material of the present invention is superior in ultraviolet resistance and radial ray resistance, and is thus safe for use.

DESCRIPTION OF EMBODIMENTS

1. Plasticizer for Vinyl Chloride Resin

The plasticizer for vinyl chloride-based resin of the present invention is a plasticizer for vinyl chloride-based resin comprising non-phthalate ester (C) obtained by reacting polycarboxylic acid (A) (which hereinafter may also be referred to as "acid component" or "component A") and alcohol (B) (which hereinafter may also be referred to as "alcohol component" or "component B"), wherein:
 (i) the polycarboxylic acid (A) is a polycarboxylic acid compound selected from the group consisting of alicyclic dicarboxylic acids, aromatic tricarboxylic acids, and derivatives thereof;
 (ii) the alcohol (B) is a saturated aliphatic alcohol (B1) comprising a $C_9$ saturated aliphatic alcohol as a major component;
 (iii) the saturated aliphatic alcohol (B1) contains a linear $C_9$ saturated aliphatic alcohol (B1-1) of 60 wt % or more, and a branched $C_9$ saturated aliphatic alcohol (B1-2) of 40 wt % or less;
 (iv) the linear-chain ratio of the alcohol (B1) is 60% or more; and
 (v) the non-phthalate ester (C) does not substantially contain a phthalate ester obtained by reacting a phthalic acid compound or a derivative thereof with an alkyl alcohol having 8 or fewer carbon atoms.

1-1. Polycarboxylic Acid (A)

Polycarboxylic acid (A) is a carboxylic acid compound selected from the group consisting of alicyclic dicarboxylic acids, aromatic tricarboxylic acids, and derivatives thereof.

The alicyclic dicarboxylic acids (which hereinafter may also be referred to as "A1") are not particularly limited, and examples include cyclohexane dicarboxylic acid, cyclohexene dicarboxylic acid, nadic acid, hydrogenated nadic acid, methylnadic acid, hydrogenated methylnadic acid, and the like. The alicyclic dicarboxylic acid contains stereoisomers (optical isomers), geometrical isomers, and the like.

Examples of cyclohexane dicarboxylic acid include cyclohexane-1,2-dicarboxylic acid, cyclohexane-1,3-dicarboxylic acid, cyclohexane-1,4-dicarboxylic acid, and 3-methyl-cyclohexane-1,2-dicarboxylic acid.

Examples of cyclohexene dicarboxylic acid include 4-cyclohexene-1,2-dicarboxylic acid, 4-cyclohexene-1,3-dicarboxylic acid, 2-cyclohexene-1,4-dicarboxylic acid, 4-methyl-4-cyclohexene-1,2-dicarboxylic acid, 1-cyclohexene-1,2-dicarboxylic acid, 2-cyclohexene-1,2-dicarboxylic acid, 3-cyclohexene-1,2-dicarboxylic acid, 1-cyclohexene-1,3-dicarboxylic acid, 3-cyclohexene-1,3-dicarboxylic acid, and 1-cyclohexene-1,4-dicarboxylic acid.

Examples of alicyclic dicarboxylic acid derivatives include anhydrides of the above alicyclic dicarboxylic acids and alkyl esters of the above alicyclic dicarboxylic acids. Examples of the alkyl esters include linear or branched $C_{1-6}$ alkyl esters, such as esters of methyl, ethyl, n-propyl, isopropyl, n-butyl, isobutyl, n-pentyl, isopentyl, n-hexyl, and isohexyl.

Among these, 1,2-cyclohexane dicarboxylic acid, 1,4-cyclohexane dicarboxylic acid, 4-cyclohexene-1,2-dicarboxylic acid, or derivatives thereof are preferably used as the alicyclic dicarboxylic acid.

These alicyclic dicarboxylic acid or derivatives thereof may be obtained from commercial suppliers, or may be produced according to a standard method.

The alicyclic dicarboxylic acids may be used solely or in a suitable combination of two or more kinds.

Examples of the aromatic tricarboxylic acid (which hereinafter may also be referred to as "A2") include trimellitic acid, hemimelitic acid, and trimesic acid.

Examples of aromatic tricarboxylic acid derivatives include anhydrides of aromatic tricarboxylic acids, esters of aromatic tricarboxylic acids, and the like. Examples of the alkyl esters include linear or branched $C_{1-6}$ alkyl esters, such as esters of methyl, ethyl, n-propyl, isopropyl, n-butyl, isobutyl, n-pentyl, isopentyl, n-hexyl, and isohexyl.

Among these, trimellitic acid or derivatives thereof are preferably used as the aromatic tricarboxylic acid.

These aromatic tricarboxylic acid or derivatives thereof may be obtained from commercial suppliers, or may be produced according to a standard method.

The aromatic tricarboxylic acids may be used solely or in a suitable combination of two or more kinds.

1-2. Alcohol (B)

Alcohol (B) used in the present invention is a saturated aliphatic alcohol (B1) (hereinafter referred to as "saturated aliphatic alcohol (B1)", "alcohol (B1)," or "B1") comprising a $C_9$ saturated aliphatic alcohol as a major component.

The content of the $C_9$ saturated aliphatic alcohol as a major component in alcohol (B1) is generally 60 wt % or more (60 to 100 wt %), preferably 65% or more (65 to 100 wt %), more preferably 70 wt % or more (70 to 100 wt %), particularly preferably 80% or more (80 to 100 wt %).

The alcohol (B1) contains a linear $C_9$ saturated aliphatic alcohol (B1-1) of 60 wt % or more, and a branched $C_9$ saturated aliphatic alcohol (B1-2) of 40 wt % or less.

The content of the linear $C_9$ saturated aliphatic alcohol (B1-1) (1-nonanol) in alcohol (B1) is preferably 60 to 95 wt %, more preferably 70 to 90 wt %.

The content of the branched $C_9$ saturated aliphatic alcohol (B1-2)(for example, 2-methyloctanol or the like) in alcohol (B1) is preferably 5 to 40 wt %, more preferably 10 to 30 wt %.

The linear-chain ratio of the alcohol (B1) is generally 60 wt % or more (60 to 100 wt %), preferably 60 to 95%, more preferably 70 to 90%.

In a more preferable embodiment of alcohol (B1) used in the present invention, alcohol (B1) contains a linear $C_9$ saturated aliphatic alcohol (B1-1) in a range of 60 to 95 wt % and a branched $C_9$ saturated aliphatic alcohol (B1-2) in a range of 5 to 40 wt %. In a further preferable embodiment, alcohol (B1) contains a linear $C_9$ saturated aliphatic alcohol (B1-1) in a range of 70 to 90 wt % and a branched $C_9$ saturated aliphatic alcohol (B1-2) in a range of 10 to 30 wt %.

The linear-chain ratio of alcohol (B1) is generally 60% or more. By also specifying the content of the linear $C_9$ saturated aliphatic alcohol to 60 wt % or more, improvement of heat resistance, which is an object of the present invention, can be sufficiently achieved without decreasing flexibility, cold resistance, and the like. In contrast, when the linear-chain ratio of alcohol (B1) is less than 60%, or the content of the linear $C_9$ saturated aliphatic alcohol is less than 60 wt %, improvement of heat resistance, which is an object of the present invention, will be insufficient, and flexibility, cold resistance, and the like will decrease.

Further, although sufficient performances including flexibility, cold resistance, heat resistance, and the like, which are objects of the present invention, can be ensured as long as the linear-chain ratio of alcohol (B1) and the content of the linear $C_9$ saturated aliphatic alcohol are within the above ranges, by further specifying the linear-chain ratio of alcohol (B1) in a range of 60 to 95% and specifying the content of the $C_9$ linear saturated alcohol in a range of 60 to 95 wt %, the mixing with a vinyl chloride-based resin becomes further easier. As a result, the process window upon the molding step can be enlarged, thereby not only simplifying the molding but also effectively suppressing generation of defective products upon the molding step.

In the present specification and claims, the linear-chain ratio of alcohol (B1) is a proportion (weight ratio) of the linear saturated aliphatic alcohol in saturated aliphatic alcohol (B1), in other words, the proportion of linear alcohol in a $C_{7-11}$ alcohol. Specifically, the linear-chain ratio of alcohol may be found by an analysis method using gas chromatography, as detailed later.

The alcohol (B) used in the present invention may be obtained from commercial suppliers. Further, for example, alcohol (B) may also be produced by performing (1) a step of producing a $C_9$ aldehyde compound by reacting 1-octene, carbon monoxide, and hydrogen (which hereinafter may also be referred to as "Step (1)"); and (2) a step of reducing the $C_9$ aldehyde compound (which hereinafter may also be referred to as "Step 2").

Step (1)

Step (1) is a step of producing a $C_9$ aldehyde by reacting 1-octene, carbon monoxide, and hydrogen (hydroformylation step). Step (1) may be performed in the presence of, for example, a transition metal carbonyl compound.

The transition metal is not particularly limited. Examples of transition metal include periodic table groups 3 to 12 transition metals, such as periodic table group 3 metal (e.g., Sc), periodic table group 4 metal (e.g., Ti), periodic table group 5 metal (e.g., V), periodic table group 6 metal (e.g., Cr, Mo, W), periodic table group 7 metal (e.g., Mn, Tc, Re), periodic table group 8 metal (e.g., Fe, Ru, Os), periodic table group 9 metal (e.g., Co, Rh, Ir), periodic table group 10 metal (e.g., Ni, Pd, Pt), periodic table group 11 metal (e.g., Cu, Ag), or periodic table group 12 metal (e.g., Zn). Among these, periodic table group 9 transition metals are preferable, and Co and Rh are more preferable. The valence of the metal is not particularly limited, and is about 1 to 8, preferably about 1 to 6 (more preferably 1 to 4). These metals may be used solely or in a combination of two or more.

The transition metal carbonyl compound may further be modified with a ligand. The ligand is not particularly limited, and examples include hydrogen atom; hydroxo (OH); alkoxyl groups (e.g., methoxy, ethoxy, propoxy, butoxy); acyl groups (e.g., acetyl, propionyl); alkoxycarbonyl groups (e.g., methoxycarbonyl(acetato), ethoxycarbonyl); acetylacetonato; halogen atoms (e.g., fluorine, chlorine, bromine, iodine); pseudohalogen groups (e.g., CN, thiocyanate (SCN), selenocyanate (SeCN); tellurocyanate (TeCN); $SCSN_3$; OCN, ONC, azide ($N_3$)), oxygen atom; $H_2O$; phosphorus compounds (e.g., phosphine (triarylphosphine such as triphenylphosphine, trialkyl phosphine such as trioctyl phosphine), phosphinite, phosphonite, phosphite, phosphine oxide), and nitrogen-containing compounds (e.g., $NH_3$(ammine), NO, $NO_2$ (nitro), $NO_3$ (nitrato), triethylamine, ethylenediamine, diethylenetriamine, pyridine, indole, phenanthroline).

The amount of the transition metal is not particularly limited. For example, when the hydroformylation step is performed using a Co-based catalyst, the Co concentration is generally 0.01 to 20 wt %, preferably 0.02 to 15 wt %, more preferably 0.05 to 10 wt % on a Co atom basis.

The reaction temperature is not particularly limited. For example, the reaction temperature is 50 to 250° C., preferably 60 to 200° C., more preferably 80 to 180° C.

The reaction pressure is not particularly limited. For example, the reaction pressure is 10 to 350 kg/cm²G, preferably 25 to 325 kg/cm²G, more preferably 50 to 300 kg/cm²G.

The ratio (volume ratio) between hydrogen and carbon monoxide used in Step (1) is not particularly limited. For example, the ratio is 0.1 to 10, preferably 0.3 to 5, more preferably 0.5 to 4.

Although a solvent is generally not required in Step (1), an organic solvent inactive to the reaction may be used.

Examples of the solvent include aromatic hydrocarbon solvents such as benzene, toluene, xylene, or ethyl benzene; alkane solvents such as pentane, hexane, or heptane; ether solvents such as diethylether, dioxane, tetrahydrofuran, ethylene glycol dimethyl ether, or tetra ethylene glycol dimethyl ether; ketone solvents such as acetone, methyl ethyl ketone, diethyl ketone, methyl isopropyl ketone, or ethyl-n-butyl ketone; and alcohol solvents such as methanol, ethanol, n-propanol, isopropanol, n-butanol, isobutanol, t-butanol, or n-alkanol. Further, as a solvent, it is possible to use a liquid aldehyde identical to the liquid aldehyde produced during the reaction, a liquid aldehyde having a carbon number different from that of the liquid aldehyde, a liquid aldehyde condensation product produced during the reaction, or a condensation product of aldehyde having a different carbon number. Furthermore, as a solvent, an excessive amount of an olefinic compound, which is the starting material, may be used. As the solvent used here, a single solvent or a combination of two or more solvents may be used.

Step (2)

Step (2) is a step of reducing the $C_9$ aldehyde compound (which hereinafter may also be referred to as a "reduction step").

The reduction step in step (2) is not particularly limited. For example, the reduction step may be performed by hydrogenating the $C_9$ aldehyde compound. Examples of the hydrogenation method include a method of hydrogenating the $C_9$ aldehyde with pressurized hydrogen in the presence of a hydrogenation catalyst.

The hydrogenation catalyst is not particularly limited, and examples include periodic table group 10 transition metal catalysts (Ni, Pd, Pt, or the like), solid-reducing catalyst containing copper oxide and zinc oxide, copper-chromium-based catalyst, and copper-chromium-manganese-barium-based catalyst. The amount of the hydrogenation catalyst is not particularly limited.

The reaction temperature is not particularly limited. The reaction temperature is, for example, 25 to 250° C., preferably 50 to 225° C., more preferably 100 to 200° C.

The reaction pressure is not particularly limited. The reaction pressure is, for example, 1 to 350 atm, preferably 20 to 325 atm, more preferably 30 to 300 atm.

The resulting crude alcohol may be further purified by distillation using a rectifying column. The distillation purification of the crude alcohol is performed using a distillation column having a theoretical plate number of 3 to 50 with a column top pressure of 0.1 mmHg to 760 mmHg and a column top temperature of 50 to 220° C. If necessary, it is also possible to adjust the alcohol formulation, for example, by adjusting the obtained amounts of distillates when performing the distillation purification, or by separately collecting distillates and suitably mixing the separate fractions of distillates.

Specific examples (commercially available products) of saturated aliphatic alcohol (B2) containing, as a major component, the $C_9$ saturated aliphatic alcohol obtained in step (2) above include Linevol 9 (product name, Shell Chemicals), which is a mixture of 70 wt % or more of linear nonanol and 30 wt % or less of branched-chain nonanol. Linevol 9 is also an example of alcohol (B1) above.

1-3. Method for Producing Non-Phthalate Ester (C)

The non-phthalate ester (C) of the present invention is obtained by reacting polycarboxylic acid (A) and alcohol (B), which are described above (non-phthalate ester production method I). The method for producing the non-phthalate ester (C) is not particularly limited insofar as the production can be performed by an esterification reaction of polycarboxylic acid (A) and alcohol (B), or an ester exchange reaction of the ester moieties of polyvalent carboxylate esters. Various known esterification reactions and ester exchange reactions may be used.

Esterification Reaction

When polycarboxylic acid (A) is an alicyclic dicarboxylic acid or a derivative thereof, the amount of alcohol (B) is, for example, generally 2 mol to 5 mol, preferably in a range of 2.01 mol to 4 mol, more preferably in a range of 2.02 mol to 3 mol, particularly preferably in a range of 2.03 mol to 2.5 mol, per mol of the alicyclic dicarboxylic acid or a derivative thereof.

When polycarboxylic acid (A) is an aromatic tricarboxylic acid or a derivative thereof, the amount of alcohol (B) is generally 3 mol to 5 mol, preferably in a range of 3.01 to 4 mol, more preferably in a range of 3.02 to 3.8 mol, particularly preferably in a range of 3.03 to 3.6 mol, per mol of the aromatic tricarboxylic acid or a derivative thereof.

A catalyst may be used in the esterification reaction. Examples of the esterification catalyst include mineral acids, organic acids, and Lewis acids. More specifically, examples of mineral acids include sulfuric acid, hydrochloric acid, and phosphoric acid. Examples of organic acids include p-toluenesulfonic acid and methanesulfonic acid. Examples of Lewis acids include aluminum derivatives, tin derivative, titanium derivatives, lead derivatives, and zinc derivatives. The above catalysts may be used solely or in a suitable combination of two or more kinds.

Among these catalysts, particularly preferable as catalysts are p-toluenesulfonic acid or like organic acids, $C_{3-8}$ tetraalkyltitanate; titanium oxide; titanium hydroxide; $C_{3-12}$ fatty acid tin; tin oxide; tin hydroxide; zinc oxide; zinc hydroxide; lead oxide; lead hydroxide; aluminum oxide; aluminum hydroxide, and like Lewis acids.

The amount of the catalyst is not particularly limited. For example, the amount of the catalyst is preferably 0.01 to 5.0 wt %, more preferably 0.02 to 4 wt %, particularly preferably 0.03 to 3 wt %, based on the total weight of the acid component and the alcohol component, which are raw materials of the esterification reaction.

The reaction temperature of the esterification reaction is, for example, 100° C. to 230° C. The esterification reaction is generally completed in 3 to 30 hours.

The type of the polycarboxylic acid to be used as a raw material of the esterification reaction is not particularly limited, and may be obtained from commercial suppliers. Further, in terms of esterification reaction, use of the anhydrides of alicyclic dicarboxylic acid or anhydrides of aromatic tricarboxylic acid described above is most recommended.

In the esterification reaction, water-entraining agents such as benzene, toluene, xylene, or cyclohexane may be used so as to promote distillation of water generated by the reaction.

Further, if an oxide, peroxide, carbonyl compound, or like oxygen-containing organic compound is generated when the esterification reaction is performed due to oxidation degradation of the raw material, the generated ester, and the organic solvent (water-entraining agent), it will adversely affect the heat resistance, weather resistance, and the like. Therefore, the esterification reaction is preferably performed under atmospheric or reduced pressure in a system in a nitrogen gas or like inert gas atmosphere or inert gas current. After the esterification reaction is completed, it is recommended to distill off excessive raw material under reduced or atmospheric pressure.

The non-phthalate ester obtained in the above esterification reaction may be subsequently purified as necessary generally through a base treatment (e.g., neutralization treatment), a water-washing treatment, liquid-liquid extraction, distillation (e.g., depressurization or dehydration treatment), adsorption (e.g., silica gel chromatography), and the like.

The base used for the base treatment is not particularly limited insofar as it is a basic compound. Examples of the base include sodium hydroxide and sodium carbonate.

The adsorption agents to be used for the adsorption purification are not particularly limited, and examples include activated carbon, activated clay, activated alumina, hydrotalcite, silica gel, silica alumina, zeolite, magnesia, calcia, and diatomaceous earth. These adsorption agents may be used solely or in a suitable combination of two or more kinds.

The above treatment may be performed at normal temperature or under heating at about 40 to 90° C.

Ester Exchange Reaction

The ester exchange reaction of the ester moiety of a polyvalent carboxylate ester means, for example, an ester exchange reaction of alcohol (B1) component and an acid component, i.e., a lower alkyl ester of an alicyclic dicarboxylic acid (corresponding to a derivative of alicyclic dicarboxylic acid) or a lower alkyl ester of an aromatic tricarboxylic acid (corresponding to a derivative of aromatic tricarboxylic acid).

In the case of the lower alkyl ester of an alicyclic dicarboxylic acid, the amount of alcohol (B1) component is, for example, preferably 2 mol to 5 mol, more preferably 2.01 mol to 3 mol, particularly preferably 2.02 mol to 2.50 mol, per mol of the lower alkyl ester of alicyclic dicarboxylic acid.

In the case of the lower alkyl ester of an aromatic tricarboxylic acid, the amount of alcohol (B1) component is, for example, preferably 3 mol to 5 mol, preferably 3.01 to 4 mol, more preferably 3.02 to 3.8 mol, per mol of the lower alkyl ester of alicyclic dicarboxylic acid.

When a catalyst is used in the ester exchange reaction, examples of the catalyst include Lewis acids, alkali metals, and the like. More specifically, examples of Lewis acids include aluminum derivatives, tin derivatives, titanium derivatives, lead derivatives, and zinc derivatives; and examples of alkali metals include sodium alkoxide, potassium alkoxide, sodium hydroxide, and potassium hydroxide. These catalysts may be used solely or in a suitable combination of two or more kinds.

Among these, $C_{3-8}$ tetraalkyltitanate, titanium oxide, titanium hydroxide, $C_{1-4}$ sodium alkoxide, sodium hydroxide, $C_{3-12}$ fatty acid tin, tin oxide, tin hydroxide, zinc oxide, zinc hydroxide, lead oxide, lead hydroxide, aluminum oxide, aluminum hydroxide are preferable. The amount of the catalyst is, for example, preferably 0.0001 to 5 wt %, more preferably 0.0002 to 4 wt %, particularly preferably 0.0003 to 3 wt %, based on the total weight of the acid component and the alcohol component as ester synthesis raw materials.

The temperature of the ester exchange reaction is, for example, 100° C. to 230° C. The ester exchange reaction is generally completed in 3 to 30 hours.

The acid component as a raw material of the above ester exchange reaction is preferably dimethyl cyclohexane dicarboxylate; however, the acid component is not particularly limited insofar as the ester exchange reaction with the alcohol component proceeds. For example, a $C_{2-4}$ lower alkyl ester may also be used.

In the ester exchange reaction, entrainers or entraining agents such as benzene, toluene, xylene, or cyclohexane may be used so as to promote distillation of water or lower alcohol such as methanol generated by the reaction.

If an oxide, peroxide, carbonyl compound, or like oxygen-containing organic compound is generated when the ester exchange reaction is performed due to oxidation degradation of the raw material, the generated ester, and the organic solvent (water-entraining agent), it will adversely affect the heat resistance, weather resistance, and the like. Therefore, in order to suppress such an adverse effect, the ester exchange reaction is preferably performed under atmospheric or reduced pressure in a system in a nitrogen gas or like inert gas atmosphere or inert gas current. After the ester exchange reaction is completed, generally, an excessive raw material is distilled off under reduced or atmospheric pressure.

The non-phthalate ester (C) obtained in the ester exchange reaction is generally post-treated subsequently for purification. For example, non-phthalate ester (C) may be purified through a treatment method used in the related technical field, such as a catalyst inactivation treatment (neutralization treatment, base treatment, acid treatment, or the like), a water-washing treatment, liquid-liquid extraction, distillation (depressurization or dehydration treatment), or adsorption purification, using a single method or by combining two or more methods.

The base used for the base treatment is not particularly limited insofar as it is a basic compound. Examples include sodium hydroxide and sodium carbonate.

Examples of the adsorption agents to be used for the adsorption purification include activated carbon, activated clay, activated alumina, hydrotalcite, silica gel, silica alumina, zeolite, magnesia, calcia, and diatomaceous earth. These adsorption agents may be used solely or in a suitable combination of two or more kinds.

The above treatment may be performed at normal temperature or under heating at about 40 to 95° C.

Further, among non-phthalate esters (C), an alicyclic dicarboxylate ester may be obtained by a method of reacting an aromatic dicarboxylic acid or a derivative thereof with saturated aliphatic alcohol (B1) containing a $C_9$ saturated aliphatic alcohol as a major component, and then performing nucleus hydrogenation of the obtained aromatic dicarboxylate ester (nucleus-hydrogenation reaction) (non-phthalate ester production method II).

Further, an alicyclic dicarboxylate ester may also be obtained by a method of reacting an aromatic dicarboxylic acid or a derivative thereof with saturated aliphatic alcohol (B2), and then performing nucleus hydrogenation of the obtained aromatic dicarboxylate ester (non-phthalate ester production method III).

Non-phthalate ester production method II or III means an esterification reaction or ester exchange reaction of an alcohol component and an aromatic dicarboxylic acid or a derivative thereof as an acid component. In the esterification reaction or ester exchange reaction, the amount of the alcohol component is, for example, preferably 2 to 5 mol, more preferably 2.01 to 3 mol, particularly preferably 2.02 to 2.50 mol, per mol of the aromatic dicarboxylic acid or a derivative thereof.

When a catalyst is used in the esterification reaction, examples of the catalysts include the esterification catalysts listed above. The amount of the esterification catalyst is the same as the amount of the esterification catalyst described above.

The reaction temperature of the esterification reaction is, for example, 100° C. to 230° C. The esterification reaction is generally completed in 3 to 30 hours.

The aromatic dicarboxylic acid or a derivative thereof is not particularly limited. Examples include phthalic acid or acid anhydrides thereof, isophthalic acid or acid anhydrides thereof, and terephthalic acid or acid anhydrides thereof. They may be produced by a known method, or may be obtained as commercially available products, reagents, or the like.

Examples of aromatic dicarboxylic acid derivatives include not only acid anhydrides of aromatic dicarboxylic acid but also lower alkyl esters or the like of aromatic dicarboxylic acid. Examples of the lower alkyl include $C_{1-6}$ alkyls.

Ester Exchange Reaction

The ester exchange reaction of the present invention means an ester exchange reaction of alcohol (B1) component and a lower alkyl ester of an aromatic dicarboxylic acid (corresponding to a derivative of aromatic dicarboxylic acid) as an acid component. In the ester exchange reaction, the amount of the alcohol component is, for example, preferably 2 mol to 5 mol, more preferably 2.01 mol to 3 mol, particularly preferably 2.02 mol to 2.50 mol, per mol of the lower alkyl ester of aromatic dicarboxylic acid.

When a catalyst is used in the ester exchange reaction, examples of the catalyst include Lewis acids, alkali metals, and the like. More specifically, examples of Lewis acids include aluminum derivatives, tin derivatives, titanium derivatives, lead derivatives, and zinc derivatives; and examples of alkali metals include sodium alkoxide, potassium alkoxide, sodium hydroxide, and potassium hydroxide. These catalysts may be used solely or in a suitable combination of two or more kinds.

Among these, $C_{3-8}$ tetraalkyltitanate, titanium oxide, titanium hydroxide, $C_{1-4}$ sodium alkoxide, sodium hydroxide, $C_{3-12}$ fatty acid tin, tin oxide, tin hydroxide, zinc oxide, zinc hydroxide, lead oxide, lead hydroxide, aluminum oxide, aluminum hydroxide are preferable.

The amount of the catalyst is, for example, preferably 0.0001 to 5 wt %, more preferably 0.0002 to 4 wt %, particularly preferably 0.0003 to 3 wt %, based on the total weight of the acid component and the alcohol component as ester synthesis raw materials.

The temperature of the ester exchange reaction is, for example, 100° C. to 230° C. The ester exchange reaction is generally completed in 3 to 30 hours.

The acid component as a raw material of the above ester exchange reaction is preferably dimethylbenzene dicarboxylate; however, the acid component is not particularly limited insofar as the ester exchange reaction with the alcohol component proceeds. For example, a $C_{2-4}$ lower alkyl ester may also be used.

In the esterification reaction or ester exchange reaction, entrainers or entraining agents such as benzene, toluene, xylene, or cyclohexane may be used so as to promote distillation of water or lower alcohol such as methanol generated by the reaction.

If an oxide, peroxide, carbonyl compound, or like oxygen-containing organic compound is generated when the esterification reaction or ester exchange reaction is performed due to oxidation degradation of the raw material, the generated ester, and the organic solvent (water-entraining agent), it will adversely affect the heat resistance, weather resistance, and the like. Therefore, in order to suppress such an adverse effect, the reaction is preferably performed under atmospheric or reduced pressure in a system in a nitrogen gas or like inert gas atmosphere or inert gas current. After the esterification reaction or ester exchange reaction is completed, generally, an excessive raw material is distilled off under reduced or atmospheric pressure.

The benzene dicarboxylate diester obtained in the esterification reaction or ester exchange reaction is generally post-treated subsequently for purification. For example, the benzene dicarboxylate diester may be purified through a treatment method used in the related technical field, such as a catalyst inactivation treatment (neutralization treatment, base treatment, acid treatment, or the like), a water-washing treatment, liquid-liquid extraction, distillation (depressurization or dehydration treatment), or adsorption purification, using a single method or by combining two or more methods.

The base used for the base treatment is not particularly limited insofar as it is a basic compound. Examples include sodium hydroxide and sodium carbonate.

Examples of the adsorption agents to be used for the adsorption purification include activated carbon, activated clay, activated alumina, hydrotalcite, silica gel, silica alumina, zeolite, magnesia, calcia, and diatomaceous earth. These adsorption agents may be used solely or in a suitable combination of two or more kinds.

The above treatment may be performed at normal temperature or under heating at about 40 to 95° C.

Nucleus-Hydrogenation Reaction

A nucleus-hydrogenation reaction means a hydrogenation reaction of the benzene ring in the benzene dicarboxylic acid diester obtained by the esterification reaction or ester exchange reaction. The method of hydrogenation reaction is not particularly limited insofar as it enables nucleus hydrogenation. In view of selectivity and the like, for example, a hydrogenation reaction using a noble-metal-based hydrogenation catalyst is recommended.

Examples of nucleus hydrogenation catalyst include Ni, Pd, Pt, Ru, and Rh. These catalysts may be used solely or in a suitable combination of two or more. Among these catalysts, Ru is particularly preferable in view of reducing production costs of the aromatic dicarboxylate diester obtained by the reaction.

Generally, a catalyst in which a metal is supported by a carrier is used as the above catalyst. Examples of carriers include activated carbon, alumina, silica, zirconia, titania, magnesia, dichromium trioxide, diatomaceous earth, and zeolite. These carriers may be used solely or in a combination of two or more kinds. Among these, activated carbon and alumina are particularly preferable.

Examples of the nucleus-hydrogenation catalyst include Ru/alumina, Ru/silica, Ru/activated carbon, Ru/diatamaceous earth, Rh/alumina, Rh/silica, Rh/activated carbon, Rh/diatomaceous earth, Pd/alumina, Pd/silica, Pd/activated carbon, Pd/diatomaceous earth, Pt/alumina, Pt/silica, Pt/activated carbon, Pt/diatomaceous earth, Ni/alumina, Ni/silica, Ni/activated carbon, and Ni/diatomaceous earth. Among these, Pd/activated carbon, Pd/alumina, Ru/activated carbon, and Ru/alumina are particularly preferable. The amount of the nucleus-hydrogenation catalyst is, for example, 0.005 wt % to 20 wt %, preferably 0.01 to 10 wt %, based on the weight of the phthalate diester used as a raw material.

A powdery catalyst is used for a nucleus hydrogenation reaction using a suspended bed, and a molded catalyst is used for a nucleus hydrogenation reaction using a fixed bed. For a powdery catalyst, the content of the metal is preferably 1 to 20 wt % (relative to the carrier). For a molded catalyst, the content of the metal is preferably 0.01 to 1 wt % (relative to the carrier). The conditions used for the nucleus hydrogenation are, for example, the conditions disclosed in "Jitsuyo-betu hannou shokubai (practical catalyst for each type of reaction)" (supervised by Kimio TARAMA, published by Kagaku-kogyo sha) or the like.

Specifically, for example, the reaction temperature ranges from room temperature to 250° C., the reaction pressure ranges from atmospheric pressure to 20 MPa, and the reaction time ranges from 30 minutes to 10 hours. The conditions are not particularly limited and may vary depending on the catalyst used for the reaction. However, preferably, it is recommended that the reaction temperature be 80° C. to 200° C., the reaction pressure be 5 to 15 MPa, and the reaction time be 1 to 8 hours.

For the reaction form of the hydrogenation, fixed bed continuous reactors, fixed bed batch reactors, or suspended bed batch reactors may be used. Further, gas phase reaction, liquid phase reaction, or gas-liquid phase reaction may be used.

In the nucleus-hydrogenation reaction, the target ester or an alcohol corresponding to the alcohol moiety constituting the ester may be used as a reaction solvent.

The resulting cyclohexane dicarboxylate diester includes cis-isomers and trans-isomers. Any of these isomers may be used for the applications of the vinyl chloride-based resin composition.

In the cyclohexane dicarboxylate diester obtained by the nucleus hydrogenation, small amounts of various impurities are contained during the production step. Therefore, the cyclohexane dicarboxylate diester is preferably purified through a treatment method used in a related technical field, such as distillation (depressurization or dealcoholization treatment), adsorption purification treatment, or the like. These treatment methods may be performed solely or in a suitable combination.

Examples of the adsorption agents to be used for the adsorption purification include activated carbon, activated clay, activated alumina, hydrotalcite, silica gel, silica alumina, zeolite, magnesia, calcia, and diatomaceous earth. These adsorption agents may be used solely or in a suitable combination of two or more kinds.

The above treatment may be performed at normal temperature or under heating at about 40 to 95° C.

1-4. Phenol-Based Antioxidant

The plasticizer for vinyl chloride-based resin of the present invention may further contain a phenol-based antioxidant in addition to non-phthalate ester (C).

The phenol-based antioxidant is not particularly limited insofar as it is a known antioxidant.

When a phenol-based antioxidant is used, in terms of antioxidant property, heat discoloration resistance, and weather resistance, it is preferable to use a phenol-based antioxidant having an electron-donating substituent at the 2-position, 4-position, or 6-position, and a sterically hindered substituent at 2-position, or 6-position, with respect to the hydroxy group in the phenol moiety. Further, in terms of volatility resistance, it is preferable to use a phenol-based antioxidant having a molecular weight of 300 or more, preferably 350 or more, more preferably 400 or more. Further, in terms of compatibility of plasticizer and vinyl chloride-based resin, it is preferable to use a phenol-based antioxidant having a SP value, which is calculated by the Fedors estimation method, in a range of 8 to 15, preferably in a range of 8.5 to 14, more preferably in a range of 9 to 13.5, and a molecular weight of 3,000 or less, preferably 2,500 or less, more preferably 2,000 or less.

Commonly used phenol-based antioxidants for plastics satisfying the above conditions may be used solely or in a combination of two or more kinds.

The SP value of the present invention is a solubility parameter that is defined according to the regular solution theory introduced by Hildebrand. The SP value is denoted by the square root of the cohesive energy density of the solvent (or solute). The SP value provides an indication of the solubility of a two-component solution. Examples of methods for calculating the SP value include a calculation method based on vaporization heat, a calculation method based on chemical composition, and a measurement method based on compatibility with a substance whose SP value is already known. The SP value of the present invention is a value calculated according to Fedors equation based on vaporization heat and a molar volume of atoms or atomic group, as disclosed in "Coating no kiso to kougaku" (basics and engineering of coating) (page 53, Yuji HARAZAKI, published by the Converting Technical Institute).

Examples of the phenol-based antioxidant include 2,6-diphenyl-4-octadesiloxyphenol, 4,4'-methylenebis(2,6-di-t-butylphenol), 2-[1-(2-hydroxy-3,5-di-t-pentylphenyl)ethyl]-4,6-di-t-pentylphenyl acrylate, triethylene glycol-bis[3-(3-t-butyl-5-methyl-4-hydroxyphenyl)propionate], 1,6-hexanediol-bis[3-(3,5-di-t-butyl-4-hydroxyphenyl) propionate], 3,9-bis[2-[3-(3-t-butyl-5-methyl-4-hydroxyphenyl)-propionyloxy]-1,1-dimethylethyl]-2,4,8,10-tetraoxaspiro[5.5]undecane, 1,1,3-tris(2-methyl-5-t-butyl-4-hydroxyphenyl) butane, 2,4,6-tris(3,5-di-t-butyl-4-hydroxybenzyl)mesitylene, tetrakis-[methylene-3-(3',5'-di-t-butyl-4'-hydroxyphenyl)propionate]methane, bis[3,3-bis-(3'-t-butyl-4'-hydroxyphenyl)butyric acid]ethylene glycol ester, 2,6-bis(2-hydroxy-3-t-butyl-5-methylbenzyl)-4-methylphenol, bis[2-t-butyl-4-methyl-6-(2-hydroxy-3-t-butyl-5-methylbenzyl)phenyl]terephthalate, octadecyl-3-(3,5-di-t-butyl-4-hydroxyphenyl)propionate, α-tocopherol, β-tocopherol, γ-tocopherol, α-tocotrienol, β-tocotrienol, γ-tocotrienol, dodecyl gallate, hexadecyl gallate, stearyl gallate, 3-(4-hydroxy-3,5-diisopropylphenyl)octyl propionate, 2,4-dimethyl-6-(1-methylpentadecyl)-phenol, 2,2'-methylenebis(4-methyl-6-t-butylphenol), 2,2'-methylenebis(4-ethyl-6-t-butylphenol), 4,4'-butylidenebis(3-methyl-6-t-butylphenol), nordihydroguaiaretic acid, 2,2'-methylenebis [4-methyl-6-nonylphenol], 2,2'-methylenebis[6-(1-methylcyclohexyl)-4-methylphenol], 2,2'-[(2-hydroxy-5-methylbenzene-1,3-diyl)dimethanediyl]bis(4-methyl-6-nonylphenol), 2,2'-thiodiethylbis[3-(3,5-di-t-butyl-4-hydroxyphenyl)propionate], 4,4'-thiobis(2-t-butyl-5-methylphenol), 2-hydroxy-4-n-octyloxybenzophenone, 2-(2'-hydroxy-3'-t-butyl-5'-methyl phenyl) 5-chlorobenzotriazole, 2-t-butyl-6-(3-t-butyl-2-hydroxy-5-methylbenzyl)-4-methyl phenyl acrylate, N,N'-(1,6-hexanediyl)bis[3-(3,5-di-t-butyl-4-hydroxyphenyl)propionamide], 1,3,5-tris(3,5-di-t-butyl-4-hydroxybenzyl) isocyanurate, 1,3,5-tris(4-t-butyl-3-hydroxy-2,6-dimethylbenzyl)isocyanurate, 2,2'-ethylidenebis(4,6-di-t-butylphenol), 2,2'-ethylidenebis(4-s-butyl-6-t-butylphenol), 1,3,5-tris[(3,5-di-t-butyl-4-hydroxyphenyl)propionyloxyethyl]isocyanurate, and curcumin.

More preferable examples include phenol-based antioxidants such as 2,6-diphenyl-4-octadesiloxyphenol, 4,4'-methylenebis(2,6-di-t-butylphenol), 2-[1-(2-hydroxy-3,5-di-t-pentylphenyl)ethyl]-4,6-di-t-pentylphenyl acrylate, triethylene glycol-bis[3-(3-t-butyl-5-methyl-4-hydroxyphenyl) propionate], 1,6-hexanediol-bis[3-(3,5-di-t-butyl-4-hydroxyphenyl)propionate], 3,9-bis[2-[3-(3-t-butyl-5-methyl-4-hydroxyphenyl)-propionyloxy]-1,1-dimethylethyl]-2,4,8,10-tetraoxaspiro[5.5]undecane, 1,1,3-tris(2-methyl-5-t-butyl-4-hydroxyphenyl)butane, 2,4,6-tris(3,5-di-t-butyl-4-hydroxybenzyl)mesitylene, tetrakis-[methylene-3-(3',5'-di-t-butyl-4'-hydroxyphenyl-propionate)]methane, bis[3,3-bis-(3'-t-butyl-4'-hydroxyphenyl)butyric acid]ethylene glycol ester, 2,6-bis(2-hydroxy-3-t-butyl-5-methylbenzyl)-4-methylphenol, bis[2-t-butyl-4-methyl-6-(2-hydroxy-3-t-butyl-5-methylbenzyl)phenyl]terephthalate, octadecyl-3-(3,5-di-t-butyl-4-hydroxyphenyl)propionate, α-tocopherol, α-tocotrienol, 3-(4-hydroxy-3,5-diisopropylphenyl)octyl propionate, 2,2'-methylenebis(4-ethyl-6-t-butylphenol), 4,4'-butylidenebis(3-methyl-6-t-butylphenol), 2,2'-methylenebis[4-methyl-6-nonylphenol], 2,2'-methylenebis[6-(1-methylcyclohexyl)-4-methylphenol], 2,2'-[(2-hydroxy-5-methylbenzene-1,3-diyl)dimethanediyl]bis(4-methyl-6-nonylphenol), 2,2'-thiodiethylbis[3-(3,5-di-t-butyl-4-hydroxyphenyl)propionate], 4,4'-thiobis(2-t-butyl-5-methylphenol), 2-t-butyl-6-(3-t-butyl-2-hydroxy-5-methylbenzyl)-4-methyl phenyl acrylate, N,N'-(1,6-hexanediyl)bis[3-(3,5-di-t-butyl-4-hydroxyphenyl) propionamide], 1,3,5-tris(3,5-di-t-butyl-4-hydroxybenzyl) isocyanurate, 1,3,5-tris(4-t-butyl-3-hydroxy-2,6-dimethylbenzyl) isocyanurate, 2,2'-ethylidenebis(4,6-di-t-butylphenol), 2,2'-ethylidenebis(4-s-butyl-6-t-butylphenol), or 1,3,5-tris[(3,5-di-t-butyl-4-hydroxyphenyl) propionyloxyethyl]isocyanurate. Most preferable examples include phenol-based antioxidants such as 3,9-bis[2-[3-(3-t-butyl-5-methyl-4-hydroxyphenyl)-propionyloxy]-1,1-dimethylethyl]-2,4,8,10-tetraoxaspiro[5.5]undecane, 1,1,3-tris(2-methyl-5-t-butyl-4-hydroxyphenyl)butane, tetrakis-[methylene-3-(3',5'-di-t-butyl-4'-hydroxyphenyl-propionate)]methane, 2,6-bis(2-hydroxy-3-t-butyl-5-methylbenzyl)-4-methylphenol, octadecyl-3-(3,5-di-t-butyl-4-hydroxyphenyl)propionate, or 1,3,5-tris(4-t-butyl-3-hydroxy-2,6-dimethylbenzyl)isocyanurate.

The content of the phenol-based antioxidant is generally in a range of 0.1 to 0.6 parts by weight, preferably 0.2 to 0.5 parts by weight, more preferably 0.3 to 0.4 parts by weight, per 100 parts by weight of non-phthalate ester (C).

Any method may be used to mix the phenol-based antioxidant with the plasticizer for vinyl chloride-based resin of the present invention, insofar as the effects of the present invention are exerted. For example, by blending the phenol-based antioxidant with the plasticizer (non-phthalate ester) components, and mixing and dissolving it in the plasticizer, it is possible to obtain a transparent solution. More specifically, examples of the methods include a method of adding a phenol-based antioxidant to the plasticizer, and then heating, stirring, and mixing the resulting composition; and a method of heating the plasticizer, adding a phenol-based antioxidant, and then dissolving the antioxidant by stirring and mixing. When a phenol-based antioxidant is mixed with the plasticizer, it is preferable to set appropriate temperature and time so that the plasticizer does not excessively deteriorate or discolor. The temperature is not particularly limited, and ranges, for example, from normal temperature (e.g., 25° C.) to 120° C. The time is not particularly limited, and ranges, for example, from 1 second to 1 hour. In particular, by mixing the phenol-based antioxidant with the plasticizer while heating and stirring, it is possible to evenly dissolve the phenol-based antioxidant in the plasticizer (non-phthalate ester). Since the effects from the combined use of the plasticizer and the phenol-based antioxidant are more easily exerted by evenly dissolving the phenol-based antioxidant in the plasticizer, it is preferable to mix and dissolve an antioxidant in the plasticizer in advance.

1-5. Other Components

In addition to non-phthalate ester (C) and the phenol-based antioxidant, the plasticizer for vinyl chloride-based resin of the present invention may contain other components. Examples of other components include additives such as flame retardants, stabilizers, stabilizing adjuvants, coloring agents, processing aids, fillers, antioxidants (anti-aging agents) other than the phenol-based antioxidant of the present invention, light stabilizers such as UV absorbers or hindered amine, lubricants, antistatic agents, or silane compound-based radial-ray-resistant substances; and known plasticizers other than the plasticizer for vinyl chloride-based resin of the present invention. These components may be added insofar as the effects of the present invention are not impaired.

These additives (other components) may be used solely or in a suitable combination of two or more kinds. The various kinds of these additives are described later.

2. Vinyl Chloride Resin Composition

The vinyl chloride-based resin composition of the present invention contains the above plasticizer for vinyl chloride-based resin of the present invention and a vinyl chloride-based resin.

2-1. Vinyl Chloride Resin

The vinyl chloride-based resin used in the present invention is a vinyl chloride homopolymer, a vinylidene chloride homopolymer, or a copolymer of vinyl chloride and vinylidene chloride. The method for producing a vinyl chloride-based resin is not particularly limited, and a known polymerization method may be used. Examples of the method include, for a versatile vinyl chloride-based resin, a method of performing suspension polymerization in the presence of an oil-soluble polymerization catalyst, and, for a vinyl chloride paste resin, a method of performing emulsion polymerization in an aqueous medium in the presence of a water-soluble polymerization catalyst.

The polymerization degree of these vinyl chloride-based resins is generally 300 to 5,000, preferably 400 to 3,500, further preferably 700 to 3,000.

Examples of copolymers of vinyl chloride and vinylidene chloride include $C_{2-30}$ α-olefins such as ethylene, propylene, 1-butene, 1-pentene, 1-hexene, 1-heptene, 1-octene, 1-nonene, 1-decene, 1-undecene, 1-dodecene, 1-tridecene, or 1-tetradecene; vinyl compounds such as acrylic acids and esters thereof, methacrylic acid and esters thereof, maleic acid and esters thereof, vinyl acetate, vinyl propionate, or alkyl vinyl ether; polyfunctional monomers such as diallyl phthalate and copolymer of the mixture thereof and vinyl chloride monomer; ethylene-acrylate ester copolymer such as ethylene-ethyl acrylate copolymer; ethylene-methacrylate ester copolymer; ethylene-vinyl acetate copolymer (EVA); chlorinated polyethylene; butyl rubber; crosslinked acrylic rubber; polyurethane; butadiene-styrene-methyl methacrylate copolymer (MBS); butadiene-acrylonitrile-(α-methyl) styrene copolymer (ABS); styrene-butadiene copolymer; polyethylene; and graft copolymer obtained by grafting polymethylmethacrylate and mixture thereof and the vinyl chloride monomer.

The content of the plasticizer for vinyl chloride-based resin is suitably selected according to the target use, and is generally 1 to 200 parts by weight, preferably 5 to 200 parts by weight, more preferably 5 to 100 parts by weight, per 100 parts by weight of the vinyl chloride-based resin. However, when a filler or the like is added to the vinyl chloride-based resin composition, the plasticizer may be incorporated in an amount larger than the above range because the filler absorbs oil. For example, when 100 parts by weight of calcium carbonate as a filler is incorporated per 100 parts by weight of a vinyl chloride-based resin, about 1 to 500 parts by weight of the plasticizer may be incorporated.

2-2. Epoxidized Vegetable Oil

As epoxidized vegetable oil of the present invention, known epoxidized vegetable oils such as epoxidized soybean oil, epoxidized linseed oil, or the like may be used. Since discoloration during the sterilization with radiation of ultraviolet or radial rays may be suppressed by incorporating epoxidized vegetable oil, incorporation of epoxidized vegetable oil is preferable. When epoxidized vegetable oil is incorporated, the amount is generally about 1 to 50 parts by weight, preferably about 2 to 40 parts by weight, per 100 parts by weight of the vinyl chloride-based resin.

2-3. Other Components

If necessary, the vinyl chloride-based resin composition may also contain known additives generally used for plastics, such as flame retardants, stabilizers, stabilizing adjuvants, coloring agents, processing aids, fillers, antioxidants (anti-aging agents), light stabilizers such as UV absorbers or hindered amine, lubricants, antistatic agents, or silane compound-based radial-ray-resistant substances. These additives may be added insofar as the effects of the present invention are not impaired. Even when the plasticizer for vinyl chloride-based resin of the present invention contains a phenol-based antioxidant, the vinyl chloride-based resin composition may also contain an antioxidant such as a phenol-based antioxidant.

These additives (other components) may be used solely or in a suitable combination of two or more kinds, and may be incorporated together with the plasticizer of the present invention.

Known plasticizers that can be used with the plasticizing component of the plasticizer for vinyl chloride-based resin of the present invention is not particularly limited. Examples of known plasticizers include benzoate esters such as diethylene glycol dibenzoate, aliphatic dibasic acid esters such as di-2-ethylhexyl adipates (DOA), diisononyl adipates (DINA), diisodecyl adipates (DIDA) di-2-ethylhexyl sebacates (DOS) or diisononyl sebacates (DINS), pyromellitate esters such as tetra-2-ethylhexyl pyromellitate (TOPM), phosphate esters such as tri-2-ethylhexyl phosphate (TOP) or tricresyl phosphate (TCP), polyhydric alcohol alkyl esters such as pentaerythritol, polyesters having a molecular weight of 800 to 4,000 synthesized by esterification of dibasic acid such as adipic acid and glycol, epoxidized esters such as 4,5-epoxy-1,2-cyclohexane dicarboxylate di-2-ethylhexylester, alicyclic dibasic acid esters such as diisononyl ester hexahydrophthalate (DINCH), fatty acid glycol esters such as 1,4-butanediol-dicaprate, acetyltributyl citrate (ATBC), isosorbide diester, paraffin wax, chlorinated paraffin obtained by chlorinating n-paraffin, chlorinated fatty acid esters such as chlorinated stearate ester, and higher fatty acid esters such as butyl oleate. Examples of known plasticizers that can be used with the plasticizer for vinyl chloride-based resin of the present invention include, in addition to the above plasticizers, dibutyl phthalates (DBP), di-2-ethylhexyl phthalates (DOP), diisononyl phthalates (DINP), diisodecyl phthalates (DIDP), diundecyl phthalates (DUP), ditridecyl phthalates (DTDP), terephthalic acid bis(2-ethylhexyl)(DOTP), isophthalic acid bis(2-ethylhexyl)(DOIP), and like phthalate esters. These plasticizers may be used insofar as the effects of the present invention are not impaired.

When the above plasticizers that can be used with the plasticizer for vinyl chloride-based resin of the present invention are incorporated, it is generally recommended that the amount be about 1 to 100 parts by weight per 100 parts by weight of the vinyl chloride-based resin.

The flame retardant is not particularly limited, and examples include inorganic compounds such as aluminum hydroxide, antimony trioxide, magnesium hydroxide, or zinc borate; phosphorus-based compounds such as cresyl diphenyl phosphate, tris chloroethyl phosphate, tris chloropropyl phosphate, or tris dichloropropyl phosphate; and halogen compounds such as chlorinated paraffin. When a flame retardant is incorporated, it is generally recommended that the amount be about 0.1 to 20 parts by weight per 100 parts by weight of the vinyl chloride-based resin.

The stabilizer is not particularly limited, and examples include organic acid compounds containing a metal such as lithium stearate, magnesium stearate, magnesium laurate, calcium ricinoleate, calcium stearate, barium laurate, barium ricinoleate, barium stearate, zinc octylate, zinc laurate, zinc ricinoleate, or zinc stearate; metal soap compounds such as organic acid compounds containing a composite metal such as barium-zinc stearate, barium-zinc laurate, barium-zinc ricinoleate, barium-zinc octylate, calcium-zinc stearate, calcium-zinc laurate, calcium-zinc ricinoleate, or calcium-zinc octylate; organic tin-based compounds such as dimethyl tin bis-2-ethylhexyl thioglycolate, dibutyltin maleate, dibutyltin bis butyl maleate, or dibutyltin dilaurate; and antimony mercaptide compounds. When a stabilizer is incorporated, it is generally recommended that the amount be about 0.1 to 20 parts by weight per 100 parts by weight of the vinyl chloride-based resin.

The stabilizing adjuvants are not particularly limited, and examples include phosphite-based compounds such as triphenyl phosphite, monooctyl diphenyl phosphite, or tridecyl phosphite; beta-diketone compounds such as acetylacetone, or benzoylacetone; polyol compounds such as glycerin, sorbitol, pentaerythritol, or polyethylene glycol; perchlorate compounds such as barium perchlorates or sodium perchlorates; hydrotalcite compounds, and zeolites. When a stabilizing adjuvant is incorporated, it is generally recommended that the amount be about 0.1 to 20 parts by weight per 100 parts by weight of the vinyl chloride-based resin.

The coloring agent is not particularly limited, and examples include carbon black, lead sulfide, white carbon, titanium white, lithopone, red oxide, antimony sulfide, chrom yellow, chrome green, cobalt blue, and molybdenum orange. When a coloring agent is incorporated, it is generally recommended that the amount be about 1 to 100 parts by weight per 100 parts by weight of the vinyl chloride-based resin.

The processing aids are not particularly limited, and examples include liquid paraffin, polyethylene wax, stearic acid, stearic acid amide, ethylene bis stearic acid amide, butyl stearate, and calcium stearate. When a processing aid is incorporated, it is generally recommended that the amount be about 0.1 to 20 parts by weight per 100 parts by weight of the vinyl chloride-based resin.

Examples of fillers include metal oxides such as calcium carbonate, silica, alumina, clay, talc, diatomaceous earth, or ferrite; fibers and powders of glass, carbon, metal, or the like; glass beads, graphite, aluminum hydroxide, barium sulfate, magnesium oxide, magnesium carbonate, magnesium silicate, and calcium silicate. When a filler is incorporated, it is generally recommended that the amount be about 1 to 150 parts by weight per 100 parts by weight of the vinyl chloride-based resin.

In addition to the phenol-based antioxidants disclosed in 1-4 above, antioxidants other than phenol-based antioxidants may also be used. Examples of other antioxidants include sulfur-based compounds such as alkyl disulfide, thiodipropionic acid esters, or benzothiazole; phosphate-based compounds such as trisnonyl phenyl phosphite, diphenyl isodecyl phosphite, triphenyl phosphite, or tris(2,4-di-t-butylphenyl)phosphite; and organic metal compounds such as zinc dialkyldithiophosphates or zinc diaryldithiophosphate. When an antioxidant other than the phenol-based antioxidants is incorporated, it is generally recommended that the amount be about 0.1 to 20 parts by weight per 100 parts by weight of the vinyl chloride-based resin.

UV absorbers are not particularly limited, and examples include salicylate-based compounds such as phenyl salicylate or p-t-butylphenyl salicylate; benzophenone-based compounds such as 2-hydroxy-4-n-octoxybenzophenone or 2-hydroxy-4-methoxybenzophenone; benzotriazole-based compounds such as 5-methyl-1H-benzotriazole or 1-dioctyl aminomethyl benzotriazole; and cyanoacrylate-based compounds. When a UV absorber is incorporated, it is generally recommended that the amount be about 0.1 to 10 parts by weight per 100 parts by weight of the vinyl chloride-based resin.

The hindered amine-based light stabilizers are not particularly limited, and examples include bis(2,2,6,6-tetramethyl-4-piperidyl)sebacate, bis(1,2,2,6,6-pentamethyl-4-piperidyl) sebacate and methyl1,2,2,6,6-pentamethyl-4-piperidyl sebacate (mixture), bis(1,2,2,6,6-pentamethyl-4-piperidyl)[[3,5-bis(1,1-dimethylethyl)-4-hydroxyphenyl]methyl]butyl malonate, decanedioic acid bis(2,2,6,6-tetramethyl-1(octyloxy)-4-piperidyl)ester, and a product of a reaction of 1,1-dimethylethyl hydroperoxide and octane, 4-benzoyloxy-2,2,6,6-tetramethylpiperidine, an ester mixture of 2,2,6,6-tetramethyl-4-piperidinol and higher fatty acid, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, a polycondensation product of succinic acid dimethyl and 4-hydroxy-2,2,6,6-tetramethyl-1-piperidine ethanol, poly[{(6-(1,1,3,3-tetramethylbutyl)amino-1,3,5-triazine-2,4-diyl}{(2,2,6,6-tetramethyl-4-piperidyl)imino)hexamethylene{(2,2,6,6-tetramethyl-4-piperidyl)imino}}, a polycondensation product of dibutylamine 1,3,5-triazine N,N'-bis(2,2,6,6-tetramethyl-4-piperidyl-1,6-hexamethylenediamine and N-(2,2,6,6-tetramethyl-4-piperidyl)butylamine, and N,N',N'',N'''-tetrakis-(4,6-bis-(butyl-(N-methyl-2,2,6,6-tetramethylpiperidine-4-yl)amino)-triazine-2-yl)-4,7-diazadecane-1,10-diamine. Further, when a light stabilizer is incorporated, it is generally recommended that the amount be about 0.1 to 10 parts by weight per 100 parts by weight of the vinyl chloride-based resin.

The lubricant is not particularly limited, and examples include silicone; liquid paraffin; paraffin wax; fatty acid metal salts such as metal stearate or metal laurate; fatty acid amide; fatty acid wax; and higher fatty acid wax. When a lubricant is incorporated, it is generally recommended that the amount be about 0.1 to 10 parts by weight per 100 parts by weight of the vinyl chloride-based resin.

The antistatic agents are not particularly limited, and examples include anionic antistatic agents such as alkyl sulfonate antistatic agents, alkyl ether carboxylic acid antistatic agents, or dialkyl sulfosuccinate antistatic agents; nonionic antistatic agents such as polyethylene glycol derivatives, sorbitan derivatives or diethanolamine derivatives; quaternary ammonium salts such as alkylamide amine antistatic agents or alkyl dimethylbenzyl antistatic agents; cationic antistatic agents such as alkyl pyridinium organic acid salt or hydrochloride; and amphoteric antistatic agents such as alkylbetaine or alkylimidazoline antistatic agents. When an antistatic agent is incorporated, it is generally recommended that the amount be about 0.1 to 10 parts by weight per 100 parts by weight of the vinyl chloride-based resin.

The silane compounds (radial-ray-resistant substances) are not particularly limited, and examples include alkoxysilane compounds, chlorosilane compounds, acetoxysilane compounds, and organosilane compounds. Examples of alkoxysilane compounds include monoalkoxysilane compounds such as trimethylmethoxysilane, trimethylethoxysilane, triethylmethoxysilane, or triethylethoxysilane; dialkoxysilane compounds such as dimethyldimethoxysilane, diethyldimethoxysilane, dimethyldiethoxysilane, diphenyldimethoxysilane, diphenyldiethoxysilane, methylamino ethoxypropyl dialkoxysilane, N-(β-aminoethyl)-γ-aminopropylmethyl dimethoxysilane, γ-glycidoxy propyl methyl dimethoxysilane, or γ-methacryloxypropyl methyl dimethoxysilane; trialkoxysilane compounds such as methyltrimethoxysilane, methyltriethoxysilane, hexyltrimethoxysilane, phenyl trimethoxysilane, phenyl triethoxysilane, vinyltrimethoxysilane, vinyl triethoxysilane, γ-chloropropyl trimethoxysilane, γ-aminopropyltriethoxysilane, N-(β-aminoethyl)-γ-aminopropyltrimethoxysilane, N-(phenyl)-γ-aminopropyltrimethoxysilane, γ-glycidoxypropyl trimethoxysilane, 3-methacryloxypropyl trimethoxysilane, 3-methacryloxypropyl triethoxysilane, γ-mercaptopropyl trimethoxysilane, γ-(polyethylene amino)propyl trimethoxysilane, γ-ureidepropyl triethoxysilane, heptadecafluorodecyl trimethoxysilane, tridecafluorooctyl trimethoxysilane, vinyl tris(-methoxy ethoxy)silane, or β-(3,4-epoxy cyclohexyl)ethyl trimethoxysilane; and tetraalkoxysilane compounds such as tetramethoxysilane, or tetraethoxysilane. Examples of acetoxysilane compounds include vinyl triacetoxysilane. Examples of chlorosilane compounds include trimethyl chlorosilane, dimethyl dichlorosilane, methyl trichlorosilane, vinyl trichlorosilane, and γ-chloropropylmethyl dichlorosilane. Examples of organosilane compounds include silane compounds in which alkyl group, vinyl group, (meth)acrylic group, allyl group, methyl acetate group or like group is directly attached to the silicon atom other than the above alkoxysilane compounds, acetoxysilane compounds, or chlorosilane compounds, such as triisopropyl silane, triisopropyl silyl acrylate, allyl trimethylsilane, or trimethylsilyl methyl acetate. When a silane compound is incorporated, it is generally recommended that the amount be about 0.1 to 10 parts by weight per 100 parts by weight of the vinyl chloride-based resin.

The diluent is not particularly limited, and examples include 2,2,4-trimethyl-1,3-pentanediol diisobutyrate, and aliphatic or aromatic hydrocarbons having a low boiling point. When a diluent is incorporated, it is generally recommended that the amount be about 1 to 50 parts by weight per 100 parts by weight of the vinyl chloride-based resin.

The viscosity reducer is not particularly limited, and examples include various non-ionic surfactants, sulfosuccinate-based anionic surfactants, silicone-based surfactants, soybean oil lecithin, monohydric alcohol, glycol ether, and polyethylene glycol. When a viscosity reducer is incorporated, it is generally recommended that the amount be about 0.1 to 20 parts by weight per 100 parts by weight of the vinyl chloride-based resin.

The thickener is not particularly limited, and examples include synthetic fine-silica-based thickeners, bentonite-based thickeners, superfine precipitated calcium carbonates, metal-soap-based thickeners, hydrogenated castor oil, polyamide wax, polyethylene oxide-based thickeners, vegetable-oil-based thickeners, sulfate-based surfactants, and nonionic surfactants. When a thickener is incorporated, it is generally recommended that the amount be about 1 to 50 parts by weight per 100 parts by weight of the vinyl chloride-based resin.

The foaming agent is not particularly limited, and examples include organic foaming agents such as azodicarbonamide or oxybisbenzenesulfonyl hydrazide, and inorganic foaming agents such as sodium bicarbonate. When a foaming agent is incorporated, it is generally recommended that the amount be about 0.1 to 30 parts by weight per 100 parts by weight of the vinyl chloride-based resin.

The adhesive is not particularly limited, and examples include commercially available adhesives such as urethane-based adhesives, acrylate-based adhesives, imide-based adhesives, amide-based adhesives, epoxy-based adhesives, or silicone-based adhesives. When an adhesive is incorporated, it is generally recommended that the amount be about 0.05 to 50 parts by weight per 100 parts by weight of the vinyl chloride-based resin.

The coloring agent is not particularly limited, and examples include carbon black, lead sulfide, white carbon, titanium white, lithopone, red oxide, antimony sulfide, chrom yellow, chrome green, phthalocyanine green, cobalt blue, phthalocyanine blue, and molybdenum orange. When a coloring agent is incorporated, it is generally recommended that the amount be about 1 to 100 parts by weight per 100 parts by weight of the vinyl chloride-based resin.

The vinyl chloride-based resin composition of the present invention may be formed into a powdery, pellet, or a paste vinyl chloride-based resin composition through agitation mixing or melt mixing of the plasticizer for vinyl chloride-based resin of the present invention, a vinyl chloride-based resin, and, as necessary, the known plasticizers and various additives mentioned above, using, for example, an agitation mixer such as a pony mixer, a butterfly mixer, a planetary mixer, a dissolver, a twin-shaft mixer, a three-roll mill, a mortar mixer, a Henschel mixer, a Banbury mixer, or a ribbon blender; a conical twin-shaft extruder; a parallel twin-shaft extruder; a single-shaft extruder; or a kneader such as a co-kneader or a roll kneader.

3. Vinyl Chloride Paste Sol Composition

The content of non-phthalate ester (C) of the present invention in a vinyl chloride-based paste sol composition is suitably selected depending on the usage; however, the content is generally 1 to 300 parts by weight, preferably 5 to 200 parts by weight, per 100 parts by weight of a paste vinyl chloride-based resin. For example, when 100 parts by weight of calcium carbonate as a filler is incorporated in 100 parts by weight of a paste vinyl chloride-based resin, about 1 to 500 parts by weight of the non-phthalate ester of the present invention may be incorporated.

For the vinyl chloride-based paste sol composition, the known plasticizers mentioned above may be used with the plasticizer for vinyl chloride-based resin of the present invention. Further, insofar as the effects of the present invention are not impaired, additives such as flame retardants, stabilizers, stabilizing adjuvants, coloring agents, processing aids, fillers, antioxidants (anti-aging agents), light stabilizers such as UV absorber or hindered amine, lubricants, antistatic agents, diluents, viscosity reducers, thickeners, foaming agents, foaming agents, adhesives, or radial-ray-resistant substances such as silane compounds; and known plasticizers other than the plasticizer for vinyl chloride-based resin of the present invention may be added as necessary.

These additives (other components) may be used solely or in a suitable combination of two or more kinds.

4. Vinyl Chloride Resin Molded Article

The vinyl chloride-based resin composition or vinyl chloride-based paste sol composition of the present invention may be formed into a desired shape using a known method such as vacuum molding, compression molding, extrusion molding, injection molding, calender molding, press molding, blow molding, powder molding, spread coating, dip coating, spray coating, paper casting, extrusion coating, gravure printing, screen printing, slush molding, rotational molding, cast molding, or dip molding.

The shape of the molded article is not particularly limited, and examples include rod shape, sheet shape, film shape, plate shape, cylindrical shape, round shape, elliptical shape; and particular shapes of toys, ornaments, and the like (for example, star shape or polygon shape).

The molded article thus obtained is particularly useful as an automobile part, such as a door trim, dashboard, instrument panel, console, door sheet, automatic-transmission gear selector, armrest, undercarpet, trunk sheet, wire harness, sun visor, grip (for example, shift lever grip, side lever grip, or the like), various types of molding, sash, sealing material, weather-strip, gasket, or undercoat material. In addition, the molded article of the present invention is applicable for a wide range of uses requiring high heat resistance and durability, including electric insulators; anti-rust coating; vinyl chloride steel plates; marking film; canvas; strippable coating; can coating; can sealing; sealers; sealing tape; pipes such as water pipes; pipe joints; drainpipes such as rainwater pipes; window frame siding; flat plates; corrugated plates; leathers; ornamental sheets; agricultural film; food-wrapping film; wire sheathing; various foam products; hoses; medical tubes such as chest tubes, dialysis tubes, artificial respiration tubes, endotracheal tubes, respiration apparatus tubes, nutrition tubes, or extension tubes; catheters such as urinary catheters, suction catheters, intravenous injection catheters, or digestive tract catheters; circuit apparatus parts such as blood component separators, hemodialysis circuits, peritoneal dialysis circuits, or artificial heart-lung circuits; bags such as blood bags, infusion bags, pharmaceutical liquid bags, or drain bags; medical materials such as infusion sets, blood transfusion sets, intravenous injection sets, cardiopulmonary bypasses, surgical gloves, pharmaceutical product packaging materials, medical film, sanitary materials, or respiration masks; food tubes; refrigerator gaskets; packing; wallpaper; floor materials; cushioned floors; tile carpet; boots; curtains; shoe soles; gloves; lace; food samples; erasers; artificial bait; floats; release paper; water stop plates; toys; decorative sheets; blood bags; infusion bags; tarpaulin; mats; impervious sheets; civil-engineering sheets; roofing; waterproof sheets; insulating sheets; industrial tape; and glass film.

EXAMPLES

Examples are shown below to more specifically explain the present invention. The present invention is not limited to these Examples. Abbreviations of the compounds and details of the characteristic measurements in the Examples and Comparative Examples are shown below.

(1) The Linear-Chain Rate of Alcohol (B1)

The linear-chain ratio of alcohol (B1), which is a raw material used in the Examples and Comparative Examples of the present invention, was measured by gas chromatography (hereinafter abbreviated as "GC"). The measurement of linear-chain ratio of alcohol (B1) through GC was performed as follows.

GC Measurement Conditions
Apparatus: Gas chromatograph GC-17A (Shimadzu Corporation)
Detector: FID
Column: Capillary column DB-1 30 m
Column temperature: increased from 60° C. to 290° C.
Temperature
increase rate: 13° C./min
Carrier gas: Helium
Sample: 50% acetone solution
Injection volume: 1 µL
Quantitative determination method: Quantitative determination was performed using 1-hexanol as an internal standard substance.

In the selection of the internal standard substance, it was confirmed in advance that 1-hexanol in the raw material alcohol was no more than the GC detection limit.

(2) Content of Phthalic Acid in Acid Component of Raw Material

The contents of phthalic acid in the acid components of the raw materials of the plasticizers used in the Examples and Comparative Examples of the present invention were measured by GC. The measurement of phthalic acid through GC was performed as follows.

Pretreatment

When the acid component of the raw material was a trimellitic acid anhydride, 0.1 g of the trimellitic acid anhydride was dissolved in 0.7 g of acetone; subsequently, 0.2 g of diazomethane dissolved in diethylether (5%) was added to the resulting solution for methyl esterification, thereby preparing a GC sample.

GC Measurement Conditions
Apparatus: Gas chromatograph GC-17A (Shimadzu Corporation)
Detector: FID
Column: Capillary column DB-1 30 m
Column temperature: increased from 60° C. to 290° C.
Temperature
increase rate: 13° C./min
Carrier gas: Helium
Sample: 10% acetone/diethylether solution
Injection volume: 1 µL
Quantitative determination: Quantitative determination was performed using n-propyl benzoate as an internal standard substance.

In the selection of the internal standard substance, it was confirmed in advance that n-propyl benzoate in the acid component of the raw material was no more than the GC detection limit.

(3) Content of Ester of Alcohol Having 8 or Fewer Carbon Atoms and Phthalic Acid in Trimellitate Ester The content of the ester of alcohol having 8 or fewer carbon atoms and phthalic acid in the trimellitate ester used in the Examples and Comparative Examples of the present invention was measured by GC. The same GC measurement conditions as in "(1) Linear-Chain Rate of Alcohol (B1) in Raw Material" above were used in the GC measurement.

(4) Evaluation of Physical Properties of Ester

The esters obtained in the Production Examples below were analyzed by the following methods.

Ester value: The ester value was measured according to JIS K-0070(1992).

Acid value: The acid value was measured according to JIS K-0070(1992).

Hue: The hue was measured by finding Hazen unit color scales according to the color scale test method (Hazen) defined in JIS K-0071(1998).

(5) Sol Viscosity of Vinyl Chloride Paste Sol Composition 60 parts by weight of a plasticizer was added to 100 parts by weight of a vinyl chloride-based resin for a paste (polymerization degree: 1050, product name: Zest P22, Shin Dai-Ichi Vinyl Corporation), and mixed by hand until evenly mixed, thereby obtaining a vinyl chloride-based paste sol composition. The resulting paste sol composition was matured at a temperature of 25° C. and a humidity of 60%, and the sol viscosity was measured at predetermined times using a Brookfield viscometer (Rotor No. 4, 5 rpm, value after 1 minute).

"Initial viscosity" means the viscosity measured immediately after the mixing of the vinyl chloride-based resin for a paste and the plasticizer. Further, the viscosity increase value is a value obtained by subtracting the initial viscosity from the sol viscosity after 7 days. The smaller the viscosity increase value, the more superior the viscosity stability.

(6) Molding Processability

About 0.01 g of a sample obtained by mixing 10 g of a plasticizer with 2 g of a vinyl chloride-based resin (straight, polymerization degree: 1050, product name: Zest 1000Z, Shin Dai-Ichi Vinyl Corporation) was added dropwise to a slide glass, and a cover glass was placed thereon. The glasses were set in a micro-melting-point measurement apparatus (Apparatus: Micro Melting Point Apparatus, Yanagimoto Seisaku-Sho). The temperature was increased at a rate of 5° C./min, and changes in condition of the resin particles of the vinyl chloride-based resin due to the temperature rise were observed. A temperature at which the particles of the vinyl chloride-based resin start melting and a temperature at which the particles become transparent were defined as the gelation start temperature and the gelation end temperature, respectively. The average value of these temperatures was defined as the gelation temperature. The lower the gelation temperature, the higher the absorption speed of the plasticizer and more superior the processability.

(7-1) Vinyl Chloride Sheet Production Method 1 (Hereinafter Referred to as "Production Method 1")

0.3 and 0.2 parts by weight of calcium stearate (Nacalai Tesque, Inc.) and zinc stearate (Nacalai Tesque, Inc.), respectively, were incorporated as stabilizers in 100 parts by weight of a vinyl chloride-based resin (straight, polymerization degree: 1050, product name: Zest 1000Z, Shin Dai-Ichi Vinyl Corporation), and the mixture was mixed by stirring with a mortar mixer (apparatus: mortar mixer, Maruto Testing Machine Company). Thereafter, 50 parts by weight of a plasticizer was added and mixed by hand until evenly mixed, thereby obtaining a vinyl chloride-based resin composition. The resin composition was subjected to melt-kneading for 4 minutes at 160 to 166° C. using a 5×12-inch twin roll, thereby obtaining a rolled sheet. Subsequently, press molding was performed at 162 to 168° C. for 10 minutes, thereby producing a pressed sheet having a thickness of about 1 mm.

(7-2) Vinyl Chloride Sheet Production Method 2 (Hereinafter Referred to as "Production Method 2")

0.3 and 0.2 parts by weight of calcium stearate (Nacalai Tesque, Inc.) and zinc stearate (Nacalai Tesque, Inc.), respectively, were incorporated as stabilizers in 100 parts by weight of a vinyl chloride-based resin (straight, polymerization degree: 1050, product name: Zest 1000Z, Shin Dai-Ichi Vinyl Corporation), and the mixture was mixed by stirring with a mortar mixer. Thereafter, 50 parts by weight of a plasticizer and 5 parts by weight of epoxidized soybean oil (SANSO CIZER E-2000H, New Japan Chemical Co., Ltd.) were added and mixed by hand until evenly mixed, thereby obtaining a vinyl chloride-based resin composition. The resin composition was subjected to melt-kneading for 4 minutes at 160 to 166° C. using a 5×12-inch twin roll, thereby obtaining a rolled sheet. Subsequently, press molding was performed at 162 to 168° C. for 10 minutes, thereby producing a pressed sheet having a thickness of about 1 mm. In order to clarify the difference in the plasticizer effect, an ultraviolet irradiation test was performed by preparing a test sample in the form of a pressed sheet having a formulation without the epoxidized soybean oil.

(7-3) Production Method 3 for Producing Vinyl Chloride Paste Sol and a Sheet from the Vinyl Chloride Paste Sol (Hereinafter Referred to as "Production Method 3")

0.9 and 0.6 parts by weight of calcium stearate (Nacalai Tesque, Inc.) and zinc stearate (Nacalai Tesque, Inc.), respectively, were incorporated as stabilizers in 100 parts by weight of a vinyl chloride-based resin for a paste (polymerization degree: 1050, product name: Zest P22, Shin Dai-Ichi Vinyl Corporation), and the mixture was mixed by stirring with a mortar mixer. Thereafter, 60 parts by weight of a plasticizer was added and mixed by hand until evenly mixed, thereby obtaining a vinyl chloride-based resin paste sol composition. The prepared paste sol composition was applied on a stainless-steel plate with a thickness of about 1 mm, and the applied sol composition was gelated by heating in an over at 185° C. for 15 minutes. After cooling, measurements were performed using the obtained sheet.

Evaluations of Physical Properties of Vinyl Chloride Resin Molded Article (8) Tensile Characteristics To evaluate the tensile characteristics, 100% modulus, breaking strength, and breaking elongation of the pressed sheet were measured according to JIS K-6723(1995). The smaller the 100% modulus, more desirable the flexibility. Breaking strength and breaking elongation are indications of the practical strength of the material. Generally, the greater these values, the more superior the practical strength.

(9) Cold Resistance

Cold resistance was measured according to JIS K-6773 (1999) using a Clash-Berg tester. The lower the softening temperature (° C.), the more superior the cold resistance. The softening temperature here means the temperature of the low-temperature limit at which a predetermined torsional rigidity rate ($3.17 \times 10^3$ kg/cm$^2$) is obtained in the above measurement.

(10) Heat Resistance

The heat resistance was evaluated based on volatile loss and sheet discoloration as detailed below.

a) Volatile loss: The above rolled sheet was heated in a gear oven at 170° C. for a duration specified in the table, and a change in the weight was measured; then, the volatile loss (weight reduction rate)(wt %) was calculated. The smaller the value, the higher the heat resistance.

Volatile loss(wt %)=((weight before test−weight after test)/weight before test)×100 b) Sheet discoloration: The rolled sheet above was heated in a gear oven at 170° C. for a duration specified in the table; thereafter, the intensity of discoloration of each rolled sheet was evaluated on a six-level scale by visual inspection.

⊚: Discoloration was not observed.

○: Slight discoloration was observed.

○Δ: Insignificant discoloration was observed.

Δ: Discoloration was observed.

x: Severe discoloration was observed.

xx: Significant discoloration was observed.

(11) Fogging Resistance 4 g of the pressed sheet was placed in a glass sample bottle, and the bottle was set in a fogging tester adjusted to 100° C. or 120° C. Further, a glass plate lid was placed on the sample bottle, and a cooling plate with a cooling water flow adjusted to 20° C. was placed thereon, and a heat treatment was performed at 100° C. for 8 hours or at 120° C. for 3 hours. After the heat treatment, the fogging degree (Haze) (%) of the glass plate was measured using a haze meter (Haze Guard II: Toyo Seiki Kogyo Co., Ltd).

The smaller the haze value, the more superior the fogging resistance.

(12) Heat-Aging Resistance

To evaluate a heat-aging resistance, a tensile test was performed after heating at 120° C. for 120 hours according to JIS K-6723(1995). The results were shown as a 100% modulus residual rate (%) and a breaking elongation residual rate (%) of the pressed sheet compared with a normal state. The greater the value, the higher the heat-aging resistance.

100% modulus residual rate(%)=(1−(100% modulus after heating−100% modulus before heating)/100% modulus before heating))×100 elongation residual rate(%)=(breaking elongation after heating/breaking elongation before heating)×100

(13) Ultraviolet Irradiation Test

A ultraviolet irradiation test was performed using a Metal Weather super-accelerated weather resistance tester (Daipla Wintes Co., Ltd.) under predetermined measurement conditions (irradiation energy: 100 mW/m$^2$, irradiation condition: black panel temperature 53° C./humidity 50%/4 hours, dew condensation condition: black panel temperature 30° C./humidity 98%/2 hours, shower condition: 10 seconds before and after dew condensation). After 5 cycles of the tests, the intensity of discoloration of the pressed sheet was evaluated on a four-level scale by visual inspection.

⊚: Discoloration was not observed

○: Slight discoloration was observed

Δ: Discoloration was observed x: Severe discoloration was observed (A) Plasticizer for Vinyl Chloride Resin Containing 1,2-Cyclohexane Dicarboxylate Diester Production Example A1

77.0 g (0.5 mol) of 1,2-cyclohexane dicarboxylic acid anhydride, 173 g (1.2 mol) of saturated aliphatic alcohol (Linevol 9: Shell Chemicals) containing 87.2 wt % of linear $C_9$ saturated aliphatic alcohol and 11.7 wt % of branched $C_9$ saturated aliphatic alcohol, and 0.1 g of tetraisopropyltitanate as an esterification catalyst were added to a 2-L four-necked flask equipped with a thermometer, a decanter, a stirring blade, and a reflux condenser tube, and an esterification reaction was conducted for 8 hours under a reaction temperature of 200° C. Under reduced pressure, the reaction was continued while refluxing the alcohol and removing the generated water to the outside of the system until the acid value of the reaction solution became 0.5 mg KOH/g. After the reaction was completed, unreacted alcohol was distilled off to the outside of the system under reduced pressure, followed by neutralization, washing with water, and dehydration by standard methods, thereby obtaining 186 g of the target 1,2-cyclohexane dicarboxylate diester (hereinafter referred to as "ester A1").

The resulting ester A1 had an ester value of 260 mg KOH/g, an acid value of 0.01 mg KOH/g, and a color number of 20.

Production Example A2

A method similar to that in Production Example A1 was performed, except that 116 g (0.80 mol) of n-nonyl alcohol and 58 g (0.40 mol) of isononyl alcohol were added instead of 173 g of the saturated aliphatic alcohol (Linevol 9: Shell Chemicals), thereby obtaining 168 g of 1,2-cyclohexane dicarboxylate diester (hereinafter referred to as "ester A2").

The resulting ester A2 had an ester value of 261 mg KOH/g, an acid value of 0.01 mg KOH/g, and a color number of 10.

Production Example A3

A method similar to that in Production Example A1 was performed, except that 154 g (1.07 mol) of n-nonyl alcohol and 19 g (0.13 mol) of isononyl alcohol were added instead of 173 g of the saturated aliphatic alcohol (Linevol 9: Shell Chemicals), thereby obtaining 170 g of 1,2-cyclohexane dicarboxylate diester (hereinafter referred to as "ester A3").

The resulting ester A3 had an ester value of 260 mg KOH/g, an acid value of 0.01 mg KOH/g, and a color number of 10.

Production Example A4

A method similar to that in Production Example A1 was performed, except that 156 g of 2-ethylhexanol was added instead of 173 g of the saturated aliphatic alcohol (Linevol 9: Shell Chemicals), thereby obtaining 134 g of 1,2-cyclohexane dicarboxylate di(2-ethylhexyl) (hereinafter referred to as "ester A4").

The resulting ester A4 had an ester value of 283 mg KOH/g, an acid value of 0.01 mg KOH/g, and a color number of 15.

Production Example A5

A method similar to that in Production Example A1 was performed, except that 173 g of isononyl alcohol was added instead of 173 g of the saturated aliphatic alcohol (Linevol 9: Shell Chemicals), thereby obtaining 175 g of 1,2-cyclohexane dicarboxylate diisononyl (hereinafter referred to as "ester A5").

The resulting ester A5 had an ester value of 261 mg KOH/g, an acid value of 0.01 mg KOH/g, and a color number of 15.

Production Example A6

A method similar to that in Production Example A1 was performed, except that 190 g of isodecyl alcohol was added instead of 173 g of the saturated aliphatic alcohol (Linevol 9: Shell Chemicals), thereby obtaining 159 g of 1,2-cyclohexane dicarboxylate diisodecyl (hereinafter referred to as "ester A6").

The resulting ester A6 had an ester value of 244 mg KOH/g, an acid value of 0.01 mg KOH/g, and a color number of 10.

Production Example A7

A method similar to that in Production Example A1 was performed, except that 87 g (0.6 mol) of n-nonyl alcohol and 87 g (0.6 mol) of isononyl alcohol were added instead of 173 g of the saturated aliphatic alcohol (Linevol 9: Shell Chemicals), thereby obtaining 170 g of 1,2-cyclohexane dicarboxylate diester (hereinafter referred to as "ester A7").

The resulting ester A7 had an ester value of 258 mg KOH/g, an acid value of 0.01 mg KOH/g, and a color number of 10.

Example A-1

The molding processability (gelation temperature) of the resulting 1,2-cyclohexane dicarboxylate diester (ester A1) obtained in Production Example 1 was measured. Table 1 shows the results.

Subsequently, a vinyl chloride-based resin composition was prepared using ester A1 according to Production Method 1. Subsequently, a vinyl chloride sheet was produced using the resulting vinyl chloride-based resin composition, and a tensile test, a cold resistance test, and a heat resistance test were performed. Table 1 shows the results.

Example A-2

A method similar to that in Example A-1 was performed, except that ester A2 was used instead of ester A1, and the molding processability was measured. Subsequently, a vinyl chloride-based resin composition and a vinyl chloride sheet were produced, and a tensile test, a cold resistance test and a heat resistance test were performed. The results are summarized in Table 1.

Example A-3

A method similar to that in Example A-1 was performed, except that ester A3 was used instead of ester A1, and the molding processability was measured. Subsequently, a vinyl chloride-based resin composition and a vinyl chloride sheet were produced, and a tensile test, a cold resistance test, and a heat resistance test were performed. The results are summarized in Table 1.

Comparative Example A-1

A method similar to that in Example A-1 was performed, except that ester A4 was used instead of ester A1, and the molding processability was measured. Subsequently, a vinyl chloride-based resin composition and a vinyl chloride sheet were produced, and a tensile test, a cold resistance test, and a heat resistance test were performed. The results are summarized in Table 1.

Comparative Example A-2

A method similar to that in Example A-1 was performed, except that ester A5 was used instead of ester A1, and the molding processability was measured. Subsequently, a vinyl chloride-based resin composition and a vinyl chloride sheet were produced, and a tensile test, a cold resistance test, and a heat resistance test were performed. The results are summarized in Table 1.

Comparative Example A-3

A method similar to that in Example A-1 was performed, except that ester A6 was used instead of ester A1, and the molding processability was measured. Subsequently, a vinyl chloride-based resin composition and a vinyl chloride sheet were produced, and a tensile test, a cold resistance test, and a heat resistance test were performed. The results are summarized in Table 1.

Comparative Example A-4

A method similar to that in Example A-1 was performed, except that ester A7 was used instead of ester A1, and the molding processability was measured. Subsequently, a vinyl chloride-based resin composition and a vinyl chloride sheet were produced, and a tensile test, a cold resistance test, and a heat resistance test were performed. The results are summarized in Table 1.

(B) Plasticizer for Vinyl Chloride Resin Containing 4-Cyclohexene-1,2-Dicarboxylate Diester Production Example B1

182.6 g (1.2 mol) of 4-cyclohexene-1,2-dicarboxylic acid anhydride (RIKACID TH: New Japan Chemical Co., Ltd.), 416 g (2.9 mol) of saturated aliphatic alcohol (Linevol 9: Shell Chemicals) containing 85.1 wt % of linear $C_9$ saturated aliphatic alcohol and 11.7 wt % of branched $C_9$ saturated aliphatic alcohol, and 0.24 g of tetraisopropyltitanate as an esterification catalyst were added to a 2-L four-necked flask equipped with a thermometer, a decanter, a stirring blade, and a reflux condenser tube, and an esterification reaction was conducted under a reaction temperature of 200° C. Under reduced pressure, the reaction was continued while refluxing the alcohol and removing the generated water to the outside of the system until the acid value of the reaction solution became 0.5 mg KOH/g. After the reaction was completed, unreacted alcohol was distilled off to the outside of the system under reduced pressure, followed by neutralization, washing with water, and dehydration by standard methods, thereby obtaining 449 g of the target 4-cyclohexene-1,2-dicarboxylate diester (hereinafter referred to as "ester B1").

TABLE 1

| Examination Item | Unit (Condition) | Example A-1 | Example A-2 | Example A-3 | Comparative Example A-1 | Comparative Example A-2 | Comparative Example A-3 | Comparative Example A-4 |
|---|---|---|---|---|---|---|---|---|
| Plasticizer Type | | Ester A1 | Ester A2 | Ester A3 | Ester A4 | Ester A5 | Ester A6 | Ester A7 |
| Linear-Chain Ratio of Raw-Material Alcohol (%) | | 87 | 70 | 90 | 0 | 10 | 55 | 0 |
| Molding Processability — Gelation Temperature | ° C. | 133 | 133 | 133 | 128 | 137 | 133 | 146 |
| Tensile Characteristics — 100% Modulus | MPa | 10.3 | 10.4 | 10.4 | 10.1 | 10.8 | 10.6 | 12.6 |
| Strength | Mpa | 21.7 | 22.0 | 21.7 | 22.6 | 22.1 | 22.0 | 21.4 |
| Elongation | % | 363 | 361 | 355 | 338 | 361 | 361 | 364 |
| Cold Resistance — Softening Temperature | ° C. | −38 | −36 | −38 | −26 | −30 | −34 | −30 |
| Heat Resistance — Volatile Loss | % (170° C., 60 Minutes) | 3.4 | 4.2 | 3.2 | 14.0 | 7.7 | 4.7 | 3.6 |
| | % (170° C., 120 Minutes) | 6.6 | 7.1 | 6.4 | 19.0 | 14.0 | 8.1 | 6.5 |
| Sheet Discoloration | (170° C., 30 Minutes) | ◎ | ◎ | ◎ | Δ | ◎ | ◎ | ○ |
| | (170° C., 60 Minutes) | ○ | ○ | ○ | XX | ○Δ | ○ | Δ |

Evaluation Results

The results of Table 1 revealed that the vinyl chloride-based resin compositions (Examples A-1 to A-3) containing the 1,2-cyclohexane dicarboxylate diester of the present invention as a plasticizer were clearly significantly superior in cold resistance and heat resistance, compared with the resin compositions (Comparative Examples 1 and 2) containing a previously known plasticizer. Further, the results of Table 1 also revealed that the vinyl chloride-based resin compositions (Examples 1 to 3) of the present invention were superior not only in cold resistance and heat resistance but also in the property of evenly mixing with the resin (compatibility) and molding processability, compared with the resin compositions (Comparative Examples A-3 and A-4) containing 1,2-cyclohexane dicarboxylate diester that fall out of the range of the present invention as a plasticizer.

The resulting ester B1 had an ester value of 254 mg KOH/g, an acid value of 0.04 mg KOH/g, and a color number of 15.

Production Example B2

A method similar to that in Production Example B1 was performed, except that 416 g of n-nonyl alcohol was added instead of 416 g of the saturated aliphatic alcohol (Linevol 9: Shell Chemicals), thereby obtaining 360 g of 4-cyclohexene-1,2-dicarboxylate di(n-nonyl) (hereinafter referred to as "ester B2").

The resulting ester B2 had an ester value of 257 mg KOH/g, an acid value of 0.06 mg KOH/g, and a color number of 20.

Production Example B3

A method similar to that in Production Example B1 was performed, except that 292 g (2.0 mol) of n-nonyl alcohol and 124 g (0.9 mol) of isononyl alcohol were added instead of 416 g of the saturated aliphatic alcohol (Linevol 9: Shell Chemicals), thereby obtaining 370 g of 4-cyclohexene-1,2-dicarboxylate diester (hereinafter referred to as "ester B3").

The resulting ester B3 had an ester value of 257 mg KOH/g, an acid value of 0.04 mg KOH/g, and a color number of 10.

Production Example B4

A method similar to that in Production Example B1 was performed, except that 374 g of 2-ethylhexanol was added instead of 416 g of the saturated aliphatic alcohol (Linevol 9: Shell Chemicals), thereby obtaining 269 g of 4-cyclohexene-1,2-dicarboxylate di(2-ethylhexyl) (hereinafter referred to as "ester B4").

The resulting ester B4 had an ester value of 283 mg KOH/g, an acid value of 0.01 mg KOH/g, and a color number of 10.

Production Example B5

A method similar to that in Production Example B1 was performed, except that 415 g of isononyl alcohol was added instead of 416 g of the saturated aliphatic alcohol (Linevol 9: Shell Chemicals), thereby obtaining 350 g of 4-cyclohexene-1,2-dicarboxylate diisononyl (hereinafter referred to as "ester B5").

The resulting ester B5 had an ester value of 261 mg KOH/g, an acid value of 0.01 mg KOH/g, and a color number of 15.

Production Example B6

A method similar to that in Production Example B1 was performed, except that 208 g (1.4 mol) of n-nonyl alcohol and 208 g (1.4 mol) of isononyl alcohol were added instead of 416 g of the saturated aliphatic alcohol (Linevol 9: Shell Chemicals), thereby obtaining 432 g of 4-cyclohexene-1,2-dicarboxylate diester (hereinafter referred to as "ester B6").

The resulting ester B6 had an ester value of 258 mg KOH/g, an acid value of 0.04 mg KOH/g, and a color number of 10.

Production Example B7

A method similar to that in Production Example B1 was performed, except that 456 g of isodecyl alcohol was added instead of 416 g of the saturated aliphatic alcohol (Linevol 9: Shell Chemicals), thereby obtaining 460 g of 4-cyclohexene-1,2-dicarboxylate diisodecyl (hereinafter referred to as "ester B7").

The resulting ester B7 had an ester value of 246 mg KOH/g, an acid value of 0.06 mg KOH/g, and a color number of 15.

Example B-1

A vinyl chloride-based resin composition was produced using the resulting 4-cyclohexene-1,2-dicarboxylate diester (ester B1) obtained in Production Example B1 according to Production Method 1 described above. Subsequently, a vinyl chloride sheet was produced using the resulting vinyl chloride-based resin composition, and a tensile test, a cold resistance test, and a heat resistance test were performed. Table 2 shows the results.

Example B-2

A vinyl chloride-based resin composition and a vinyl chloride sheet were produced using a method similar to that in Example B-1, except that ester B2 was used instead of ester B1, and a tensile test, a cold resistance test, and a heat resistance test were performed. The results are summarized in Table 2.

Example B-3

A vinyl chloride-based resin composition and a vinyl chloride sheet were produced using a method similar to that in Example B-1, except that ester B3 was used instead of ester B1, and a tensile test, a cold resistance test, and a heat resistance test were performed. The results are summarized in Table 2.

Comparative Example B-1

A vinyl chloride-based resin composition and a vinyl chloride sheet were produced using a method similar to that in Example B-1, except that ester B4 was used instead of ester B1, and a tensile test, a cold resistance test, and a heat resistance test were performed. The results are summarized in Table 2.

Comparative Example B-2

A vinyl chloride-based resin composition and a vinyl chloride sheet were produced using a method similar to that in Example B-1, except that ester B5 was used instead of ester B1, and a tensile test, a cold resistance test, and a heat resistance test were performed. The results are summarized in Table 2.

Comparative Example B-3

A vinyl chloride-based resin composition and a vinyl chloride sheet were produced using a method similar to that in Example B-1, except that ester B6 was used instead of ester B1, and a tensile test, a cold resistance test, and a heat resistance test were performed. The results are summarized in Table 2.

Comparative Example B-4

A vinyl chloride-based resin composition and a vinyl chloride sheet were produced using a method similar to that in Example B-1, except that ester B7 was used instead of ester B1, and a tensile test, a cold resistance test, and a heat resistance test were performed. The results are summarized in Table 2.

Comparative Example B-5

A vinyl chloride-based resin composition and a vinyl chloride sheet were produced using a method similar to that in Example B-1, except that di-2-ethylhexyl phthalate (SANSO CIZER DOP, New Japan Chemical Co., Ltd.) was used instead of ester B1, and a tensile test, a cold resistance test, and a heat resistance test were performed. The results are summarized in Table 2.

TABLE 2

| Examination Item | Unit (Condition) | Example | | | Comparative Example | | | | |
|---|---|---|---|---|---|---|---|---|---|
| | | B-1 | B-2 | B-3 | B-1 | B-2 | B-3 | B-4 | B-5 |
| Plasticizer Type | | Ester B1 | Ester B2 | Ester B3 | Ester B4 | Ester B5 | Ester B6 | Ester B7 | DOP |
| Linear-Chain Ratio of Raw-Material Alcohol (%) | | 85 | 100 | 70 | 0 | 10 | 50 | 0 | — |
| Tensile Characteristics 100% Modulus | MPa | 9.4 | 9.4 | 9.4 | 8.9 | 9.9 | 9.6 | 11.1 | 9.1 |
| Strength | MPa | 21.3 | 19.8 | 21.4 | 21.4 | 21.3 | 21.2 | 23.8 | 20.3 |
| Elongation | % | 383 | 347 | 384 | 372 | 360 | 384 | 380 | 328 |
| Cold Resistance Softening Temperature | °C. | −39 | −41 | −38 | −28 | −31 | −33 | −28 | −24 |
| Heat Resistance Volatile Loss | % (170° C., 60 Minutes) | 4.2 | 3.9 | 4.5 | 11 | 5.9 | 5 | 4.2 | 9.8 |
| | % (170° C., 120 Minutes) | 8.4 | 7.9 | 8.6 | 16.6 | 10.9 | 9.6 | 8.3 | 15.4 |
| Sheet Discoloration | (170° C., 30 Minutes) | ◎ | ◎ | ◎ | ○Δ | ○ | ◎ | ○Δ | ○Δ |
| | (170° C., 60 Minutes) | ○Δ | ○Δ | ○Δ | XX | Δ | Δ | X | XX |

Evaluation Results

The results of Table 2 revealed that 4-cyclohexene-1,2-dicarboxylate diester (Examples B-1 to B-3) of the present invention were clearly superior in flexibility, cold resistance, and heat resistance, compared with 4-cyclohexene-1,2-dicarboxylate diester (Comparative Examples B-1 to B-4) that fall out of the range of the present invention. Further, the vinyl chloride-based resin compositions of the present invention (Examples B-1 to B-3) were greatly improved in cold resistance and heat resistance, compared with the currently used versatile phthalate diester (Comparative Example B-5); thus, the vinyl chloride-based resin compositions of the present invention are not merely non-phthalate plasticizers, but are also useful in terms of performance. In particular, the results of Example B-1, which uses ester B1 obtained in Production Example B1, revealed that the performance also in terms of tensile strength and tensile elongation was equal to or greater than known plasticizers, and thus the usefulness was evident.

(C) Vinyl Chloride Paste Sol Composition Containing 4-Cyclohexene-1,2-Dicarboxylate Diester Production Example C1

182.6 g (1.2 mol) of 4-cyclohexene-1,2-dicarboxylic acid anhydride (RIKACID TH: New Japan Chemical Co., Ltd.), 416 g (2.9 mol) of saturated aliphatic alcohol (Linevol 9: Shell Chemicals) containing 85.1 wt % of linear $C_9$ saturated aliphatic alcohol and 11.7 wt % of branched $C_9$ saturated aliphatic alcohol, and 0.24 g of tetraisopropyltitanate as an esterification catalyst were added to a 2-L four-necked flask equipped with a thermometer, a decanter, a stirring blade, and a reflux condenser tube, and an esterification reaction was conducted under a reaction temperature of 200° C. Under reduced pressure, the reaction was continued while refluxing the alcohol and removing the generated water to the outside of the system until the acid value of the reaction solution became 0.5 mg KOH/g. After the reaction was completed, unreacted alcohol was distilled off to the outside of the system under reduced pressure, followed by neutralization, washing with water, and dehydration by standard methods, thereby obtaining 449 g of the target 4-cyclohexene-1,2-dicarboxylate diester (hereinafter referred to as "ester C1").

The resulting ester C1 had an ester value of 260 mg KOH/g, an acid value of 0.04 mg KOH/g, and a color number of 10.

Production Example C2

A method similar to that in Production Example C1 was performed, except that 416 g of n-nonyl alcohol was added instead of 416 g of the saturated aliphatic alcohol (Linevol 9: Shell Chemicals), thereby obtaining 360 g of 4-cyclohexene-1,2-dicarboxylate di(n-nonyl) (hereinafter referred to as "ester C2").

The resulting ester C2 had an ester value of 257 mg KOH/g, an acid value of 0.06 mg KOH/g, and a color number of 20.

Production Example C3

A method similar to that in Production Example C1 was performed, except that 248 g (1.7 mol) of n-nonyl alcohol and 124 g (0.9 mol) of isononyl alcohol were added instead of 416 g of the saturated aliphatic alcohol (Linevol 9: Shell Chemicals), thereby obtaining 370 g of 4-cyclohexene-1,2-dicarboxylate diester (hereinafter referred to as "ester C3").

The resulting ester C3 had an ester value of 257 mg KOH/g, an acid value of 0.04 mg KOH/g, and a color number of 10.

Production Example C4

A method similar to that in Production Example C1 was performed, except that 374 g of 2-ethylhexanol was added instead of 416 g of the saturated aliphatic alcohol (Linevol 9: Shell Chemicals), thereby obtaining 269 g of 4-cyclohexene-1,2-dicarboxylate di(2-ethylhexyl) (hereinafter referred to as "ester C4").

The resulting ester C4 had an ester value of 283 mg KOH/g, an acid value of 0.01 mg KOH/g, and a color number of 10.

Production Example C5

A method similar to that in Production Example C1 was performed, except that 415 g of isononyl alcohol was added instead of 416 g of the saturated aliphatic alcohol (Linevol 9: Shell Chemicals), thereby obtaining 350 g of 4-cyclohexene-1,2-dicarboxylate diisononyl (hereinafter referred to as "ester C5").

The resulting ester C5 had an ester value of 261 mg KOH/g, an acid value of 0.01 mg KOH/g, and a color number of 10.

Production Example C6

A method similar to that in Production Example C1 was performed, except that 208 g (1.4 mol) of n-nonyl alcohol and 208 g (1.4 mol) of isononyl alcohol were added instead of 416 g of the saturated aliphatic alcohol (Linevol 9: Shell Chemicals), thereby obtaining 432 g of 4-cyclohexene-1,2-dicarboxylate diester (hereinafter referred to as "ester C6").

The resulting ester C6 had an ester value of 258 mg KOH/g, an acid value of 0.04 mg KOH/g, and a color number of 10.

Production Example C7

A method similar to that in Production Example C1 was performed, except that 456 g of isodecyl alcohol was added instead of 416 g of the saturated aliphatic alcohol (Linevol 9: Shell Chemicals), thereby obtaining 460 g of 4-cyclohexene-1,2-dicarboxylate diisodecyl (hereinafter referred to as "ester C7").

The resulting ester C7 had an ester value of 246 mg KOH/g, an acid value of 0.06 mg KOH/g, and a color number of 20.

Example C-1

Using the 4-cyclohexene-1,2-dicarboxylate diester (ester C1) obtained in Production Example C1, the sol viscosity was measured according to the method in "(5) Sol Viscosity of Vinyl Chloride Paste Sol Composition" above. Table 3 shows the results. Subsequently, according to Production Method 3, a vinyl chloride-based paste sol composition was prepared; then, a vinyl chloride sheet was produced from the resulting vinyl chloride paste sol, and a tensile test, a cold resistance test, and a heat resistance test were performed. Table 3 shows the results.

Example C-2

The sol viscosity was measured using a method similar to that in Example C-1, except that ester C2 was used instead of ester C1. Subsequently, a vinyl chloride-based paste sol composition and a vinyl chloride sheet were produced, and a tensile test, a cold resistance test, and a heat resistance test were performed. The results are summarized in Table 3.

Example C-3

The sol viscosity was measured using a method similar to that in Example C-1, except that ester C3 was used instead of ester C1. Subsequently, a vinyl chloride-based paste sol composition and a vinyl chloride sheet were produced, and a tensile test, a cold resistance test, and a heat resistance test were performed. The results are summarized in Table 3.

Comparative Example C-1

The sol viscosity was measured using a method similar to that in Example C-1, except that ester C4 was used instead of ester C1. Subsequently, a vinyl chloride-based paste sol composition and a vinyl chloride sheet were produced, and a tensile test, a cold resistance test, and a heat resistance test were performed. The results are summarized in Table 3.

Comparative Example C-2

The sol viscosity was measured using a method similar to that in Example C-1, except that ester C5 was used instead of ester 15. Subsequently, a vinyl chloride-based paste sol composition and a vinyl chloride sheet were produced, and a tensile test, a cold resistance test, and a heat resistance test were performed. The results are summarized in Table 3.

Comparative Example C-3

The sol viscosity was measured using a method similar to that in Example C-1, except that ester C6 was used instead of ester C1. Subsequently, a vinyl chloride-based paste sol composition and a vinyl chloride sheet were produced, and a tensile test, a cold resistance test, and a heat resistance test were performed. The results are summarized in Table 3.

Comparative Example C-4

The sol viscosity was measured using a method similar to that in Example C-1, except that ester C7 was used instead of ester C1. Subsequently, a vinyl chloride-based paste sol composition and a vinyl chloride sheet were produced, and a tensile test, a cold resistance test, and a heat resistance test were performed. The results are summarized in Table 3.

Comparative Example C-5

The sol viscosity was measured using a method similar to that in Example C-1, except that di-2-ethylhexyl phthalate (SANSO CIZER DOP, New Japan Chemical Co., Ltd.) was used instead of ester C1, and a tensile test, a cold resistance test, and a heat resistance test were performed. The results are summarized in Table 3.

TABLE 3

| | Examination Item | Unit (Condition) | Example | | | Comparative Example | | | | |
|---|---|---|---|---|---|---|---|---|---|---|
| | | | C-1 | C-2 | C-3 | C-1 | C-2 | C-3 | C-4 | C-5 |
| Plasticizer | Type | | Ester C1 | Ester C2 | Ester C3 | Ester C4 | Ester C5 | Ester C6 | Ester C7 | DOP |
| | Linear-Chain Ratio of Raw-Material Alcohol | % | 85 | 100 | 70 | 0 | 10 | 55 | 0 | 0 |
| Sol Characteristics | Initial Sol Viscosity | Pa·s | 3.9 | 3.2 | 4.4 | 8.4 | 5.7 | 4.7 | 8.1 | 12.3 |
| | Sol Viscosity after 7 days | Pa·s | 6.7 | 6.3 | 6.9 | 13.2 | 10 | 7.8 | 12.3 | 21.4 |

TABLE 3-continued

| | Examination Item | Unit (Condition) | Example | | | Comparative Example | | | | |
|---|---|---|---|---|---|---|---|---|---|---|
| | | | C-1 | C-2 | C-3 | C-1 | C-2 | C-3 | C-4 | C-5 |
| | Viscosity Increase Value | Pa · s | 2.8 | 3.1 | 2.5 | 4.8 | 4.3 | 3.1 | 4.2 | 9.1 |
| Tensile Characteristics | 100% Modulus | MPa | 7.4 | 7.4 | 7.4 | 7.4 | 7.8 | 7.6 | 8.7 | 6.8 |
| | Strength | MPa | 15.5 | 15 | 16.1 | 15.6 | 17.3 | 16.5 | 15.6 | 15.7 |
| | Breaking Elongation | % | 328 | 320 | 342 | 318 | 365 | 353 | 303 | 341 |
| Cold Resistance | Softening Temperature | ° C. | −58 | −59 | −57 | −45 | −45 | −55 | −48 | −41 |
| Heat Resistance | Volatile Loss | % (170° C., 30 Minutes) | 3.1 | 2.9 | 3.3 | 11.2 | 6 | 3.4 | 3.1 | 6.8 |
| | | % (170° C., 60 Minutes) | 5.9 | 5.6 | 6.3 | 15.8 | 11.5 | 6.9 | 6.4 | 13 |
| | Sheet Discoloration | (170° C., 30 Minutes) | ◎ | ◎ | ◎ | ○ | ◎ | ◎ | ○ | X |
| | | (170° C., 60 Minutes) | Δ | Δ | Δ | XX | X | X | XX | XX |

Evaluation Results

The results shown in Table 3 revealed that the vinyl chloride-based paste sol compositions (Examples C-1 to C-3) containing the 4-cyclohexene-1,2-dicarboxylate diester of the present invention had low viscosity and insignificant increase in viscosity over time, as well as superior processability and storage stability, compared with a paste sol composition (Comparative Example C-5) containing a currently used versatile phthalate diester. Further, the results also revealed that these vinyl chloride-based paste sol compositions had desirable flexibility and further superior cold resistance and heat resistance, compared with the paste sol compositions (Comparative Examples C-1 to C-4) containing 4-cyclohexene-1,2-dicarboxylate diesters that fall out of the range of the present invention.

(D) Medical Vinyl Chloride Resin Composition and Medical Material Containing 4-Cyclohexene-1,2-Dicarboxylate Diester Production Example D1

182.6 g (1.2 mol) of 4-cyclohexene-1,2-dicarboxylic acid anhydride (RIKACID TH: New Japan Chemical Co., Ltd.), 416 g (2.9 mol) of saturated aliphatic alcohol (Linevol 9: Shell Chemicals) containing 85.1 wt % of linear $C_9$ saturated aliphatic alcohol and 11.7 wt % of branched $C_9$ saturated aliphatic alcohol, and 0.24 g of tetraisopropyltitanate as an esterification catalyst were added to a 1-L four-necked flask equipped with a thermometer, a decanter, a stirring blade, and a reflux condenser tube, and an esterification reaction was conducted under a reaction temperature of 200° C. Under reduced pressure, the reaction was continued while refluxing the alcohol and removing the generated water to the outside of the system until the acid value of the reaction solution became 0.5 mg KOH/g. After the reaction was completed, unreacted alcohol was distilled off to the outside of the system under reduced pressure, followed by neutralization, washing with water, and dehydration by standard methods, thereby obtaining 449 g of the target 4-cyclohexene-1,2-dicarboxylate diester (hereinafter referred to as "ester D1").

The resulting ester D1 had an ester value of 260 mg KOH/g, an acid value of 0.04 mg KOH/g, and a color number of 10.

Production Example D2

A method similar to that in Production Example D1 was performed, except that 416 g of n-nonyl alcohol was added instead of 416 g of the saturated aliphatic alcohol (Linevol 9: Shell Chemicals), thereby obtaining 360 g of 4-cyclohexene-1,2-dicarboxylate di(n-nonyl) (hereinafter referred to as "ester D2").

The resulting ester D2 had an ester value of 257 mg KOH/g, an acid value of 0.06 mg KOH/g, and a color number of 20.

Production Example D3

A method similar to that in Production Example D1 was performed, except that 248 g (1.7 mol) of n-nonyl alcohol and 124 g (0.9 mol) of isononyl alcohol were added instead of 416 g of the saturated aliphatic alcohol (Linevol 9: Shell Chemicals), thereby obtaining 370 g of 4-cyclohexene-1,2-dicarboxylate diester (hereinafter referred to as "ester D3").

The resulting ester D3 had an ester value of 257 mg KOH/g, an acid value of 0.04 mg KOH/g, and a color number of 10.

Production Example D4

A method similar to that in Production Example D1 was performed, except that 415 g of isononyl alcohol was added instead of 416 g of the saturated aliphatic alcohol (Linevol 9: Shell Chemicals), thereby obtaining 350 g of 4-cyclohexene-1,2-dicarboxylate diisononyl (hereinafter referred to as "ester D4").

The resulting ester D4 had an ester value of 261 mg KOH/g, an acid value of 0.01 mg KOH/g, and a color number of 10.

Production Example D5

A method similar to that in Production Example D1 was performed, except that 208 g (1.4 mol) of n-nonyl alcohol and 208 g (1.4 mol) of isononyl alcohol were added instead of 416 g of the saturated aliphatic alcohol (Linevol 9: Shell Chemicals), thereby obtaining 432 g of 4-cyclohexene-1,2-dicarboxylate diester (hereinafter referred to as "ester D5").

The resulting ester D5 had an ester value of 258 mg KOH/g, an acid value of 0.04 mg KOH/g, and a color number of 10.

Production Example D6

A method similar to that in Production Example D1 was performed, except that 178 g (1.2 mol) of phthalic acid dianhydride was added instead of 182.6 g of 4-cyclohexene-1,2-dicarboxylic acid anhydride, thereby obtaining 442 g of diisononyl phthalate ester (hereinafter referred to as "ester D6").

The resulting ester D6 had an ester value of 265 mg KOH/g, an acid value of 0.03 mg KOH/g, and a color number of 10.

Example D-1

A medical vinyl chloride-based resin composition of the present invention was prepared using the 4-cyclohexene-1,2-dicarboxylate diester (ester D1) obtained in Production Example D1 as a plasticizer according to Production Method 2 above. Subsequently, vinyl chloride sheets (a rolled sheet and a pressed sheet) were produced using the resulting vinyl chloride-based resin composition, and a tensile test, a cold resistance test, a heat resistance test, a heat-aging resistance test, and a ultraviolet irradiation test were performed. Table 4 shows the results.

Example D-2

A medical vinyl chloride-based resin composition of the present invention was produced using a method similar to that in Example D-1, except that ester D2 was used instead of ester D1, and a vinyl chloride sheet was produced from the resulting vinyl chloride-based resin composition, and a tensile test, a cold resistance test, a heat resistance test, a heat-aging resistance test, and a ultraviolet irradiation test were performed. The results are summarized in Table 4.

Example D-3

A medical vinyl chloride-based resin composition of the present invention was produced using a method similar to that in Example D-1, except that ester D3 was used instead of ester D1, and a vinyl chloride sheet was produced from the resulting vinyl chloride-based resin composition, and a tensile test, a cold resistance test, a heat resistance test, a heat-aging resistance test, and a ultraviolet irradiation test were performed. The results are summarized in Table 4.

Comparative Example D-1

A vinyl chloride-based resin composition was produced using a method similar to that in Example D-1, except that ester D4 was used instead of ester D1, and a vinyl chloride sheet was produced from the resulting vinyl chloride-based resin composition, and a tensile test, a cold resistance test, a heat resistance test, a heat-aging resistance test, and a ultraviolet irradiation test were performed. The results are summarized in Table 4.

Comparative Example D-2

A vinyl chloride-based resin composition was produced using a method similar to that in Example D-1, except that ester D5 was used instead of ester D1, and a vinyl chloride sheet was produced from the resulting vinyl chloride-based resin composition, and a tensile test, a cold resistance test, a heat resistance test, a heat-aging resistance test, and a ultraviolet irradiation test were performed. The results are summarized in Table 4.

Comparative Example D-3

A vinyl chloride-based resin composition was produced using a method similar to that in Example D-1, except that a commercially available 1,2-cyclohexane dicarboxylate diisononyl (hexamoll DINCH, BASF A.G.) was used instead of ester D1, and a vinyl chloride sheet was produced from the resulting vinyl chloride-based resin composition, and a tensile test, a cold resistance test, a heat resistance test, a heat-aging resistance test, and a ultraviolet irradiation test were performed. The results are summarized in Table 4.

Comparative Example D-4

A vinyl chloride-based resin composition was produced using a method similar to that in Example D-1, except that ester D6 was used instead of ester D1, and a vinyl chloride sheet was produced from the resulting vinyl chloride-based resin composition, and a tensile test, a cold resistance test, a heat resistance test, a heat-aging resistance test, and a ultraviolet irradiation test were performed. The results are summarized in Table 4.

Comparative Example D-5

A vinyl chloride-based resin composition was produced using a method similar to that in Example D-1, except that di-2-ethylhexyl phthalate (SANSO CIZER DOP, New Japan Chemical Co., Ltd.) was used instead of ester D1, and a vinyl chloride sheet was produced from the resulting vinyl chloride-based resin composition, and a tensile test, a cold resistance test, a heat resistance test, a heat-aging resistance test, and a ultraviolet irradiation test were performed. The results are summarized in Table 4.

Comparative Example D-6

A vinyl chloride-based resin composition was produced using a method similar to that in Example D-1, except that di-2-ethylhexyl terephthalate (Dioctyl terephthalate (DOTP), Sigma-Aldrich) was used instead of ester D1, and a vinyl chloride sheet was produced from the resulting vinyl chloride-based resin composition, and a tensile test, a cold resistance test, a heat resistance test, a heat-aging resistance test, and a ultraviolet irradiation test were performed. The results are summarized in Table 4.

Comparative Example D-7

A vinyl chloride-based resin composition was produced using a method similar to that in Example D-1, except that tris(2-ethylhexyl)trimellitate (Trioctyl trimellitate TOTM, Sigma-Aldrich) was used instead of ester D1, and a vinyl chloride sheet was produced from the resulting vinyl chloride-based resin composition, and a tensile test, a cold resistance test, a heat resistance test, a heat-aging resistance test, and a ultraviolet irradiation test were performed. The results are summarized in Table 4.

TABLE 4

| Examination | | Unit | Example | | | Comparative Example | | | | | | |
|---|---|---|---|---|---|---|---|---|---|---|---|---|
| Item | | (Condition) | D-1 | D-2 | D-3 | D-1 | D-2 | D-3 | D-4 | D-5 | D-6 | D-7 |
| Plasticizer | Type | | Ester D1 | Ester D2 | Ester D3 | Ester D4 | Ester D5 | DINCH | Ester D6 | DOP | DOTP | TOTM |
| | Linear-Chain Ratio of Raw-Material Alcohol | % | 85 | 100 | 70 | 10 | 55 | 11 | 10 | 0 | 0 | 0 |
| Tensile Characteristics | 100% Modulus | MPa | 9.4 | 9.4 | 9.4 | 9.9 | 9.6 | 10.8 | 10.1 | 9.1 | 10.7 | 13.1 |
| | Strength | MPa | 21.3 | 19.8 | 21.4 | 21.3 | 21.2 | 22.1 | 22.4 | 20.3 | 23.3 | 24 |
| | Breaking Elongation | % | 383 | 347 | 384 | 360 | 384 | 361 | 352 | 328 | 368 | 330 |
| Cold Resistance | Softening Temperature | °C. | −39 | −41 | −38 | −31 | −33 | −30 | −27 | −24 | −25 | −17 |
| Heat Resistance | Volatile Loss | % (170° C., 60 Minutes) | 4.2 | 3.9 | 4.5 | 5.9 | 5 | 5.8 | 3.9 | 9.8 | 4.3 | 0.6 |
| | | % (170° C., 120 Minutes) | 8.4 | 7.9 | 8.6 | 10.9 | 9.6 | 10.8 | 7.6 | 15.4 | 9 | 1.2 |
| | Sheet Discoloration | (170° C., 60 Minutes) | ◎ | ◎ | ◎ | ○ | ◎ | ○△ | ○△ | ○△ | ○ | ○△ |
| | | (170° C., 120 Minutes) | ○△ | ○△ | ○△ | △ | △ | XX | X | XX | X | X |
| Ultraviolet Resistance | Sheet Discoloration | After 5 Cycles | ◎ | ◎ | ◎ | ◎ | ◎ | ○ | X | X | X | △ |

Evaluation Results

The results of Table 4 clearly revealed that the discoloration of the medical vinyl chloride-based resin compositions (Examples D-1 to D-3) containing the 4-cyclohexene-1,2-dicarboxylate diester of the present invention after the ultraviolet irradiation test was very low, compared with the resin compositions (Comparative Examples D-3 to D-7) containing known plasticizers. Generally, the discoloration of molded articles obtained from vinyl chloride-based resin compositions is caused by generation of conjugated polyene due to a dehydrochlorination reaction of vinyl chloride-based resin. Since the discoloration is promoted by ultraviolet or radial ray irradiation, it is known that vinyl chloride-based resin compositions undergo discoloration during a sterilization or disinfection treatment. The above results suggested that the discoloration occurs not only by ultraviolet irradiation but also during a sterilization or disinfection treatment using other various radial rays that are assumed to cause the discoloration by the same mechanism.

The medical vinyl chloride-based resin compositions (Examples D-1 to D-3) of the present invention had a low volatile loss, compared with the resin composition (Comparative Example D-5) containing DOP, which is most commonly used, or the resin composition (Comparative Example D-3) containing DINCH, which is attracting attention in recent years as a non-phthalate ester plasticizer in the field of medical materials. Thus, the concerns about deterioration such as decrease in flexibility due to volatilization of the plasticizer during a sterilization or disinfection treatment with boiling or heating in an autoclave or the like can be further reduced, thereby ensuring superior usability.

Further, by selecting the specific 4-cyclohexene-1,2-dicarboxylate diester of the present invention among 4-cyclohexene-1,2-dicarboxylate diesters as a plasticizer, the vinyl chloride-based resin compositions (Examples D-1 to D-3) of the present invention had a low volatile loss, compared with Comparative Examples D-1 and D-2; therefore, the concerns about deterioration such as decrease in flexibility due to volatilization of the plasticizer during a sterilization or disinfection treatment with boiling or heating in an autoclave or the like can be further reduced, thereby ensuring superior usability.

(E) Plasticizer for Vinyl Chloride Resin Containing 1,4-Cyclohexane Dicarboxylate Diester Production Example E1

240 g (1.2 mol) of 1,4-dimethyl cyclohexane dicarboxylate (product name SKY CHDM, SK Chemicals Co., Ltd.), 416 g (2.9 mol) of saturated aliphatic alcohol (Linevol 9: Shell Chemicals) containing 85.1 wt % of linear $C_9$ saturated aliphatic alcohol and 11.7 wt % of branched $C_9$ saturated aliphatic alcohol, and 0.5 g of tetraisopropyltitanate as an ester exchange catalyst were added to a 1-L four-necked flask equipped with a thermometer, a decanter, a stirring blade, and a reflux condenser tube, and an ester exchange reaction was conducted under a reaction temperature of 210° C. Under reduced pressure, the reaction was performed while refluxing the raw material alcohol and removing the generated methanol to the outside of the system until the peaks of the raw material and the intermediates were at or below the detection limit of gas chromatography. After the reaction was completed, unreacted alcohol was distilled off to the outside of the system under reduced pressure, followed by neutralization (base treatment), washing with water, and dehydration by standard methods, thereby obtaining 450 g of 1,4-cyclohexane dicarboxylate diester (hereinafter referred to as "ester E1").

The resulting ester E1 had an ester value of 261 mg KOH/g, an acid value of 0.04 mg KOH/g, and a color number of 10.

Production Example E2

A method similar to that in Production Example E1 was performed, except that 374 g of 2-ethylhexanol was used instead of 416 g of the saturated aliphatic alcohol (Linevol 9: Shell Chemicals), thereby obtaining 435 g of 1,4-cyclohexane dicarboxylate di-2-ethylhexyl (hereinafter referred to as "ester E2").

The resulting ester E2 had an ester value of 283 mg KOH/g, an acid value of 0.01 mg KOH/g, and a color number of 10.

Production Example E3

A method similar to that in Production Example 22(?) was performed, except that 416 g of isononyl alcohol was used instead of 416 g of the saturated aliphatic alcohol (Linevol 9: Shell Chemicals), thereby obtaining 476 g of 1,4-cyclohexane dicarboxylate diisononyl (hereinafter referred to as "ester E3").

The resulting ester E3 had an ester value of 265 mg KOH/g, an acid value of 0.01 mg KOH/g, and a color number of 15.

Example E-1

A vinyl chloride-based resin composition of the present invention was prepared using ester E1 produced in Production Example E1 according to Production Method 1. Subsequently, a rolled sheet and a pressed sheet were produced using the resulting vinyl chloride-based resin composition, and a tensile test, a cold resistance test, and a heat resistance test were performed. Table 5 shows the results.

Comparative Example E-1

A method similar to that in Example E-1 was performed, except that ester E2 obtained in Production Example E2 was used instead of ester E1, thereby preparing a vinyl chloride-based resin composition that falls out of the range of the present invention. A rolled sheet and a pressed sheet were produced using the resulting resin composition, and a tensile test, a cold resistance test, and a heat resistance test were performed. The results are summarized in Table 5.

Comparative Example E-2

A method similar to that in Example E-1 was performed, except that ester E3 obtained in Production Example E3 was used instead of ester E1, thereby preparing a vinyl chloride-based resin composition that falls out of the range of the present invention. A rolled sheet and a pressed sheet were produced using the resulting resin composition, and a tensile test, a cold resistance test, and a heat resistance test were performed. The results are summarized in Table 5.

Comparative Example E-3

A method similar to that in Example E-1 was performed, except that a commercially available 1,2-cyclohexane dicarboxylate diisononyl (hexamoll DINCH, BASF A.G.) was used instead of ester E1, thereby preparing a vinyl chloride-based resin composition that falls out of the range of the present invention. A rolled sheet and a pressed sheet were produced using the resulting resin composition, and a tensile test, a cold resistance test, and a heat resistance test were performed. The results are summarized in Table 5.

Comparative Example E-4

A method similar to that in Example E-1 was performed, except that a commercially available di-2-ethylhexyl phthalate (SANSO CIZER DOP, New Japan Chemical Co., Ltd.) was used instead of ester E1, thereby preparing a vinyl chloride-based resin composition that falls out of the range of the present invention. A rolled sheet and a pressed sheet were produced using the resulting resin composition, and a tensile test, a cold resistance test, and a heat resistance test were performed. The results are summarized in Table 5.

TABLE 5

| Examination Item | Unit (Condition) | Example E-1 | Comparative Example E-1 | Comparative Example E-2 | Comparative Example E-3 | Comparative Example E-4 |
|---|---|---|---|---|---|---|
| Plasticizer Type | | Ester E1 | Ester E2 | Ester E3 | DINCH | DOP |
| Linear-Chain Ratio of Raw-Material Alcohol (%) | | 87 | 0 | 10 | 10 | 0 |
| Tensile Characteristics 100% Modulus | MPa | 9 | 8.5 | 9.4 | 10.1 | 9.4 |
| Strength | Mpa | 20.9 | 20.5 | 21.6 | 22.7 | 21.4 |
| Elongation | % | 371 | 362 | 374 | 362 | 331 |
| Cold Resistance Softening Temperature | °C. | −42 | −32 | −33 | −30 | −24 |
| Heat Resistance Volatile Loss | % (170° C., 60 Minutes) | 3.1 | 10.5 | 4.7 | 7.4 | 8.8 |
| | % (170° C., 120 Minutes) | 6.2 | 17.1 | 8.8 | 13.4 | 15.1 |
| Sheet Discoloration | (170° C., 30 Minutes) | ⊚ | ○ | ⊚ | ○ | ○ |
| | (170° C., 60 Minutes) | ○ | X | ○△ | ○△ | XX |

Evaluation Results

The results of Table 5 revealed that the 1,4-cyclohexane dicarboxylate diester of the present invention (Example E-1) was clearly superior in flexibility and improved in cold resistance and heat resistance, compared not only with previously used phthalic acid plasticizer DOP (Comparative Example E-4) but also with non-phthalic acid plasticizer DINCH (Comparative Example E-3), which is currently widely used. Further, the balance of cold and heat resistance as well as tensile characteristics was also clearly superior compared with the 1,4-cyclohexane dicarboxylate diester of Comparative Example E-1 and Comparative Example E-2, which have different chain length or linear-chain ratio. These results thus revealed that the ester-based plasticizer in the range of the present invention is a very useful plasticizer that ensures high cold resistance and heat resistance that could not have been achieved by known plasticizers, as well as a superior balance with other properties.

(F) Plasticizer for Vinyl Chloride Resin Containing Cyclohexane Dicarboxylate Diester Production Example F1

444 g (3.0 mol) of phthalic acid dianhydride, 1,045 g (7.2 mol) of saturated aliphatic alcohol (Linevol 9: Shell Chemicals) containing 87.2 wt % of linear $C_9$ saturated aliphatic alcohol and 11.7 wt % of branched $C_9$ saturated aliphatic alcohol, and 0.6 g of tetraisopropyltitanate as an esterification catalyst were added to a 2-L four-necked flask equipped with a thermometer, a decanter, a stirring blade, and a reflux condenser tube, and an esterification reaction was conducted under a reaction temperature of 185° C. Under reduced pressure, the reaction was performed for 6 hours while refluxing the alcohol and removing the generated water to the outside of the system until the acid value of the reaction solution became 0.1 mg KOH/g. After the reaction was completed, unreacted alcohol was distilled off to the outside of the system under reduced pressure, followed by neutralization, washing with water, and dehydration by standard methods, thereby obtaining 1,149 g of phthalate diester.

Subsequently, 175 g of the obtained phthalate diester was placed in an autoclave, and hydrogenation was performed for 1.2 hours in the presence of 2.6 g of a ruthenium catalyst (ER-50: N.E. Chemcat Corporation) at 120° C. with a hydrogen pressure of 3 MPa, and the catalyst was filtered off. The nucleus-hydrogenated ester was added to a 500-ml four-necked flask equipped with a stirring rod, a thermometer, a vapor blowing pipe, and a decanter, and vapor was blown into the flask for an hour at 170° C., thereby removing residual alcohol. The degree of vacuum at vapor topping was 60 mmHg. After the vapor blowing was stopped, the pressure was gradually decreased over 30 minutes while maintaining the temperature, and the ester was dried. After cooling to room temperature at reduced pressure, the pressure was returned to atmospheric pressure, and purification was performed using activated carbon and activated alumina, thereby obtaining 150.3 g of the target 1,2-cyclohexane dicarboxylate diester (hereinafter referred to as "ester F1").

The resulting ester F1 had an ester value of 261 mg KOH/g, an acid value of 0.01 mg KOH/g, and a color number of 5.

Production Example F2

A method similar to that in Production Example F1 was performed, except that 2.6 g of a nickel catalyst (JGC C&C, N103) was used instead of 2.6 g of a ruthenium catalyst (ER-50: N.E. Chemcat Corporation), thereby obtaining 142.5 g of the target 1,2-cyclohexane dicarboxylate diester (hereinafter referred to as "ester F2").

The resulting ester F2 had an ester value of 261 mg KOH/g, an acid value of 0.01 mg KOH/g, and a color number of 5.

Production Example F3

A method similar to that in Production Example F1 was performed, except that 707 g (4.9 mol) of n-nonyl alcohol and 317 g (2.2 mol) of isononyl alcohol were added instead of 1045 g of the saturated aliphatic alcohol (Linevol 9: Shell Chemicals), thereby obtaining 144 g of the target 1,2-cyclohexane dicarboxylate diester (hereinafter referred to as "ester F3").

The resulting ester F3 had an ester value of 262 mg KOH/g, an acid value of 0.01 mg KOH/g, and a color number of 10.

Production Example F4

116 g (0.6 mol) of dimethyl terephthalate, 242 g (1.7 mol) of saturated aliphatic alcohol (Linevol 9: Shell Chemicals) containing 85.1 wt % of linear $C_9$ saturated aliphatic alcohol and 11.7 wt % of branched $C_9$ saturated aliphatic alcohol as a raw material alcohol, and 0.24 g of tetraisopropyltitanate as an ester exchange catalyst were added to a 1-L four-necked flask equipped with a thermometer, a decanter, a stirring blade, and a reflux condenser tube, and an ester exchange reaction was conducted under a reaction temperature of 220° C. Under reduced pressure, the reaction was performed while refluxing the raw material alcohol and removing the generated methanol to the outside of the system until the peaks of the raw material and the intermediates were at or below the detection limit of gas chromatography. After the reaction was completed, unreacted alcohol was distilled off to the outside of the system under reduced pressure, followed by neutralization (base treatment), washing with water, and dehydration by standard methods, thereby obtaining 204 g of terephthalate diester.

Subsequently, 175 g of the resulting terephthalate diester was subjected to nucleus hydrogenation in a manner similar to that in Production Example F1, thereby obtaining 148 g of the target 1,4-cyclohexane dicarboxylate diester (hereinafter referred to as "ester F4").

The resulting ester F4 had an ester value of 261 mg KOH/g, an acid value of 0.01 mg KOH/g, and a color number of 10.

Production Example F5

A method similar to that in Production Example F1 was performed except that 116 g of dimethyl isophthalate was used instead of 116 g of dimethyl terephthalate, thereby obtaining 201 g of the target 1,3-cyclohexane dicarboxylate diester (hereinafter referred to as "ester F5").

The resulting ester F5 had an ester value of 283 mg KOH/g, an acid value of 0.01 mg KOH/g, and a color number of 15.

Production Example F6

A method similar to that in Production Example F1 was performed, except that 483 g (3.35 mol) of n-nonyl alcohol and 520 g (3.6 mol) of isononyl alcohol were added instead of 1045 g of the saturated aliphatic alcohol (Linevol 9: Shell Chemicals), thereby obtaining 146 g of the target 1,2-cyclohexane dicarboxylate diester (hereinafter referred to as "ester F7").

The resulting ester F7 had an ester value of 261 mg KOH/g, an acid value of 0.01 mg KOH/g, and a color number of 10.

Example F-1

A vinyl chloride-based resin composition of the present invention was prepared using ester F1 produced in Production Example F1 according to Production Method 1. Subsequently, using the resulting vinyl chloride-based resin composition, a rolled sheet and a pressed sheet were produced, and a tensile test, a cold resistance test, and a heat resistance test were performed. Table 4 shows the results.

Example F-2

A method similar to that in Example F-1 was performed, except that ester F2 obtained in Production Example F2 was used instead of ester F1, thereby preparing a vinyl chloride-based resin composition that falls out of the range of the present invention. A rolled sheet and a pressed sheet were produced using the resulting resin composition, and a tensile test, a cold resistance test, and a heat resistance test were performed. The results are summarized in Table 6.

Example F-3

A method similar to that in Example F-1 was performed, except that ester F3 obtained in Production Example F3 was used instead of ester F1, thereby preparing a vinyl chloride-based resin composition that falls out of the range of the present invention. A rolled sheet and a pressed sheet were produced using the resulting resin composition, and a tensile test, a cold resistance test, and a heat resistance test were performed. The results are summarized in Table 6.

Example F-4

A method similar to that in Example F-1 was performed, except that ester F4 obtained in Production Example F4 was used instead of ester F1, thereby preparing a vinyl chloride-based resin composition that falls out of the range of the present invention. A rolled sheet and a pressed sheet were produced using the resulting resin composition, and a tensile test, a cold resistance test, and a heat resistance test were performed. The results are summarized in Table 6.

Example F-6

A method similar to that in Example F-1 was performed, except that ester F5 obtained in Production Example F5 was used instead of ester F1, thereby preparing a vinyl chloride-based resin composition that falls out of the range of the present invention. A rolled sheet and a pressed sheet were produced using the resulting resin composition, and a tensile test, a cold resistance test, and a heat resistance test were performed. The results are summarized in Table 6.

Comparative Example F-1

A method similar to that in Example F-1 was performed, except that ester F7 obtained in Production Example F7 was used instead of ester F1, thereby preparing a vinyl chloride-based resin composition that falls out of the range of the present invention. A rolled sheet and a pressed sheet were produced using the resulting resin composition, and a tensile test, a cold resistance test, and a heat resistance test were performed. The results are summarized in Table 6.

Comparative Example F-2

A method similar to that in Example F-1 was performed, except that a commercially available 1,2-cyclohexane dicarboxylate diisononyl (hexamoll DINCH, BASF A.G.) was used instead of ester F1, thereby preparing a vinyl chloride-based resin composition that falls out of the range of the present invention. A rolled sheet and a pressed sheet were produced using the resulting resin composition, and a tensile test, a cold resistance test, and a heat resistance test were performed. The results are summarized in Table 6.

Comparative Example F-3

A method similar to that in Example F-1 was performed, except that a commercially available di-2-ethylhexyl phthalate (SANSO CIZER DOP, New Japan Chemical Co., Ltd.) was used instead of ester F1, thereby preparing a vinyl chloride-based resin composition that falls out of the range of the present invention. A rolled sheet and a pressed sheet were produced using the resulting resin composition, and a tensile test, a cold resistance test, and a heat resistance test were performed. The results are summarized in Table 6.

TABLE 6

| Examination Item | Unit (Condition) | Example | | | | | Comparative Example | | |
|---|---|---|---|---|---|---|---|---|---|
| | | F-1 | F-2 | F-3 | F-4 | F-5 | F-1 | F-2 | F-3 |
| Plasticizer Type | | Ester F1 | Ester F2 | Ester F3 | Ester F4 | Ester F5 | Ester F6 | DINCH | DOP |
| Linear-Chain Ratio of Raw-Material Alcohol (%) | | 87 | 87 | 70 | 87 | 87 | 50 | 10 | 0 |
| Tensile Characteristics | 100% Modulus MPa | 10.2 | 10.1 | 10.4 | 9 | 9.7 | 10.6 | 10.8 | 9.4 |
| | Strength Mpa | 21.7 | 22.2 | 22.0 | 20.9 | 21.5 | 22.0 | 22.1 | 21.4 |
| | Elongation % | 363 | 373 | 361 | 371 | 370 | 361 | 361 | 331 |
| Cold Resistance | Softening Temperature °C. | −38 | −39 | −36 | −42 | −40 | −34 | −30 | −24 |
| Heat Resistance | Volatile Loss % (170° C., 60 Minutes) | 3.4 | 3.5 | 4.2 | 3.1 | 3.3 | 4.7 | 7.7 | 8.8 |
| | % (170° C., 120 Minutes) | 6.6 | 6.7 | 7.1 | 6.2 | 6.4 | 8.1 | 14.0 | 15.1 |
| | Sheet Discoloration (170° C., 30 Minutes) | ◎ | ◎ | ◎ | ◎ | ◎ | ◎ | ◎ | ○△ |
| | (170° C., 60 Minutes) | ○ | ○ | ○ | ○ | ○ | △ | ○△ | X |

Evaluation Results

The results of Table 6 revealed that the vinyl chloride-based resin compositions (Examples F-1 to F-5) containing the cyclohexane dicarboxylate diester of the present invention as a plasticizer were clearly significantly superior in cold resistance and heat resistance, compared with the resin compositions (Comparative Examples F-2 and F-3) containing a previously known plasticizer. Further, the results of Table 6 also revealed that the vinyl chloride-based resin compositions of the present invention were also superior in cold resistance and heat resistance, compared with the resin composition (Comparative Example F-1) containing a cyclohexane dicarboxylate diester that fall out of the range of the present invention as a plasticizer.

(G) Non-Phthalate Ester Plasticizer for Vinyl Chloride Resin and Vinyl Chloride Resin Composition Containing the Non-Phthalate Ester Plasticizer Production Example G1

96.0 g (0.5 mol) of trimellitic acid anhydride (phthalic acid content: 400 ppm) obtained in the method above, 259 g (1.8 mol) of saturated aliphatic alcohol (Linevol 9: Shell Chemicals) containing 85.1 wt % of linear $C_9$ saturated aliphatic alcohol and 11.7 wt % of branched $C_9$ saturated aliphatic alcohol, and 0.13 g of tetraisopropyltitanate as an esterification catalyst were added to a 2-L four-necked flask equipped with a thermometer, a decanter, a stirring blade, and a reflux condenser tube, and an esterification reaction was conducted under a reaction temperature of 185° C. Under reduced pressure, the reaction was continued while refluxing the alcohol and removing the generated water to the outside of the system until the acid value of the reaction solution became 0.5 mg KOH/g. After the reaction was completed, unreacted alcohol was distilled off to the outside of the system under reduced pressure, followed by neutralization, washing with water, and dehydration by standard methods, thereby obtaining 245 g of the target trimellitate triester (hereinafter referred to as ester G1).

The resulting ester G1 had an ester value of 285 mg KOH/g, an acid value of 0.01 mg KOH/g, and a color number of 15.

Further, analysis results revealed that the content of an ester of alcohol having 8 or fewer carbon atoms and phthalic acid in the resulting ester G1 was no more than the detection limit.

Production Example G2

A method similar to that in Production Example G1 was performed, except that 259 g of n-nonyl alcohol was added instead of 259 g of the saturated aliphatic alcohol (Linevol 9: Shell Chemicals), thereby obtaining 244 g of trimellitate triester (hereinafter referred to as "ester G2").

The resulting ester G2 had an ester value of 285 mg KOH/g, an acid value of 0.03 mg KOH/g, and a color number of 17.

Further, analysis results revealed that the content of an ester of alcohol having 8 or fewer carbon atoms and phthalic acid in the resulting ester G2 was no more than the detection limit.

Production Example G3

A method similar to that in Production Example G1 was performed, except that 181.3 g (1.3 mol) of n-nonyl alcohol and 77.7 g (0.5 mol) of isononyl alcohol were added instead of 259 g of the saturated aliphatic alcohol (Linevol 9: Shell Chemicals), thereby obtaining 243 g of trimellitate triester (hereinafter referred to as "ester G3").

The resulting ester G3 had an ester value of 284 mg KOH/g, an acid value of 0.04 mg KOH/g, and a color number of 18.

Further, analysis results revealed that the content of an ester of alcohol having 8 or fewer carbon atoms and phthalic acid in the resulting ester G3 was no more than the detection limit.

Production Example G4

A method similar to that in Production Example G1 was performed, except that 234 g of 2-ethylhexyl alcohol was added instead of 259 g of the saturated aliphatic alcohol (Linevol 9: Shell Chemicals), thereby obtaining 219 g of trimellitate triester (hereinafter referred to as "ester G4").

The resulting ester G4 had an ester value of 309 mg KOH/g, an acid value of 0.04 mg KOH/g, and a color number of 20.

Further, analysis results revealed that the content of an ester of alcohol having 8 or fewer carbon atoms and phthalic acid in the resulting ester G4 was 400 ppm.

Production Example G5

A method similar to that in Production Example G1 was performed, except that 234 g of n-octyl alcohol was added instead of 259 g of the saturated aliphatic alcohol (Linevol 9: Shell Chemicals), thereby obtaining 220 g of trimellitate triester (hereinafter referred to as "ester G5").

The resulting ester G5 had an ester value of 309 mg KOH/g, an acid value of 0.05 mg KOH/g, and a color number of 19.

Further, analysis results revealed that the content of an ester of alcohol having 8 or fewer carbon atoms and phthalic acid in the resulting ester G5 was 390 ppm.

Production Example G6

A method similar to that in Production Example G1 was performed, except that 259 g of isononyl alcohol was added instead of 259 g of the saturated aliphatic alcohol (Linevol 9: Shell Chemicals), thereby obtaining 238 g of trimellitate triester (hereinafter referred to as "ester G6").

The resulting ester G6 had an ester value of 285 mg KOH/g, an acid value of 0.06 mg KOH/g, and a color number of 21.

Further, analysis results revealed that the content of an ester of alcohol having 8 or fewer carbon atoms and phthalic acid in the resulting ester G6 was no more than the detection limit.

Production Example G7

A method similar to that in Production Example G1 was performed, except that 284 g of isodecyl alcohol was added instead of 259 g of the saturated aliphatic alcohol (Linevol 9: Shell Chemicals), thereby obtaining 252 g of trimellitate triester (hereinafter referred to as "ester G7").

The resulting ester G7 had an ester value of 265 mg KOH/g, an acid value of 0.05 mg KOH/g, and a color number of 20.

Further, analysis results revealed that the content of an ester of alcohol having 8 or fewer carbon atoms and phthalic acid in the resulting ester G7 was no more than the detection limit.

Example G-1

A vinyl chloride-based resin composition was produced according to Production Method 1 using the trimellitate triester (ester G1) obtained in Production Example G1. Subsequently, a vinyl chloride sheet was produced using the resulting vinyl chloride-based resin composition, and a tensile test, a cold resistance test, a heat resistance test, and a fogging resistance test were performed. Table 7 shows the results.

The glass surface after the fogging test was observed by visual inspection; however, almost no fogging was confirmed.

Example G-2

A vinyl chloride-based resin composition and a vinyl chloride sheet were produced using a method similar to that in Example G-1, except that ester G2 was used instead of ester G1, and a tensile test, a cold resistance test, a heat resistance test, and a fogging resistance test were performed. The results are summarized in Table 7.

The glass surface after the fogging test was observed by visual inspection; however, almost no fogging was confirmed.

Example G-3

A vinyl chloride-based resin composition and a vinyl chloride sheet were produced using a method similar to that in Example G-1, except that ester G3 was used instead of ester G1, and a tensile test, a cold resistance test, a heat resistance test, and a fogging resistance test were performed. The results are summarized in Table 7.

The glass surface after the fogging test was observed by visual inspection; however, almost no fogging was confirmed.

Comparative Example G-1

A vinyl chloride-based resin composition and a vinyl chloride sheet were produced using a method similar to that in Example G-1, except that ester G4 was used instead of ester G1, and a tensile test, a cold resistance test, a heat resistance test, and a fogging resistance test were performed. The results are summarized in Table 7.

The glass surface after the fogging test was observed by visual inspection, and insignificant fogging was observed.

Comparative Example G-2

A vinyl chloride-based resin composition and a vinyl chloride sheet were produced using a method similar to that in Example G-1, except that ester G5 was used instead of ester G1, and a tensile test, a cold resistance test, a heat resistance test, and a fogging resistance test were performed. The results are summarized in Table 5.

The glass surface after the fogging test was observed by visual inspection, and slight fogging was observed.

Comparative Example G-3

A vinyl chloride-based resin composition and a vinyl chloride sheet were produced using a method similar to that in Example G-1, except that ester G6 was used instead of ester G1, and a tensile test, a cold resistance test, a heat resistance test, and a fogging resistance test were performed. The results are summarized in Table 7.

The glass surface after the fogging test was observed by visual inspection, and slight fogging was observed.

Comparative Example G-4

A vinyl chloride-based resin composition and a vinyl chloride sheet were produced using a method similar to that in Example G-1, except that ester G7 was used instead of ester G1, and a tensile test, a cold resistance test, a heat resistance test, and a fogging resistance test were performed. The results are summarized in Table 7.

The glass surface after the fogging test was observed by visual inspection; however, almost no fogging was confirmed.

Comparative Example G-5

A vinyl chloride-based resin composition and a vinyl chloride sheet were produced using a method similar to that in Example G-1, except that di-2-ethylhexyl phthalate (SANSO CIZER DOP, New Japan Chemical Co., Ltd.) was used instead of ester G1, and a tensile test, a cold resistance test, a heat resistance test, and a fogging resistance test were performed. The results are summarized in Table 7.

The glass surface after the fogging test was observed by visual inspection, and fogging to an extent that hinders the field of vision was clearly confirmed.

TABLE 7

| | Examination Item | Unit (Condition) | Example | | | Comparative Example | | | | |
|---|---|---|---|---|---|---|---|---|---|---|
| | | | G-1 | G-2 | G-3 | G-1 | G-2 | G-3 | G-4 | G-5 |
| Plasticizer | Type | | Ester G1 | Ester G2 | Ester G3 | Ester G4 | Ester G5 | Ester G6 | Ester G7 | DOP |
| | Linear-Chain Ratio of Raw-Material Alcohol (%) | | 87 | 100 | 70 | 0 | 100 | 0 | 0 | 0 |
| | Content of Ester of Alcohol Having 8 or Fewer Carbon Atoms and Phtalic Acid (ppm) | | Detection Limit or Less | Detection Limit or Less | Detection Limit or Less | 400 | 390 | Detection Limit or Less | Detection Limit or Less | — |
| Tensile Characteristics | 100% Modulus | MPa | 12.3 | 12 | 12.5 | 13.1 | 11.9 | 13.3 | 13.8 | 9.5 |
| | Strength | MPa | 23.7 | 23.5 | 23.4 | 24 | 23.4 | 23.2 | 23.5 | 21.4 |
| | Elongation | % | 359 | 373 | 351 | 330 | 353 | 328 | 330 | 320 |
| Cold Resistance | Softening Temperature | °C. | −29 | −30 | −27 | −17 | −24 | −21 | −20 | −24 |
| Heat Resistance | Volatile Loss | % (170° C., 60 Minutes) | 0.4 | 0.3 | 0.4 | 0.7 | 0.5 | 0.5 | 0.4 | 8.8 |
| | | % (170° C., 120 Minutes) | 0.7 | 0.6 | 0.8 | 1.2 | 1 | 1 | 0.8 | 15.1 |
| | Sheet Discoloration | (170° C., 30 Minutes) | ◎ | ◎ | ◎ | ○ | ○ | ○ | ○ | Δ |

TABLE 7-continued

| Examination Item | Unit (Condition) | Example | | | Comparative Example | | | | |
|---|---|---|---|---|---|---|---|---|---|
| | | G-1 | G-2 | G-3 | G-1 | G-2 | G-3 | G-4 | G-5 |
| Fogging Resistance | Haze | (170° C., 60 Minutes) | Δ | Δ | Δ | Δ | Δ | Δ | Δ | X |
| | | % (100° C., 8 Hours) | 2 | 2 | 2 | 3 | 3 | 3 | 2 | 46 |
| | | % (120° C., 3 Hours) | 3 | 3 | 3 | 5 | 4 | 4 | 3 | 56 |

Evaluation Results

The results of Table 7 clearly revealed that the trimellitate triesters (Examples G-1 to G-3) of the present invention were substantially free of an ester of phthalic acid compound and alcohol having 8 or fewer carbon atoms, which has a high risk and is restricted in use in some applications. The results also revealed that the trimellitate triesters of the present invention had flexibility, cold resistance, and heat resistance, such as volatility resistance, equivalent to or greater than those of known TOTM or n-TOTM, and also were superior in fogging properties. Therefore, it was revealed that the trimellitate triesters of the present invention are very useful as a plasticizer with small risk and superior performance.

(H) Plasticizer for Vinyl Chloride Resin with Superior Durability and Vinyl Chloride Resin Composition Containing the Plasticizer Production Example H1

96.0 g (0.5 mol) of trimellitic acid anhydride (commercially available industrial product), 259 g (1.8 mol) of saturated aliphatic alcohol (Linevol 9: Shell Chemicals) containing 85.1 wt % of linear $C_9$ saturated aliphatic alcohol and 11.7 wt % of branched $C_9$ saturated aliphatic alcohol as a raw material alcohol, and 0.13 g of tetraisopropyltitanate as an esterification catalyst were added to a 2-L four-necked flask equipped with a thermometer, a decanter, a stirring blade, and a reflux condenser tube, and an esterification reaction was conducted under a reaction temperature of 185° C. Under reduced pressure, the reaction was continued while refluxing the raw material alcohol and removing the generated water to the outside of the system until the acid value of the reaction solution became 0.5 mg KOH/g. After the reaction was completed, unreacted alcohol was distilled off to the outside of the system under reduced pressure, followed by neutralization, washing with water, and dehydration by standard methods, thereby obtaining 245 g of the target trimellitate triester (hereinafter referred to as "ester H1").

The resulting ester H1 had an ester value of 285 mg KOH/g, an acid value of 0.01 mg KOH/g, and a color number of 15.

Production Example H2

A method similar to that in Production Example H1 was performed, except that 259 g of isononyl alcohol was used instead of 259 g of the saturated aliphatic alcohol (Linevol 9: Shell Chemicals), thereby obtaining 236 g of a trimellitate triester (hereinafter referred to as "ester H2").

The resulting ester H2 had an ester value of 285 mg KOH/g, an acid value of 0.03 mg KOH/g, and a color number of 10.

Example H-1

Tetrakis-[methylene-3-(3',5'-di-t-butyl-4'-hydroxyphenyl-propionate)]methane (hereinafter referred to as "antioxidant A") of 0.3 parts by weight was incorporated in 100 parts by weight of the trimellitate triester (ester H1) obtained in Production Example H1), and the mixture was stirred for 20 minutes at 70° C., thereby obtaining a transparent plasticizer for vinyl chloride-based resin. Subsequently, a rolled sheet and a pressed sheet were produced according to Production Method 1 described above using the resulting plasticizer, and tensile characteristics, a cold resistance, a heat resistance, and a heat-aging resistance were measured. The results are summarized in Table 8. The resulting plasticizer for vinyl chloride-based resin was transparent. Further, the resulting pressed sheet also had desirable fogging resistance.

Example H-2

A rolled sheet and a pressed sheet were produced using a method similar to that in Example H-1, except that 1,1,3-tris(2-methyl-5-t-butyl-4-hydroxyphenyl)butane (antioxidant B) was used instead of antioxidant A, and tensile characteristics, cold resistance, heat resistance, and a heat-aging resistance were measured. The results are summarized in Table 8. The resulting plasticizer for vinyl chloride-based resin was transparent. Further, the resulting pressed sheet also had desirable fogging resistance.

Example H-3

A rolled sheet and a pressed sheet were produced using a method similar to that in Example H-1, except that 1,3,5-tris(4-t-butyl-3-hydroxy-2,6-dimethylbenzyl) isocyanurate (antioxidant C) was used instead of antioxidant A, and tensile characteristics, cold resistance, heat resistance, and heat-aging resistance were measured. The results are summarized in Table 8. The resulting plasticizer for vinyl chloride-based resin was transparent. Further, the resulting pressed sheet also had desirable fogging resistance.

Example H-4

A rolled sheet and a pressed sheet were produced using a method similar to that in Example H-1, except that ester H2 produced in Production Example H2 was used instead of ester H1, and tensile characteristics, cold resistance, heat resistance, and heat-aging resistance were measured. The results are summarized in Table 8. The resulting plasticizer for vinyl chloride-based resin was transparent. Further, the resulting pressed sheet also had desirable fogging resistance.

Reference Example G-1

A rolled sheet and a pressed sheet were produced using a method similar to that in Example H-1, except that ester G1 produced in Production Example G1 was directly used without adding an antioxidant, and tensile characteristics, cold resistance, heat resistance, and heat-aging resistance were measured. The results are summarized in Table 8.

TABLE 8

| Examination Item | Unit (Condition) | Example H-1 | Example H-2 | Example H-3 | Example H-4 | Reference Example G-1 |
|---|---|---|---|---|---|---|
| Plasticizer Type | | Ester H1 | Ester H1 | Ester H1 | Ester H2 | Ester G1 |
| Linear-Chain Ratio of Raw-Material Alcohol (%) | | 87 | 87 | 87 | 0 | 87 |
| Antioxidant Type | | A | B | C | A | — |
| Molecular Weight | | 1175 | 545 | 700 | 1175 | — |
| SP Value | | 11 | 11.6 | 12.5 | 11 | — |
| Tensile Characteristics 100% Modulus | MPa | 12.3 | 12.3 | 12.2 | 13.1 | 12.3 |
| Strength | MPa | 23.4 | 23.5 | 23.7 | 23.2 | 23.5 |
| Elongation | % | 356 | 354 | 361 | 328 | 359 |
| Cold Resistance Softening Temperature | °C. | −29 | −29 | −29 | −20 | −29 |
| Heat Resistance Volatile Loss | % (170° C., 60 Minutes) | 0.2 | 0.2 | 0.1 | 0.2 | 0.4 |
| | % (170° C., 120 Minutes) | 0.4 | 0.4 | 0.3 | 0.4 | 0.8 |
| Sheet Discoloration | (170° C., 30 Minutes) | ◎ | ◎ | ◎ | ◎ | ◎ |
| | (170° C., 60 Minutes) | ◎ | ◎ | ◎ | ◎ | Δ |
| Heat-Aging Resistance 100% Modulus Residual Rate | % | 101 | 100 | 100 | 101 | 95 |
| Elongation Residual Rate | | 98 | 100 | 99 | 101 | 83 |

Evaluation Results

The results of Table 8 revealed that the heat discoloration resistance and the heat-aging resistance of the trimellitate triesters (Examples H-1 to H-4) of the present invention, which contain an antioxidant, were further greatly improved, compared with ester G1 (Reference Example G-1), which does not contain an antioxidant.

(I) Medical Vinyl Chloride Resin Composition and Medical Material Containing Trimellitate Triester Production Example I1

96 g (0.5 mol) of trimellitic acid anhydride (commercially available industrial product), 259 g (1.8 mol) of saturated aliphatic alcohol (Linevol 9: Shell Chemicals) containing 85.1 wt % of linear $C_9$ saturated aliphatic alcohol and 11.7 wt % of branched $C_9$ saturated aliphatic alcohol, and 0.13 g of tetraisopropyltitanate as an esterification catalyst were added to a 1-L four-necked flask equipped with a thermometer, a decanter, a stirring blade, and a reflux condenser tube, and an esterification reaction was conducted under a reaction temperature of 190° C. Under reduced pressure, the reaction was continued while refluxing the raw material alcohol and removing the generated water to the outside of the system until the acid value of the reaction solution became 0.5 mg KOH/g. After the reaction was completed, unreacted alcohol was distilled off to the outside of the system under reduced pressure, followed by neutralization, washing with water, and dehydration by standard methods, thereby obtaining 245 g of the target trimellitate triester (hereinafter referred to as "ester I1").

The resulting ester I1 had an ester value of 284 mg KOH/g, an acid value of 0.02 mg KOH/g, and a color number of 20.

Production Example I2

A method similar to that in Production Example I1 was performed, except that 245 g (1.7 mol) g of n-nonyl alcohol and 14 g (0.1 mol) of isononyl alcohol were added instead of 259 g of the saturated aliphatic alcohol (Linevol 9: Shell Chemicals), thereby obtaining 242 g of trimellitate triester (hereinafter referred to as "ester I2").

The resulting ester I2 had an ester value of 283 mg KOH/g, an acid value of 0.04 mg KOH/g, and a color number of 20.

Production Example I3

A method similar to that in Production Example I1 was performed, except that 173 g (1.2 mol) g of n-nonyl alcohol and 87 g (0.6 mol) of isononyl alcohol were added instead of 259 g of the saturated aliphatic alcohol (Linevol 9: Shell Chemicals), thereby obtaining 240 g of trimellitate triester (hereinafter referred to as "ester I3").

The resulting ester I3 had an ester value of 282 mg KOH/g, an acid value of 0.05 mg KOH/g, and a color number of 20.

Production Example I4

A method similar to that in Production Example I1 was performed, except that 259 g of isononyl alcohol was added instead of 259 g of the saturated aliphatic alcohol (Linevol 9: Shell Chemicals), thereby obtaining 238 g of trimellitate triester (hereinafter referred to as "ester I4").

The resulting ester I4 had an ester value of 285 mg KOH/g, an acid value of 0.06 mg KOH/g, and a color number of 20.

Production Example I5

A method similar to that in Production Example I1 was performed, except that 130 g (0.9 mol) g of n-nonyl alcohol and 130 g (0.9 mol) of isononyl alcohol were added instead of 259 g of the saturated aliphatic alcohol (Linevol 9: Shell Chemicals), thereby obtaining 241 g of trimellitate triester (hereinafter referred to as "ester I5").

The resulting ester I5 had an ester value of 283 mg KOH/g, an acid value of 0.05 mg KOH/g, and a color number of 20.

Production Example I6

A method similar to that in Production Example I1 was performed, except that 234 g of 2-ethylhexyl alcohol was added instead of 259 g of the saturated aliphatic alcohol (Linevol 9: Shell Chemicals), thereby obtaining 219 g of trimellitate triester (hereinafter referred to as "ester I6").

The resulting ester I6 had an ester value of 309 mg KOH/g, an acid value of 0.06 mg KOH/g, and a color number of 20.

Production Example I7

A method similar to that in Production Example 40 was performed, except that 74 g (0.5 mol) of phthalic acid dianhydride was added instead of 96 g of trimellitic acid anhydride and 173 g of isononyl alcohol was added instead of 259 g of the saturated aliphatic alcohol (Linevol 9: Shell Chemicals:), thereby obtaining 168 g of diisononyl phthalate ester (hereinafter referred to as "ester I7").

The resulting ester I7 had an ester value of 266 mg KOH/g, an acid value of 0.04 mg KOH/g, and a color number of 10.

Example I-1

A medical vinyl chloride-based resin composition of the present invention was prepared using the trimellitate triester (ester I1) obtained in Production Example I1 as a plasticizer according to Production Method 2 described above. Subsequently, vinyl chloride sheets (a rolled sheet and a pressed sheet) were prepared using the resulting vinyl chloride-based resin composition, and a tensile test, a cold resistance test, a heat resistance test, and an ultraviolet irradiation test of the resulting vinyl chloride sheets were performed. Table 9 shows the results.

Example I-2

A medical vinyl chloride-based resin composition of the present invention was prepared using a method similar to that in Production Example I-1, except that ester I2 was used instead of ester I1. Thereafter, a vinyl chloride sheet was produced from the resulting vinyl chloride-based resin composition, and a tensile test, a cold resistance test, a heat resistance test, and an ultraviolet irradiation test were performed. The results are summarized in Table 9.

Example I-3

A medical vinyl chloride-based resin composition of the present invention was prepared using a method similar to that in Production Example I-1, except that ester I3 was used instead of ester I1. Thereafter, a vinyl chloride sheet was produced from the resulting vinyl chloride-based resin composition, and a tensile test, a cold resistance test, a heat resistance test, and a ultraviolet irradiation test were performed. The results are summarized in Table 9.

Comparative Example I-1

A vinyl chloride-based resin composition was prepared using a method similar to that in Production Example I-1, except that ester I4 was used instead of ester I1. Thereafter, a vinyl chloride sheet was produced from the resulting vinyl chloride-based resin composition, and a tensile test, a cold resistance test, a heat resistance test, and an ultraviolet irradiation test were performed. The results are summarized in Table 9.

Comparative Example I-2

A vinyl chloride-based resin composition was prepared using a method similar to that in Production Example I-1, except that ester I5 was used instead of ester I1. Thereafter, a vinyl chloride sheet was produced from the resulting vinyl chloride-based resin composition, and a tensile test, a cold resistance test, a heat resistance test, and an ultraviolet irradiation test were performed. The results are summarized in Table 9.

Comparative Example I-3

A vinyl chloride-based resin composition was prepared using a method similar to that in Production Example I-1, except that ester I6 was used instead of ester I1. Thereafter, a vinyl chloride sheet was produced from the resulting vinyl chloride-based resin composition, and a tensile test, a cold resistance test, a heat resistance test, and an ultraviolet irradiation test were performed. The results are summarized in Table 9.

Comparative Example I-4

A vinyl chloride-based resin composition was prepared using a method similar to that in Production Example I-1, except that ester I7 was used instead of ester I1. Thereafter, a vinyl chloride sheet was produced from the resulting vinyl chloride-based resin composition, and a tensile test, a cold resistance test, a heat resistance test, and an ultraviolet irradiation test were performed. The results are summarized in Table 9.

Comparative Example I-5

A vinyl chloride-based resin composition was prepared using a method similar to that in Example I-1, except that di-2-ethylhexyl phthalate (SANSO CIZER DOP, New Japan Chemical Co., Ltd.) was used instead of ester I1. Thereafter, a vinyl chloride sheet was produced from the resulting vinyl chloride-based resin composition, and a tensile test, a cold resistance test, a heat resistance test, and a ultraviolet irradiation test were performed. The results are summarized in Table 9.

TABLE 9

| | Examination | Unit | Example | | | Comparative Example | | | | |
|---|---|---|---|---|---|---|---|---|---|---|
| | Item | (Condition) | I-1 | I-2 | I-3 | I-1 | I-2 | I-3 | I-4 | I-5 |
| Plasticizer | | Type | Ester I1 | Ester I2 | Ester I3 | Ester I4 | Ester I5 | Ester I6 | Ester I7 | DOP |

TABLE 9-continued

| Examination | | Unit | Example | | | Comparative Example | | | | |
|---|---|---|---|---|---|---|---|---|---|---|
| Item | | (Condition) | I-1 | I-2 | I-3 | I-1 | I-2 | I-3 | I-4 | I-5 |
| | Linear-Chain Ratio of Raw-Material Alcohol | % | 87 | 95 | 70 | 10 | 55 | 0 | 10 | 0 |
| Tensile Characteristics | 100% Modulus | MPa | 12.3 | 12.1 | 12.5 | 13.1 | 13.1 | 13.1 | 10.1 | 9.4 |
| | Strength | MPa | 23.7 | 23.3 | 23.4 | 23.2 | 23.2 | 24 | 22.4 | 21.4 |
| | Breaking Elongation | % | 359 | 347 | 351 | 330 | 337 | 330 | 352 | 320 |
| Cold Resistance | Softening Temperature | °C. | −29 | −29 | −27 | −21 | −25 | −17 | −27 | −24 |
| Heat Resistance | Volatile Loss | % (170° C., 60 Minutes) | 0.4 | 0.3 | 0.4 | 0.5 | 0.5 | 0.6 | 3.9 | 8.8 |
| | | % (170° C., 120 Minutes) | 0.7 | 0.6 | 0.8 | 1 | 0.9 | 1.2 | 7.6 | 15.1 |
| | Sheet Discoloration | (170° C., 30 Minutes) | ◎ | ◎ | ◎ | ○ | ○ | ○ | ○Δ | Δ |
| | | (170° C., 60 Minutes) | Δ | Δ | Δ | Δ | Δ | Δ | X | XX |
| Ultraviolet Resistance | Sheet Discoloration | After 5 Cylces | ○ | ○ | ○ | ○ | ○ | ○ | Δ | X |

Evaluation Results

The results of Table 9 revealed that the medical vinyl chloride-based resin compositions (Examples I-1 to I-3) of the present invention containing a trimellitate triester underwent very little discoloration after an ultraviolet irradiation test, compared with the resin compositions (Comparative Examples I-4 and I-5) containing a phthalate ester plasticizer, which is currently the most versatile plasticizer. Generally, the discoloration of molded articles obtained from vinyl chloride-based resin compositions is caused by generation of conjugated polyene due to a dehydrochlorination reaction of vinyl chloride-based resin. Since the discoloration is promoted by ultraviolet or radial ray irradiation, it is known that molded vinyl-chloride resin articles undergo discoloration during a sterilization or disinfection treatment. These results suggest that the discoloration occurs not only due to ultraviolet irradiation but also during sterilization or disinfection treatment using various other radial rays, which are assumed to cause discoloration by the same mechanism.

Further, similarly, the medical vinyl chloride-based resin compositions (Examples I-1 to I-3) containing the trimellitate triester of the present invention had a low volatile loss, compared with the resin compositions (Comparative Examples I-4 and I-5) containing a phthalate ester plasticizer, which is currently the most versatile plasticizer. Thus, concerns about deterioration such as decrease in flexibility due to volatilization of the plasticizer during a sterilization or disinfection treatment with boiling or heating in an autoclave or the like can be further reduced, thereby ensuring superior usability.

Further, the comparison with the trimellitate triesters (Comparative Examples I-1 to I-3) that fall out of the range of the present invention clearly showed that, by selecting the specific trimellitate triester of the present invention among trimellitate triesters as a plasticizer, equivalent or greater flexibility or cold resistance can be ensured at the time of use; further, the volatile loss can be reduced and concerns about deterioration such as decrease in flexibility due to volatilization of the plasticizer during a sterilization or disinfection treatment with boiling or heating in an autoclave or the like can be further reduced, thereby ensuring superior usability.

INDUSTRIAL APPLICABILITY

The plasticizer for vinyl chloride-based resin of the present invention may be used as a plasticizer for vinyl chloride-based resin having superior cold resistance and superior volatility resistance, as well as desirable flexibility, desirable fogging resistance, desirable heat discoloration resistance, and desirable weather resistance. Therefore, a molded product obtained from a vinyl chloride-based resin composition containing this plasticizer for vinyl chloride-based resin has superior cold resistance and superior volatility resistance, as well as desirable flexibility, desirable fogging resistance, desirable heat discoloration resistance, and desirable weather resistance. Thus, the molded product may be used as an automobile part such as environmentally friendly window glass, which is free of, for example, window fogging and contamination inside. Further, the molded product is also very useful as a building material, a medical material, or the like, such as a film, sheet, wire sheathing, wallpaper, or a floor material, which are used under severe conditions.

The invention claimed is:

1. A plasticizer for vinyl chloride-based resin, comprising an alicyclic dicarboxylic acid ester (C) obtained by reacting an alicyclic dicarboxylic acid or a derivative thereof (A) and an alcohol (B),
   wherein:
   (i) the alcohol (B) is a saturated aliphatic alcohol (B1) comprising a $C_9$ saturated aliphatic alcohol as a major component;
   (ii) the saturated aliphatic alcohol (B1) comprises a linear $C_9$ saturated aliphatic alcohol (B1-1) of 85.1 to 95 wt %, and a branched $C_9$ saturated aliphatic alcohol (B1-2) of 5 to 11.7 wt %;
   (iii) the linear-chain ratio of the alcohol (B1) is 85.1% or more; and
   (iv) the alicyclic dicarboxylic acid ester (C) does not substantially comprise a phthalate ester obtained by reacting a phthalic acid compound or a derivative thereof with an alkyl alcohol having 8 or fewer carbon atoms.

2. The plasticizer for vinyl chloride-based resin according to claim 1, wherein the alicyclic dicarboxylic acid or derivative thereof (A) is at least one member selected from the group consisting of 1,2-cyclohexanedicarboxylic acid, 1,4-cyclohexanedicarboxylic acid, 4-cyclohexene-1,2-dicarboxylic acid, and a derivative thereof.

3. A vinyl chloride-based resin composition comprising the plasticizer for vinyl chloride-based resin of claim 1, and a vinyl chloride-based resin.

4. The vinyl chloride-based resin composition according to claim 3, wherein the amount of the plasticizer for vinyl chloride-based resin is 1 to 200 parts by weight, per 100 parts by weight of the vinyl chloride-based resin.

5. The vinyl chloride-based resin composition according to claim 3, further comprising epoxidized vegetable oil.

6. The vinyl chloride-based resin composition according to claim 3, further comprising at least one fatty acid metal salt selected from the group consisting of fatty acid calcium salts and fatty acid zinc salts.

7. A vinyl chloride-based paste sol composition comprising the plasticizer for vinyl chloride-based resin of claim 1, and a vinyl chloride-based resin.

8. A vinyl chloride-based resin molded article comprising the vinyl chloride-based resin composition of claim 3.

9. A vinyl chloride-based resin molded article comprising the vinyl chloride-based paste sol composition of claim 7.

* * * * *